US011651043B2

(12) United States Patent
Panuganty

(10) Patent No.: US 11,651,043 B2
(45) Date of Patent: May 16, 2023

(54) LEVERAGING ANALYTICS ACROSS DISPARATE COMPUTING DEVICES

(71) Applicant: MachEye, Inc., Fremont, CA (US)

(72) Inventor: Ramesh Panuganty, Fremont, CA (US)

(73) Assignee: MachEye, Inc., Fremont, CA (US)

( * ) Notice: Subject to any disclaimer, the term of this patent is extended or adjusted under 35 U.S.C. 154(b) by 183 days.

(21) Appl. No.: 16/232,934

(22) Filed: Dec. 26, 2018

(65) Prior Publication Data

US 2020/0065342 A1 Feb. 27, 2020

Related U.S. Application Data

(60) Provisional application No. 62/702,728, filed on Jul. 24, 2018.

(51) Int. Cl.

| | |
|---|---|
| ***G06F 16/95*** | (2019.01) |
| ***G06F 16/9535*** | (2019.01) |
| ***G06N 20/00*** | (2019.01) |
| ***G06F 16/632*** | (2019.01) |
| ***G06F 16/2457*** | (2019.01) |

(52) U.S. Cl.

CPC .... *G06F 16/9535* (2019.01); *G06F 16/24578* (2019.01); *G06F 16/632* (2019.01); *G06N 20/00* (2019.01)

(58) Field of Classification Search

CPC .................................................... G06F 16/9535

See application file for complete search history.

(56) References Cited

U.S. PATENT DOCUMENTS

| | | | |
|---|---|---|---|
| 5,664,172 | A | 9/1997 | Antoshenkov et al. |
| 8,577,911 | B1 | 11/2013 | Stepinski et al. |
| 9,201,905 | B1 | 12/2015 | Kelsey et al. |
| 11,132,504 | B1 | 9/2021 | Mont-Reynaud et al. |
| 11,282,020 | B2 | 3/2022 | Panuganty |
| 11,341,126 | B2 | 5/2022 | Panuganty et al. |
| 2003/0018799 | A1 | 1/2003 | Eyal |

(Continued)

OTHER PUBLICATIONS

"Non-Final Office Action", U.S. Appl. No. 16/425,686, filed Mar. 3, 2021, 19 pages.

(Continued)

*Primary Examiner* — Mohammad S Rostami
(74) *Attorney, Agent, or Firm* — FIG. 1 Patents

(57) ABSTRACT

Techniques described herein provide automated generation of a narrated analytics playlist. Various implementations curate data from various data sources, where curating the data includes identifying attributes and relational data models. One or more implementations base the curating upon anecdotal data associated with a user. In response to receiving a trigger event to perform a query analysis, one or more implementations identify keywords to use in the query analysis, and extract information from the curated data based, at least in part on the one or more keywords. The extracted information is then analyzed to identify insights. In turn, one or more implementations generate a narrated analytics playlist using the insights. Some implementations utilize machine-learning algorithms to curate, extract and/or process data to generate insights. Various implementations abstract the data used to teach the machine-learning algorithms and share the abstracted data to other devices.

20 Claims, 27 Drawing Sheets

(56) References Cited

U.S. PATENT DOCUMENTS

2005/0071323 A1* 3/2005 Gabriel .............. H04N 21/2665
2005/0071328 A1* 3/2005 Lawrence ............... G06F 16/95
2005/0097087 A1 5/2005 Punaganti Venkata et al.
2005/0203878 A1 9/2005 Brill et al.
2005/0240580 A1 10/2005 Zamir et al.
2008/0243785 A1* 10/2008 Stading ............... G06F 16/9535
2008/0319971 A1* 12/2008 Patterson ............ G06F 16/9535
2009/0019002 A1 1/2009 Boulis
2009/0265324 A1 10/2009 Mordvinov et al.
2010/0125562 A1 5/2010 Nair et al.
2010/0125563 A1 5/2010 Nair et al.
2010/0191740 A1 7/2010 Lu et al.
2010/0198812 A1* 8/2010 Athsani ................... H04L 67/18 707/722
2011/0022590 A1 1/2011 Yu
2011/0145234 A1 6/2011 Hu
2011/0302172 A1 12/2011 Chandrasekar et al.
2013/0343720 A1 12/2013 Abecassis
2014/0108445 A1 4/2014 Oztekin
2014/0136504 A1* 5/2014 Shum .................... G06F 16/248 707/706
2014/0143817 A1 5/2014 Yeh
2014/0156641 A1* 6/2014 Tripoli .................... G06F 16/78 707/722
2014/0164352 A1 6/2014 Denninghoff
2014/0195026 A1 7/2014 Wieder
2014/0344265 A1* 11/2014 Boucher ............. G06F 16/2423 707/732
2015/0086174 A1 3/2015 Abecassis et al.
2015/0127565 A1* 5/2015 Chevalier .............. G06Q 30/00 705/319
2015/0178392 A1 6/2015 Jockisch et al.
2015/0286747 A1 10/2015 Anastasakos et al.
2015/0296228 A1* 10/2015 Chen ...................... G06V 20/41 725/34
2015/0339754 A1 11/2015 Bloem et al.
2015/0379077 A1 12/2015 Grosse et al.
2016/0012111 A1* 1/2016 Pattabhiraman ...... G06F 16/284 707/722
2016/0044115 A1* 2/2016 Hill ....................... G06F 16/957 709/227
2016/0078131 A1 3/2016 Venugopal et al.
2016/0103837 A1 4/2016 Lee et al.
2016/0147887 A1* 5/2016 Breno ................... G06F 16/285 707/723
2016/0171050 A1 6/2016 Das
2016/0188667 A1 6/2016 Maughan et al.
2016/0196336 A1 7/2016 Allen et al.
2017/0060868 A1 3/2017 Rais Ghasem et al.
2017/0090858 A1 3/2017 Paris
2017/0091202 A1 3/2017 Fill et al.
2017/0161373 A1 6/2017 Goya et al.
2017/0193107 A1 7/2017 Imbruce et al.
2017/0242653 A1* 8/2017 Lang ....................... H04S 7/303
2017/0308264 A1* 10/2017 Osotio .................. G06F 16/438
2018/0006837 A1 1/2018 Cartwright et al.
2018/0025089 A1* 1/2018 Chin ................... G06F 16/9535 707/706
2018/0032610 A1 2/2018 Cameron et al.
2018/0032620 A1* 2/2018 Kasravi ................. G06F 16/335
2018/0060339 A1 3/2018 Chen et al.
2018/0150533 A1 5/2018 Mathur
2018/0024698 A1 8/2018 Kasravi et al.
2018/0246938 A1 8/2018 Kasravi et al.
2018/0246983 A1* 8/2018 Rathod ............... G06F 16/9566
2018/0260630 A1 9/2018 Cao et al.
2018/0268022 A1* 9/2018 Rose ..................... G06F 16/242
2018/0268080 A1 9/2018 Christian et al.
2018/0268253 A1 9/2018 Hoffman et al.
2018/0276273 A1 9/2018 Mittal et al.
2018/0277108 A1* 9/2018 Badr ...................... G06N 3/006
2018/0300510 A1* 10/2018 Lam ...................... G06F 21/577
2018/0349362 A1 12/2018 Sharp et al.
2018/0349499 A1* 12/2018 Pawar ................ G06F 16/9536
2019/0018692 A1 1/2019 Indyk et al.
2019/0042079 A1 2/2019 Choi
2019/0102681 A1* 4/2019 Roberts .................. G06N 20/20
2019/0109809 A1 4/2019 Wang et al.
2019/0124049 A1 4/2019 Bradley et al.
2019/0126002 A1 5/2019 Brimmer
2019/0138660 A1 5/2019 White et al.
2019/0163783 A1 5/2019 Abrashkevich et al.
2019/0258671 A1 8/2019 Bou et al.
2019/0259040 A1* 8/2019 Athannassov ........ G06F 16/958
2019/0289417 A1 9/2019 Tomlin et al.
2019/0347063 A1 11/2019 Liu et al.
2019/0384762 A1 12/2019 Hill et al.
2019/0385219 A1 12/2019 Ouyang
2020/0034357 A1 1/2020 Panuganty et al.
2020/0034764 A1 1/2020 Panuganty
2020/0117737 A1 4/2020 Gopalakrishnan et al.
2020/0210647 A1 7/2020 Panuganty et al.
2020/0401593 A1 12/2020 Panuganty et al.
2022/0284013 A1 9/2022 Panuganty et al.

OTHER PUBLICATIONS

"Restriction Requirement", U.S. Appl. No. 16/399,554, filed Mar. 26, 2021, 5 pages.
"Final Office Action", U.S. Appl. No. 16/425,686, filed Sep. 9, 2021, 22 pages.
"Non-Final Office Action", U.S. Appl. No. 16/399,554, filed Aug. 5, 2021, 15 pages.
"Final Office Action", U.S. Appl. No. 16/399,554, filed Jan. 18, 2022, 22 pages.
"Non-Final Office Action", U.S. Appl. No. 17/006,812, filed Mar. 1, 2022, 13 pages.
"Non-Final Office Action", U.S. Appl. No. 16/791,469, filed Mar. 30, 2022, 19 pages.
"Notice of Allowance", U.S. Appl. No. 16/425,686, filed Jan. 28, 2022, 8 pages.
"Supplemental Notice of Allowability", U.S. Appl. No. 16/425,686, filed Feb. 16, 2022, 2 pages.
U.S. Appl. No. 16/791,469, filed Sep. 7, 2022 , "Final Office Action", U.S. Appl. No. 16/791,469, filed Sep. 7, 2022, 20 pages.
U.S. Appl. No. 17/006,812, filed Sep. 21, 2022 , "Final Office Action", U.S. Appl. No. 17/006,812, filed Sep. 21, 2022, 16 pages.
U.S. Appl. No. 17/169,943, filed Sep. 2, 2022 , "Non-Final Office Action", U.S. Appl. No. 17/169,943, filed Sep. 2, 2022, 17 pages.
"Notice of Allowance", U.S. Appl. No. 16/399,554, filed Apr. 15, 2022, 8 pages.
U.S. Appl. No. 16/791,469, "Non-Final Office Action", U.S. Appl. No. 16/791,469, dated Feb. 28, 2023, 13 pages.
U.S. Appl. No. 17/006,812, "Non-Final Office Action", U.S. Appl. No. 17/006,812, dated Feb. 15, 2023, 19 pages.

* cited by examiner

LEVERAGING ANALYTICS ACROSS DISPARATE COMPUTING DEVICES

RELATED APPLICATIONS

This application claims priority under the benefit of 35 U.S.C. § 119 to U.S. Provisional Application No. 62/702,728, filed on Jul. 24, 2018, which is incorporated herein by reference in its entirety.

BACKGROUND

The analysis of data provides users with information about corresponding topics. For example, a sales chart graphs sales numbers over time for a particular product to convey the product's performance. Using large volumes of data can help generate better representations of the performance. However, locating and using these large volumes of data can be overwhelming to the user. For instance, using large volumes of data can negatively complicate what computations used in the analysis in that the computations become more complex relative to smaller volumes of data. As another example, having large volumes of data can obfuscate the ability to identify and/or extract desirable information. In some situations, the user is not sufficiently educated how to extract data in a meaningful way, such as by lacking knowledge on the programming language used to interface with a database storing the information, in the algorithms used to analyze the large volume of data, in how to identify insights from the large volumes of data, and so forth. Further, the analysis output can sometimes lose contextual information. For instance, a graph of the sales results may only focus on a portion of the information gathered from the large volume of data, thus failing to provide a context that helps the user understand what the graph indicates. Accordingly, the analysis of large volumes of data can make the extraction of information difficult.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
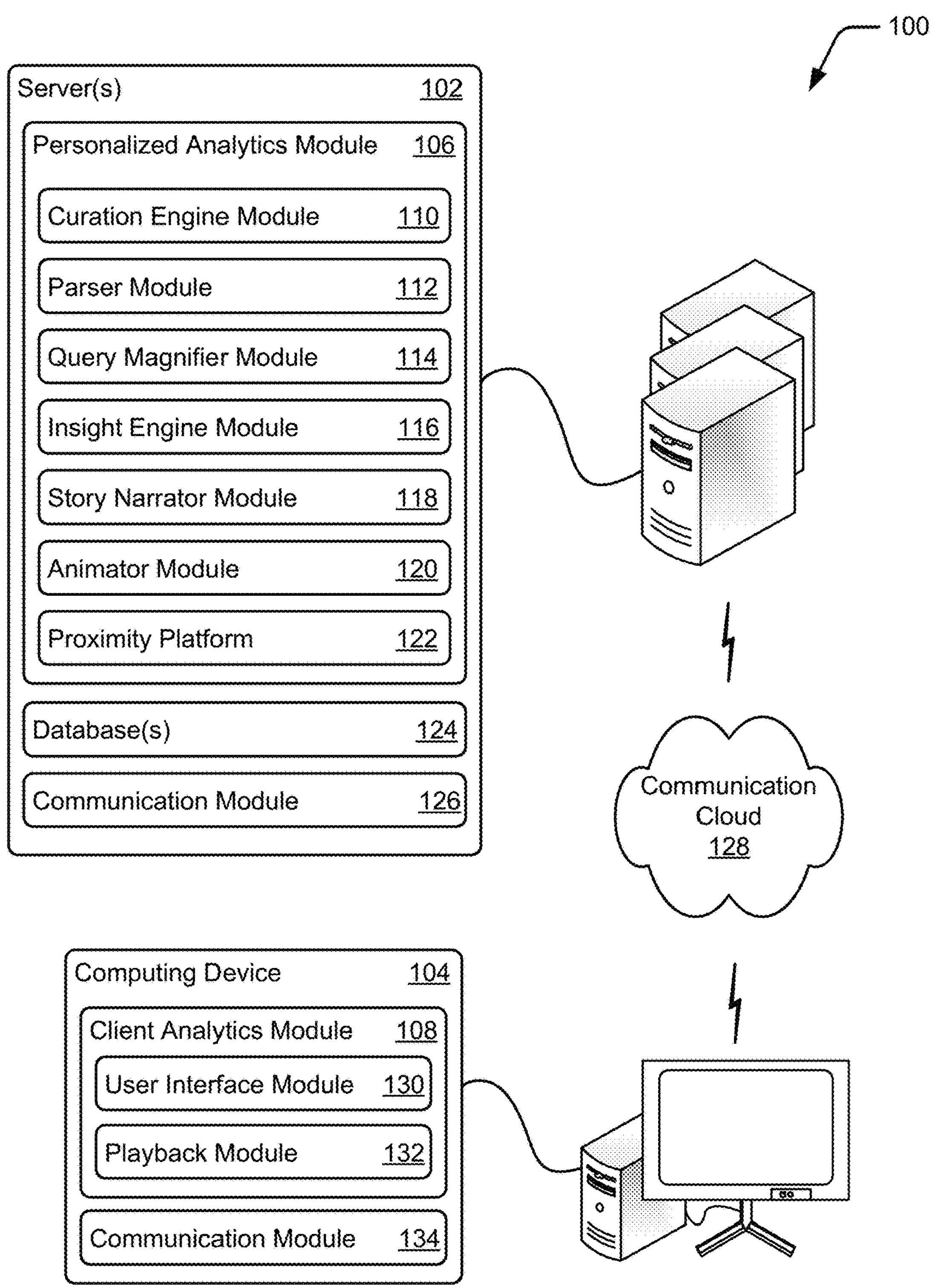
FIG. 1 is an overview of a representative environment in which automated generation of narrated analytics playlists can be utilized in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The interconnectivity of computing devices helps organizations share information acquired at one computing device with other computing devices in the organization. This advantageously enables users to make informed decisions through the use of current and shared data that would otherwise be difficult for one person to accumulate and maintain. However, processing large quantities of data across an organization poses certain challenges. For example, having multiple sources of data oftentimes corresponds to the data being acquired in multiple formats, such as each source providing the respective data in a respective format that is from data originating from other sources. To illustrate a first data source may correspond to geospatial data, a second data source may correspond to unstructured text data, a third data source may correspond to social media data, a fourth data source may correspond to log files, etc. In some scenarios, the different data formats are incompatible, thus necessitating either a conversion of the data into a common data format and/or employing additional data processing techniques. Processing data from different sources can be cumbersome and time-consuming to a user such that by the time the data is processed in its entirety, the data is out-of-date and/or invalid. To illustrate, consider computer-based data sources that capture millions of events per second (e.g., constantly changing business information, data exchanges between devices, real-time data logs, etc.). The volume of this data coupled with a user manually converting the various data formats becomes a formidable problem. As another example, consider non-traditional databases that can be accessed, such as databases configured to address large amounts of structured and unstructured data. These types of non-traditional databases can accommodate large amounts of data that are less predictable in structure/formatting (e.g., inconsistent data structures), thus complicating how data is accessed and processed.

Computer-based data sources further compound this issue by capturing not only a data point and/or event, but additional characteristics about the data point, such as number-based characteristics, string-based characteristics, date-based characteristics, time-based characteristics, location-based characteristics, etc. In various scenarios, the characteristics are expressed in different formats from one another. Accordingly, the volume of data accumulated by an organization from varying computer-based data sources, the speed at which the computer-based data is accumulated, as well as the differing formats in which the data can be stored, makes extracting accurate, current, and reliable insights from the data manually by a user insurmountable and difficult.

Techniques described herein provide automated generation of a narrated analytics playlist. Various implementations curate data from multiple data sources, where curating the data includes identifying attributes and relational data models. One or more implementations base the curating upon anecdotal data associated with a user. In response to receiving a trigger event to perform a query analysis, one or more implementations identify keywords to use in the query analysis, and extract information from the curated data based, at least in part on the one or more keywords. The extracted information is then analyzed to identify insights. In turn, one or more implementations generate a narrated analytics playlist using the insights. Some implementations utilize machine-learning algorithms to curate, extract and/or process data to generate insights. Various implementations abstract the data used to teach the machine-learning algorithms and share the abstracted data to other devices.

Consider now an example environment in which various aspects as described herein can be employed.

Example Environment

FIG. 1 illustrates an example environment 100 that includes an example system that can be used to generate narrated analytics playlists in accordance with one or more implementations. Environment 100 includes server(s) 102 and computing device 104 that, in concert, provide personalized analytics directed towards a particular user profile and/or workspace, such as a narrated analytics playlist. While computing device 104 is illustrated here as a desktop computing device, any other suitable type of computing device can be utilized, such as a mobile phone, a tablet, a laptop, a smart watch, and so forth. Here, the terminology "personalized analytics" is used to denote output information that is generated from a combination of input data and user information. For example, the personalized analytics can include various types of output information (e.g., text, charts, graphs, tables, narrated text, narrated audio, animated video, podcasts, playlists with audio, slides, and so forth) that are based upon user anecdotal data, user preferences, user calendar information, user-defined schedules, etc.

Servers 102 include personalized analytics module 106 that acquires data, processes the data to curate the acquired data, generates queries for various types of analytics, generates video playlists, generates a natural language narration for the playlists, determines what analytics to include within the playlist, and so forth. Computing device 104 includes client analytics module 108 to access personalized analytics module 106 and/or various features provided by the personalized analytic module 106. Generally, the term module is used to denote any combination of software, hardware, and/or firmware that can be configured to provide the corresponding functionality such that personalized analytics module 106 and/or client analytics module 108 can be implemented using any of these combinations. In various implementations, client analytics module 108 corresponds to a client application that renders a user interface on a corresponding display device of computing device 104, and communicates over a network to a server application, such as personalized analytics module 106. Alternately or additionally, client analytics module 108 represents a stand-alone application that includes the functionality of personalized analytics module 106 onto a same device. In one or more implementations, servers 102 represents server(s) that distribute various aspects of the personalized analytics module across the multiple devices and/or provide cloud-based services to multiple client devices. Utilizing cloud-based services to deploy narrated analytic playlists and/or the generation of narrated analytic playlists provides a user with on-demand self-service access to the personalized analytics system, broad network access to the personalized analytics system, resource pooling across the cloud, rapid elasticity and/or adaptiveness to a user's changing operating environment, and measured service.

Here, the phrase "cloud-based services" is used to generally to denote any suitable type of cloud-based service and/or deployment mechanism across a network, such as cloud-based services that follow, by way of example and not of limitation, a Software as a Service (SaaS) model, a Platform as a Service (PaaS) model, an Infrastructure as a Service (IaaS) model, and so forth. Accordingly, the various implementations described herein can be deployed and/or implemented using any one or combination of these models to provide various aspects of narrated analytic playlists. As an example, various implementations can deploy narrated analytics playlists and/or the generation of narrated analytic playlists using a private cloud that is specific to an organization, a community cloud that is shared across several organizations, a public cloud that is available to the general public, a hybrid cloud that is a composition of different cloud models to enable data and application portability, and so forth. In some scenarios, the differing cloud-based services utilize different types of stack architectures that employ multiple interconnected layers (e.g., application layers, networking layers, workload layers, hardware layers, software layers, management layers, virtualization layers, etc.). Various implementations can integrate aspects of the personalized analytics system into any one and/or combination of layers utilized by the cloud-based services. To illustrate, one or more of the various components and/or modules further described herein can be communicatively coupled to a workload layer of a cloud computing environment to distribute the corresponding processing, such as transaction processing, software development, data analytics processing, mapping processing, navigation processing, etc.

Personalized analytics module 106 includes curation engine module 110, parser module 112, query magnifier module 114, insight engine module 116, story narrator module 118, animator module 120, and proximity platform 122 that work in concert to provide personalized analytics in accordance with one or more implementations. Some combinations of these modules communicate with one another to exchange information, such as by defining data structures according to a set of rules to provide a mechanism for cross-entity data sharing, as well as predictable and repeatable processing by the different entities, to achieve expected results. For example, the set of rules can outline what type of information the data included in the data structure describes, an amount of data stored within the data structure, a format in which the data is stored within the data structure and so forth. By following these rules, a first entity can create and store a data structure such that a second entity can successfully access and interpret the data included in the data structure. A data structure can include any suitable type of structure in which data can be stored, defined, and/or retrieved, such as an array, a string, a container, a list, a stack, a queue, a tree, a graph, a heap, a bit field, a bitmap, an object, a matrix, a linked-list, function parameters, a file, and so forth. Alternately or additionally, other rules can be employed that define a behavior of the personalized analytics module, such as rules that determine a prioritization of the data sources used to acquire curated data, rules that determine data manipulation based on a desired operation, condition-based rules, validation-based rules, mapping rules that can be used to translate a first data structure to a second data structure, and so forth.

Curation engine module 110 acquires information about data, such as various attributes associated with the data, and generates metadata to retain and describe the acquired attributes and/or information. Any suitable type of data can be analyzed by curation engine module 110, such as user calendars, organization databases, user workspaces, podcast interactions, video interactions, user interface interactions, queries, enterprise data, enterprise applications, existing reports, user activities, user preferences, user dislikes, and so forth. Accordingly, servers 102 includes databases 124 to generally represent any suitable source of data and/or information. Alternately or additionally, databases 124 represent storage for data generated by the personalized analytics module, such as curated data. Some implementations trigger the curation and/or acquisition of the information based upon a user query, a scheduled query, an automated query, a calendar item identified during a scheduled query, an identified idle period, and so forth. To illustrate, a user query pertains to an explicit input query entered at an interface of the personalized analytics system, such as through a text box. A scheduled query pertains to a scheduled and/or delayed query that triggers queries based on a schedule, either as a one-time query, a periodic-query, and so forth. An automated query pertains to a query that is triggered by the personalized analytics module identifying an event and/or without an explicit input associated with a query, such as a query triggered on a scan of a calendar event, keyword identification from communication content (e.g., email, text messages, instant messages, etc.), and so forth. Accordingly, data curation can be triggered in multiple different ways. The curation of data can alternately or additionally include generating drill path content. Here, drill path content corresponds to additional and/or secondary information associated with the primary topic of the data being curated, such as time-based information, location-based information, product-based information, etc. Accordingly, a drill-up path corresponds to a higher-level perspective of the primary topic associated with the data, such as comparison charts with associated sibling topics, to provide contextual information about the primary topic. A drill-down path corresponds to a lower-level/additional detailed information about the primary topic, such as specific points in time, location, demographics, etc.

As part of the curation process, some implementations identify additional and/or similar vocabulary associated with curated information, such as alternate wording that corresponds to the primary topic being curated. The alternate wording can then be used to acquire additional information that is then included and/or referenced in the metadata. In various scenarios, curation engine module 110 curates data by applying machine learning algorithms, data mining algorithms, and/or Principal Component Analysis (PCA) algorithms to identify data relationships between the acquired and/or curated data. For example, the curation engine module 110 can utilize machine-learning algorithms and/or portions of machine-learning algorithms to label sets of data, compare sets of data for similarities, group sets of data based on the similarities, and so forth. To illustrate, some implementations utilize similarity comparison algorithms to compare similarity scores between various subsets of data. However, it is to be appreciated that alternate or additional algorithms can be utilized as well, such as those further described herein with respect to at least the insight engine module 1114.

In various implementations, the curation engine module 110 employs an iterative process to curate the data. Overtime, as more data is curated and analyzed, the iterative process updates corresponding metadata, data models, drill-down activities, and so forth, generated by the curation engine module 110, such as improved relevancy metric of the associated data, improving relational data, etc. In turn, these updates make data extraction, data access, and/or data analysis associated with the curated data more efficient relative to earlier versions of the curated data, thus improving the system's overall operation (e.g., faster access, more accurate data extraction, faster data analysis, etc.). Accordingly, various implementations of the curation engine module 110 update the curated data and/or the corresponding metadata to reflect various findings from iterative analyses. In some implementations, the curation engine module 110 generates relational data models based on the curated data, and then stores the curated data in a database, such as in databases 124, according to the relational data models. Alternately or additionally, the curation engine module 110 utilizes machine-learning algorithms to identify what data sets are accessed and/or utilized more relative to other data sets, and prioritizes the data sets based upon the respective usage. In turn, the curation engine module 110 uses this prioritization to govern how the data sets are updated, such as by updating the higher priority data sets more frequently relative to other data sets, updating the higher priority data sets ahead of other data sets, updating the curated data based upon a prioritization of the databases and/or data sources, etc. This can improve how a corresponding computing device performs by updating the curated data that is utilized more, rather than adding a latency by updating less used and/or obscure data.

Parser module 112 receives an input query, and analyzes the input query to identify keywords and/or context information associated with the query. In various implementations, the parser module analyzes an input string associated with the input query to generate a canonical query (e.g., a query that includes identifying information, such as tags, keyword identification information, etc.). For example, the parser module can tag and tokenize the input string as further described herein.

Query magnifier module 114 receives the canonical query, and augments the query with supplemental information, alternate wording, and/or additional query subject matter. For instance, in some implementations, the query magnifier module generates multiple versions of the input query that reflect variations of a particular keyword, include user preferences, add related subject matter, additional context parameters, and so forth, to use to extract information from the curated data. To illustrate, consider a scenario in which a user manually submits an input query string to the personalized analytics system. In turn, the query magnifier module generates variations of the query, such as queries with alternate keywords, queries with related topics, queries with time constraints, etc., that can be utilized to extract information from the curated data. This can include using anecdotal data associated with a user profile to generate the variations of the query.

Insight engine module 116 uses the various queries generated by the query magnifier module to extract curated information. The insight engine module then analyzes the extracted data to identify insights relevant to a particular user profile, organization profile, and/so forth. This can include utilizing machine-learning algorithms to make predictions from the extracted data, identify trends, identify patterns, generate insights from the trends and/or patterns, and so forth. Here, an insight pertains to factual information identified from the data (e.g., plain inferences of the data for a particular need) and/or inferred information identified from the data (e.g., outliers, anomalies, trends, indicators, market segmentations, etc.). As one example, consider a scenario in which the answer to an input query of "what did orange juice sales do this month" is "sales for orange juice went down". An example insight generated by the personalized analytics system extrapolates on that input query by providing factual information that can provide more context about the result, such as "apple juice sales doubled over the same time period" or "the highest orange juice sales occurred in Alaska". Various implementations of the insight engine module apply machine-learning algorithms and/or models to determine the insights and/or combine the results of multiple data extractions into insights that are used as a basis for generating a narrated analytics playlist. This can include using and adjusting hyper-parameters associated with the machine-learning algorithms, such as that further described herein with respect to at least FIG. 15.

Story narrator module 118 receives an output from the insight engine module 116, and determines how to describe and/or articulate the output. As one example, in response to receiving an insight from the insight engine that corresponds to chartable data, story narrator module 118 determines to include a chart and a descriptive narrative of the chart within the narrated analytics playlist. In various scenarios, the descriptive narrative not only describes the information include in the chart, but alternately or additionally provides contextual information that helps drive an interpretation of the chart information. As one skilled in the art will appreciate, various implementations utilize a story generator algorithm to generate the descriptive narrative. Accordingly, as further described herein, such as with respect to at least FIGS. 11 and 16, story narrator module 118 identifies how to augment the insights identified by the insight engine module with additional information, such as visual information (e.g., charts, graphs, etc.), descriptive information, markup language information, metadata additions to the narrated analytics playlist, audible information, etc., such as by generating a script that outlines and/or includes this information.

Animator module 120 generates a narrated analytics playlist based on one or more scripts received from the story narrator module. Animator module 120 bundles visual and audible information into a playlist, such as by generating synthesized speech from descriptive narrative information generated by the story narrator module, identifying images to add to the playlist, etc. The animator module can generate any suitable type of a narrated analytics playlist with any suitable type of data, such as a slide presentation, a video clip, audible data, visual data, metadata, markup text, and so forth.

Figure 20A:
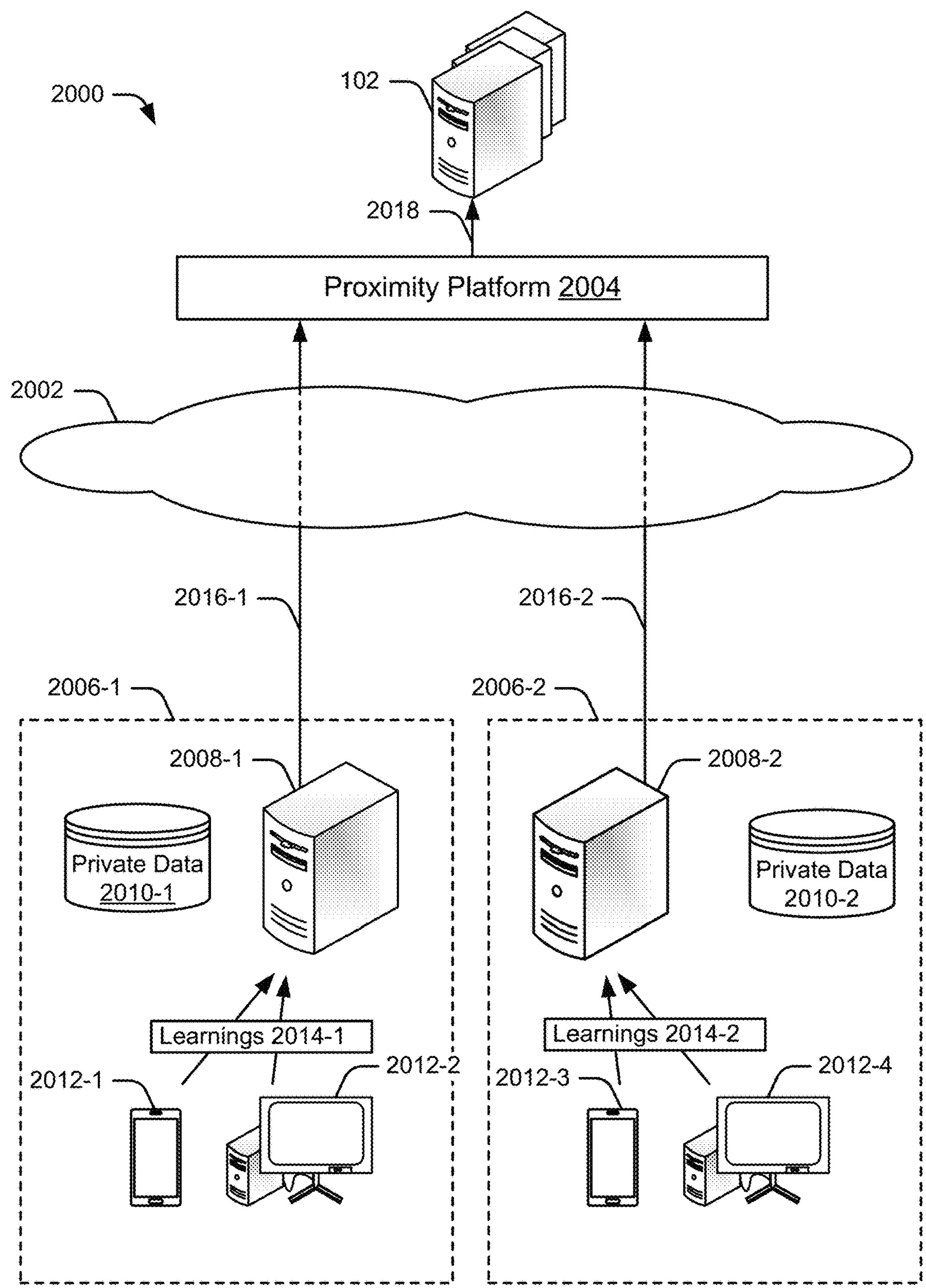
FIGS. 20A and 20B illustrate an example of a proximity platform in accordance with one or more implementations.
Figure 20B:
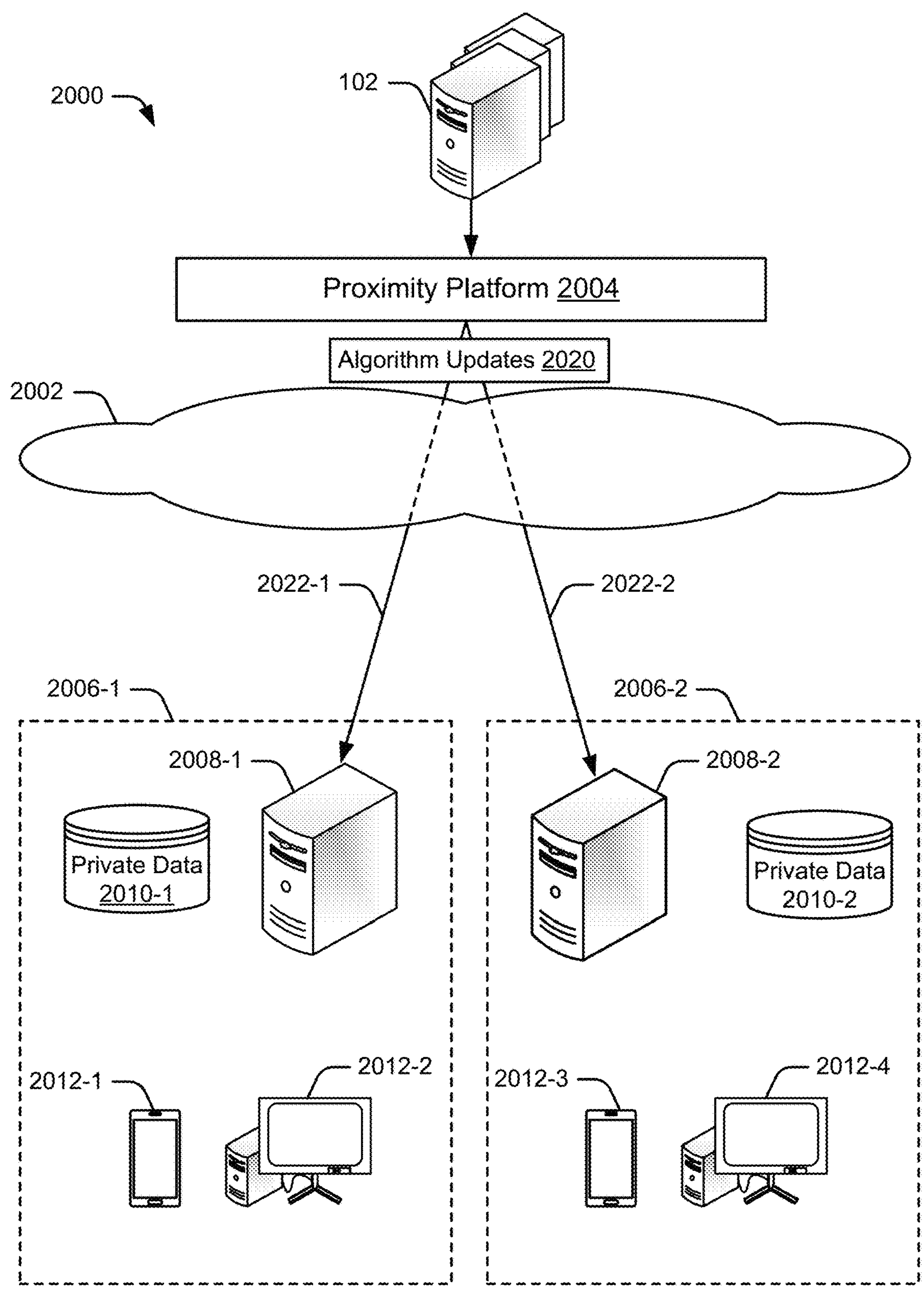

Proximity platform 122 provides data abstraction to enable personalized analytics module 106 to apply learned information from various sources to other sources without exposing the source-specific data that contributed to the learning, such as by using techniques described with respect to at least FIGS. 20A and 20B. As an example, consider a scenario in which personalized analytics module 106 supports multiple computing devices, each of which is associated with a respective customer organization. Accordingly, each respective user profile has private data curation, private relational data models, and so forth, which is used to enhance and/or educate various machine-learning algorithms. Various implementations of proximity platform 122 extract the respective machine learning information, model updates and the model parameters and/or anecdotal data from each respective user profile without accessing the private curated data and relational data models. As one example, proximity platform 122 extracts the hyper-parameters used by the various machine-learning algorithms employed by personalized analytics module 106 of FIG. 1 for a first client device, and apply the hyper-parameters to a second client device using transfer learning methods. Alternately or additionally, proximity platform 122 extracts anecdotal information from the first client device, and utilizes the anecdotal information at the second client device. As further described herein at least with respect to FIGS. 20A and 20B, this allows the proximity platform 122 to incorporate machine-learning information and/or anecdotal data into the personalized analytics system, such as by way of extracting and sharing hyper-parameters, thus modifying the system behavior based upon the learned information and improving how results are generated and/or delivered to other computing devices accessing the system without exposing the curated data of the first client device.

Servers 102 also include communication module 126 to communicate with external devices. Here, communication module 126 generally represents any suitable combination of hardware, software, and/or firmware that are configurable to facilitate the exchange of information, such as images, addresses, audio, video, commands, queries, messaging, narrated analytics playlists, and so forth. Some implementations of communication module 126 include one or more protocol stacks associated with a network over which data is exchanged, firmware that drives hardware to generate signals and/or process messages used in maintaining a wireless and/or wired communication session, etc. Alternately or additionally, some implementations of communication module 126 include computer networking ports, such as a Transmission Control Protocol (TCP) port, a User Datagram Protocol (UDP) port, a File Transfer Protocol (FTP) port, a Hypertext Transfer Protocol (HTTP) port, an Internet Message Access Protocol (IMAP) port, and so forth. Various implementations of communication module 126 include physical communication ports, such as a serial port, a parallel port, a Universal Serial Bus (USB) port, a keyboard port, a display port, an audio port, etc. In various implementations, servers 102 use communication module 126 to connect with other devices over communication cloud 128, such as computing device 104.

Communication cloud 128 generally represents any suitable type of communication network that facilitates a bi-directional link between various computing devices. Accordingly, communication cloud 128 can include multiple interconnected communication networks that comprise a plurality of interconnected elements, such as a wireless local area network (WLAN) with Ethernet access, a wireless telecommunication network interconnected with the Internet, a wireless (Wi-Fi) access point connected to the Internet, an Internet of Things (IoT) network, and so forth. In this example, communication cloud 128 connects servers 102 with computing device 104.

Computing device 104 includes client analytics module 108 that generally represents user access some or all of the functionality provided by personalized analytics module 106. In some implementations, client analytics module 108 represents a stand-alone client application that interfaces into personalized analytics module 106. Alternately or additionally, client analytics module 108 represents a browser that remotely logs onto a website hosted by servers 102. Further, while client analytics module 108 and personalized analytics module 106 are illustrated as residing on separate devices, some implementations combine some or all the respective module functionality into a single computing device as further described herein. In various implementations, computing device 104 uses client analytics module 108 to access cloud-based services provided by servers 102 to obtain narrated analytics playlists as further described herein. In this example, client analytics module 108 includes user interface module 130 to provide user access into features provided by personalized analytics system, such as playback of a narrated analytics playlist, inputting a search query, providing user feedback, requesting reports, accessing a dashboard and/or corresponding reports, scheduling data curation, scheduling data analysis, adding databases for data curation, and so forth. Client analytics module 108 also includes playback module 132. While illustrated here as being separate from user interface module 130, alternate or additional implementations integrate playback module 132 with user interface module 130 without departing from the scope of the claimed subject matter.

Playback module 132 receives a narrated analytics playlist, and outputs the content for consumption. This can include playing out audio, rendering video and/or images, displaying text-based content, and so forth. As one example, a user can interact with a particular narrated analytics playlist via controls displayed by playback module 132, such as pausing playback, skipping content in the playlist, requesting drill-up content and/or drill-down content, inputting a search query during playback of content, etc. In various implementations, the playback module includes feedback controls, such as controls corresponding to giving explicit positive feedback and/or explicit negative feedback of the content being played out at a particular point in time.

Computing device 104 also includes communication module 134 to facilitate communications over communication cloud 128. As one example, computing device 104 can use communication module 134 to communicate with personalized analytics module 106. Accordingly, similar to that described with respect to communication module 126, communication module 134 generally represents any suitable combination of hardware, software, and/or firmware that is configurable to facilitate data exchanges with other devices.

Figure 2:
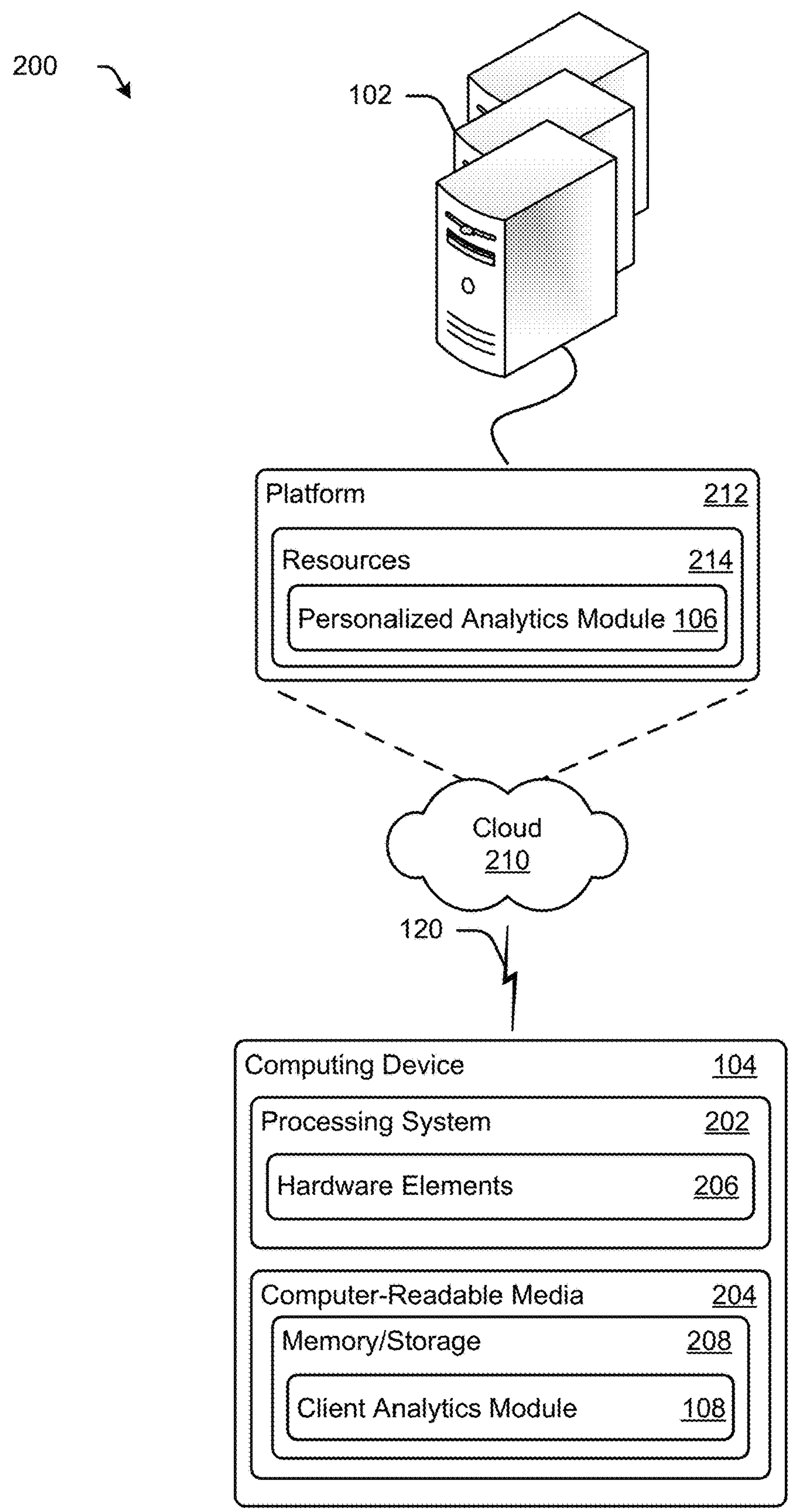
FIG. 2 illustrates an example environment in which cloud-based services can be used to provide features corresponding to the automated generation of narrated analytics playlists in accordance with one or more implementations.

Consider now FIG. 2 that illustrates an example environment 200 in accordance with one or more implementations. In various implementations, the example described with respect to FIG. 2 can be considered a continuation of the example described with respect to FIG. 1.

Environment 200 includes servers 102, computing device 104, and communication cloud 128 of FIG. 1, where computing device 104 includes a processing system 202, and one or more computer-readable media 204. Processing system 202 is representative of functionality to perform one or more operations using hardware. Accordingly, the processing system 202 is illustrated as including hardware elements 206 that may be configured as processors, functional blocks, and so forth. This may include implementation in hardware as an application specific integrated circuit or other logic device formed using one or more semiconductors. The hardware elements 206 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 204 is illustrated as including memory/storage 208. The memory/storage 208 represents memory/storage capacity associated with one or more computer-readable media. The memory/storage 208 may include volatile media (such as random-access memory (RAM)) and/or nonvolatile media (such as read only memory (ROM), Flash memory, optical disks, magnetic disks, and so forth). The memory/storage 208 may include fixed media (e.g., RAM, ROM, a fixed hard drive, and so on) as well as removable media (e.g., Flash memory, a removable hard drive, an optical disc, and so forth). The computer-readable media 204 may be configured in a variety of other ways as further described below. Here, client analytics module 108 of FIG. 1 is illustrated as residing within memory/storage 208, but alternate or additional implementations implement client analytics module 108 using combinations of firmware, hardware, and/or software without departing from the scope of the claimed subject matter, such as hardware elements 206.

Example environment 200 enables multiple devices to be interconnected through servers 102, where servers 102 can be local to the multiple devices, remote from the multiple devices, or any combination thereof. In one or more implementations, servers 102 are configured as a cloud of one or more server computers that are connected to the multiple devices through a network, the Internet, or other data communication link. This interconnected architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In various implementations, the interconnected architecture allows the personalized analytics system to increase a quality of a service by implementing workload management optimizations or recommendations based on observed data, performing dynamic operations on different servers (e.g., curating data on a first server and analyzing curated data on a second server), basing the dynamic operations on a flow of requests through the system to offload work to idle servers, etc.

Alternately or additionally, the interconnected architecture allows the personalized analytics system to scale and/or manage resources to optimally tailor experiences to all client devices receiving cloud-based services. Here, "optimally tailor experiences" denotes the personalized analytics system balancing how the cloud-based services are provided to each client device based on meeting the needs of each client device using the resources available through the cloud. In at least one embodiment, a class of target devices is created and experiences are tailored to the generic class of devices. A class of devices may be defined by physical features, types of usage, or other common characteristics of the devices. In various implementations, scaling and/or managing the resources includes measuring the available resources of the personalized analytics system to make a determination on how to distribute the resources. For example, a number of high-volume data transactions occurring at a given point in time can add higher volumes of input into the personalized analytics system, which can affect the performance of any single server included in the personalized analytics system. By measuring performance indicators, such as storage usage, network bandwidth, memory usage, and so forth, the personalized analytics system can determine to add resources to support data curation, relational data modeling, insight analysis and/or generation, query augmentation, parameter extraction and distribution, playlist generation, etc. Various implementations utilize a workload layer of the cloud-based services to provide functionality of the personalized analytics system, such as mapping operations, transaction processing operations, data curation operations, query magnifications and/or augmentations, story augmentation, anecdotal information collection, insight analysis and/or generation, machine-learning parameter extraction and/or distribution, etc.

The cloud 210 includes and/or is representative of a platform 212 for resources 214. The platform 212 abstracts underlying functionality of hardware (e.g., servers) and software resources of the cloud 210. Resources 214 may include applications and/or data that can be utilized while computer processing is executed on servers that are remote from the computing device 104. For example, resources 214 can include personalized analytics module 106 of FIG. 1.

The platform 212 may abstract resources and functions to connect computing device 104 with other computing devices. The platform 212 may also serve to abstract scaling of resources to provide a corresponding level of scale to encountered demand for the resources 214 that are implemented via the platform 212. Accordingly, in an interconnected device embodiment, implementation of functionality described herein may be distributed throughout the system. For example, the functionality may be implemented in part on the computing device 104 as well as via the platform 212 that abstracts the functionality of the cloud 210.

Having described example operating environments in which various aspects of narrated analytics playlists can be implemented, consider now a discussion of generating narrated analytics playlists in accordance with one or more implementations.

Narrated Analytics Playlists

Data mining examines data to identify various types of information, such as anomalies, patterns, trends, etc. The process of mining data can involve accessing one or more data sources in a particular manner to extract the desired information. To illustrate, a database can be programmatically accessed to return an average value, a weighted sum, a maximum value in a numeric sequence, sorted data, etc. As the complexity of the requested information increases, so, too, does the access to the database. Accordingly, data mining can be difficult for users who are not knowledgeable on how to locate and/or extract the desired information. For instance, a business person who desires sales trend information for a particular product may not understand the schema and/or interfaces employed by a database storing the corresponding data.

As another complication, the information extracted by data mining can sometimes lose context data that helps the user understand the information. For instance, in generating a sales trend chart from data, the sales chart may indicate a downward sales trend for a particular region, and lose context data that indicates the downward sales trend for that particular region is a minimal relative to other regions. Thus, the loss of context data can adversely impact how the information generated by data mining is interpreted. The ability to extract information, as well as interpret the extracted data, is further compounded when large volumes of data from varying sources are used, thus making manual processing cumbersome and/or insurmountable to various users.

As further described herein, computer-based resources compile large quantities of data in varying formats and at accelerated rates that a human is incapable of compiling manually. This makes processing the computer-based data by a user infeasible, since a user processing the data would be time-consuming and/or impossible to complete. Further, if a user simply processed a portion of the computer-based data, this creates potentially out-of-date, inaccurate, and/or misleading results since not all data points are considered. Accordingly, the volume of computer-based data accumulated by an organization from varying data sources, the speed at which data is accumulated by these data sources, as well as the differing formats in which the data can be stored, makes extracting accurate, current, and reliable insights from the data by a user insurmountable and difficult.

Techniques described herein provide automated generation of narrated analytics playlists. Various implementations curate data from various data sources, where curating the data includes identifying attributes and relational data models. One or more implementations base the curating upon anecdotal data associated with a user profile. In response to receiving a trigger event to perform a query analysis, one or more implementations identify keywords to use in the query analysis, and extract information from the curated data based, at least in part on the one or more keywords. The extracted information is then analyzed to identify one or more insights. In turn, one or more implementations generate a narrated analytics playlist using the one or more insights.

Figure 3:
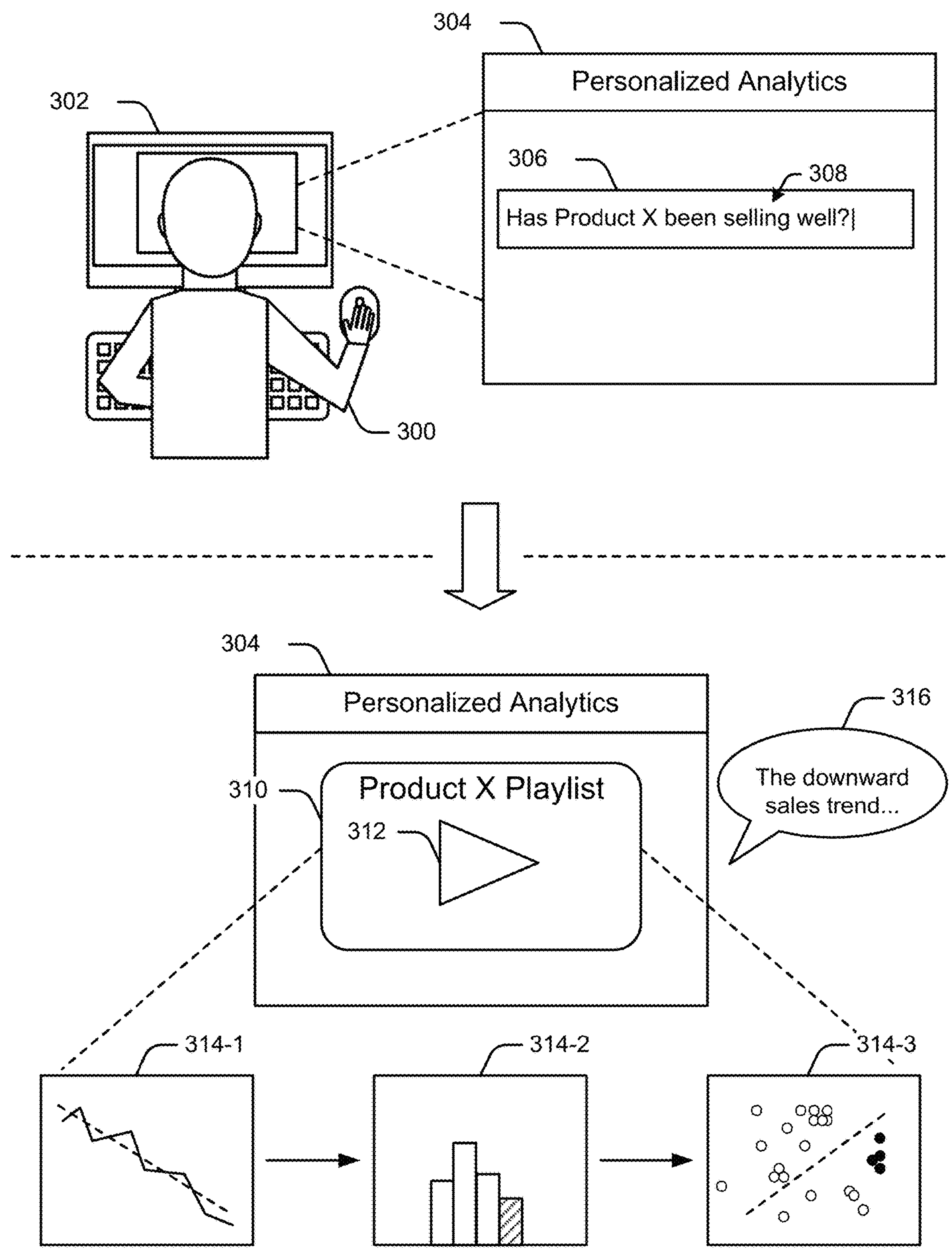
FIG. 3 illustrates an example of generating a narrated analytics playlist in accordance with one or more implementations.

To demonstrate, consider now FIG. 3 that illustrates an example of generating a narrated analytics playlist in accordance with one or more implementations. In various scenarios, the example described with respect to FIG. 3 can be considered a continuation of one or more examples described with respect to FIGS. 1 and 2. FIG. 3 illustrates an example progression of events over an arbitrary time period. Here, the progression begins in the upper portion of FIG. 3 and then moves to the lower portion of FIG. 3. It is to be appreciated that the progression of events described with respect to FIG. 3 is for discussion purposes, and that any other ordering, omission, and/or addition to the events can occur without departing from the scope of the claimed subject matter.

The upper portion of FIG. 3 includes user 300 that accesses a personalized analytics system using computing device 302. While computing device 302 is illustrated here as a desktop computer, other types of computing devices include a mobile phone, a tablet, a laptop, a smart watch, a home assistant device, and so forth. In various implementations, user 300 log onto the personalized analytics system using a specific identification and password that distinguishes a particular workspace associated with user 300 from other workspaces, such as through an account associated with a particular user profile and/or workspace. To illustrate, the user can create single or multiple workspaces, where each workspace has a specific identification and password that can be used to identify the respective workspace and/or interactions with the respective workspace. In turn, logging onto the system with the specific identification and password accesses the corresponding workspace. It is to be appreciated that user 300 can access the personalized analytics system in any suitable manner, such as through a web browser that accesses a remote server, through a client application that communicates with a server application over a network, a stand-alone application, etc.

As user 300 interacts with the personalized analytics system, some implementations collect anecdotal data about the user and/or the user's various interactions, such as user location information, user preferences, user preferred queries, last known user interaction, user preferred product information, user preferred insight information, and so forth. In turn, the collected anecdotal data can be stored and/or associated with the particular workspace and/or user profile. When the particular workspace becomes the active workspace, the personalized analytics system uses the corresponding anecdotal data to generate insights and/or narrated analytics playlists directed to the particular user profile and/or particular workspace. This can include using the anecdotal data to determine how to represent the insights when incorporating the insights into a narrated analytics playlist, a language style to use, types of content to include in the playlist (e.g., preferred content associated with the user profile, content relevant to an associated organization profile, content relevant to an associated job, etc.).

Some implementations share anecdotal data across multiple workspaces, such as workspaces identified as being associated with a same user and/or same user profile. For instance, the personalized analytics system can collect anecdotal data for the same user profile across multiple workspaces, and use the anecdotal data in each respective workspace of the user profile. Collecting and/or generating the anecdotal data can be achieved in any suitable manner. As one example, various implementations collect user interactions with the personalized analytics system, and then process the user interactions using predictor functions, machine-learned algorithms, etc., to determine the user's affinities. To illustrate, the personalized analytics system can gather data points corresponding to user interactions with various types of charts displayed by the system, and feed the data points to a machine-learning algorithm to determine that the user has an affinity towards pie charts, dislikes bar charts, and so forth. Any suitable type of machine-learning algorithm can be utilized, such as collaborative filtering algorithms, object ranking algorithms, label ranking, instance ranking, and so forth. Some of the machine learning modules utilized employ supervised learning techniques that train a machine-learning algorithm with background knowledge, and then feed the observed data points into the machine-learning algorithm as a way to identify these affinities. The training, as well as iterative updating of the machine-learning algorithms as new data is processed, improve the efficiency of the algorithms to converge on a result faster over time. Thus, utilizing machine-learning algorithms improves the execution times of a corresponding computing device and/or personalized analytics system. Portions of the machine-learning algorithm can be distributed within the personalized analytics system to improve the system response time, such as through the use of a workload layer of a cloud-based service. Alternately or additionally, portions of the algorithm can be run locally on a user device to improve response time by minimizing data transfer between the user device and a cloud-based service. It is to be appreciated that the examples described here are for illustrative purposes, and other types of machine-learning algorithms and/or distribution methods can be utilized without departing from the scope of the claimed subject matter, such as preference elicitation models, multiple-criteria decision analysis models, statistic-based predictive models, and so forth.

In FIG. 3, the personalized analytics system displays, by way of computing device 302, user interface 304 that includes an interactive control in the form of search box 306. In turn, user 300 enters an input search query 308 that triggers a query analysis as further described herein. While the example described with respect to FIG. 3 generally illustrates a search box, other types of interfaces can be utilized to access and input search queries to the personalized analytics system, such as a search box at a stand-alone application and/or web-application, a search box via a web browser interface, a microphone communicatively coupled to computing device 302 and/or a home assistant device to receive audible input, a camera communicatively coupled to computing device 302 and/or a home assistant device to receive video input, etc. Various implementations of the personalized analytics provide time information associated with how long the query analysis process will take (e.g., how long until a result is returned by the personalized analytics system). This can occur automatically and/or in response to the personalized analytics system receiving input that requests the time information.

Moving to the lower portion of FIG. 3, and in response to receiving input search query 308, user interface 304 displays a narrated analytics playlist 310 generated by the personalized analytics system. In one or more implementations, the narrated analytics playlist 310 is output via playback module 132 of FIG. 1. Narrated analytics playlist 310 includes various insights identified by the personalized analytics system that are based off of input search query 308 and/or anecdotal data associated with a user profile and/or workspace associated with user 300.

User interface 304 includes playback control 312 that can be actuated to initiate playback of narrated analytics playlist 310. Here, narrated analytics playlist 310 includes a series of images in a video format, further illustrated here as image 314-1, image 314-2, and image 314-3, respectively, to show the progression of images and/or audio. Accordingly, narrated analytics playlist 310 includes audible output 316 that corresponds to a narrated description of the content rendered in images 314-1 through 314-3. Each respective image of the playlist (e.g., images 314-1 through 314-3) corresponds to an insight identified by the personalized analytics system. Various implementations include supplemental information and/or insights within the narrated analytics playlist, such as drill-up information, drill-down information, location-based information, time-based information, product-based information, etc. Alternately or additionally, the playback module renders controls that can be actuated to initiate the generation of the supplemental information using data included in the narrated analytics playlist. In other words, the personalized analytics system provides user 300 with not only the requested information associated with input search query 308, but additionally identifies supplemental information and/or provides the user with an ability to generate the supplemental information, such as supplemental insights.

Figure 4:
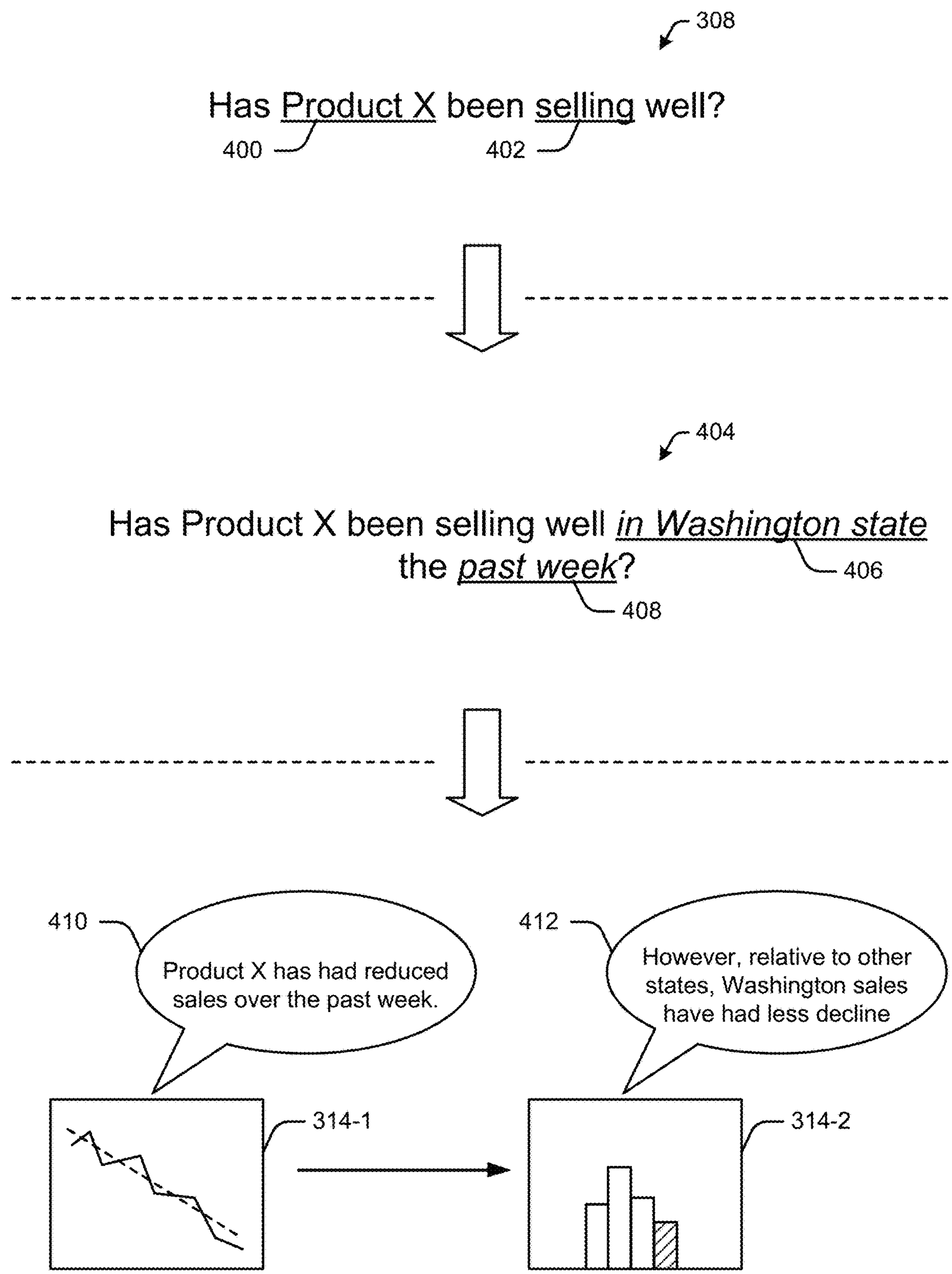
FIG. 4 illustrates an example of augmenting a query with contextual parameters in accordance with one or more implementations.

Various implementations augment queries with additional parameters scope in or add boundaries on how curated data is extracted and/or analyzed. This simplifies the complexity of inputs queries, since the personalized analytics system can process broad input queries by adding contextual parameters that help bound the request. To demonstrate, consider now FIG. 4 that illustrates adding contextual parameters to a query in accordance with one or more implementations. In various scenarios, the example described with respect to FIG. 4 can be considered a continuation of one or more examples described with respect to FIGS. 1-3. FIG. 4 illustrates an example progression of events over an arbitrary time period. Here, the progression begins in the upper portion of FIG. 4, moves to the middle portion of FIG. 4, and then progresses to the lower portion of FIG. 4. It is to be appreciated that the progression of events described with respect to FIG. 4 is for discussion purposes, and that any other ordering, omission, and/or addition to the events can occur without departing from the scope of the claimed subject matter.

The upper portion of FIG. 4 includes input search query 308 from FIG. 3. While input search query 308 includes a text-based question (e.g., has Product X been selling well?), it is to be appreciated that this is for discussion purposes and that any other combination of words, images, and/or audio can be utilized as a search query without departing from the scope of the claimed subject matter. Various implementations analyze the combination of words included in input search query 308, and determine to add contextual parameters to the query. For example, during the analysis, the personalized analytics system identifies contextual words included in the search query that correspond to topics of interest to focus an analysis on, such as through the use of natural language processing algorithms. In FIG. 4, the personalized analytics system identifies contextual word 400 (e.g., "Product X") and contextual word 402 (e.g., "selling") as topics to base a query analysis off of. While input search query 308 includes these topical words that can help direct a query analysis, the query string lacks contextual information and/or boundaries that help reduce the scope of the query, such as a time span for the sales data, a region over which to gather sales information, and so forth. Accordingly, various implementations identify contextual parameters to include in a query, such as through the use of a query magnifier module as described with respect to at least FIGS. 11 and 14.

Moving to the middle portion of FIG. 4, the personalized analytics system generates a modified query 404 that has been augmented to include contextual parameter 406 and contextual parameter 408. Here, contextual parameter 406 corresponds to location and/or region data, while contextual parameter 408 provides a time range over which to analyze data. The contextual parameters can be identified in any suitable manner, such as through the use of anecdotal data associated with a user profile and/or workspace associated with user 300. For instance, the anecdotal data of the active workspace and/or active user profile can include location information associated with user 300, sales regions assigned to user 300, a time metric of when the last sales report for Product X was generated, etc. In turn, the personalized analytics system determines contextual parameters that help bound the query used to extract curated data for analysis. While the example described with respect to FIG. 4 adds location and time contextual parameters, it is to be appreciated that other types of parameters can be included as well, such as a search history, organization information, a drill-down or drill-up path, traits corresponding to a particular product, subject domain insights, user interaction with related products, and so forth.

Moving to the lower portion of FIG. 4, playlist image 314-1 and playlist image 314-2 correspond to insights generated from the query analysis based on modified query 404. For example, image 314-1 corresponds to a sales trend over a time span corresponding to contextual parameter 408 and/or a region corresponding to contextual parameter 406. Image 314-2 corresponds to an insight associated with a comparison chart of sales in other regions relative to the one identified in contextual parameter 406, such as regions that lie on a same boundary. Adding contextual parameters to a query analysis allows the personalized analytics system to generate a result for the requested topic (e.g., image 314-1) and/or supplemental information (e.g., image 314-2) without needing to receive a second, potentially more defined, input query. To illustrate, an insight engine module, such as those discussed with respect to at least FIGS. 1, 11, and 15, uses the augmented query to extract curated data and analyze the data to generate insights and/or supplemental information as further described herein.

In FIG. 4, narration 410 describes various details about image 314-1 to provide contextual information about what the image illustrates, such as a narrative description of the charted sales over the corresponding week. Similarly, narration 412 provides a narrative description of image 314-2, such as a description that indicates the bar chart compares the sales trend for Washington State to sales trends in boundary states, and the observation that Washington State sales declined less than other states. In other words, the personalized analytics system identifies an insight corresponding to comparative sales to other states by augmenting input search query 308 using anecdotal data and without additional user input and/or user direction. While the example with respect to FIG. 4 includes a comparative sales chart based on location, it is to be appreciated that other types of insights can be identified using various machine learning algorithms, data mining algorithms, PCA algorithms, etc.

With respect to FIGS. 3 and 4, user 300 manually enters a search query into the personalized analytics system using an interactive control displayed via a user interface, where the search query is alternately referred to as a user query. In response to the user actuating the control, the personalized analytics system receives a notification of the user query trigger event, and subsequently triggers a query analysis. However, other types of events trigger events can trigger a query analysis. To further demonstrate, consider now FIGS. 5A-5C that collectively illustrate various trigger events in accordance with one or more implementations. In some scenarios, the examples described with respect to FIGS. 5A-5C can be considered a continuation of one or more examples described with respect to FIGS. 1-4.

Figure 5A:
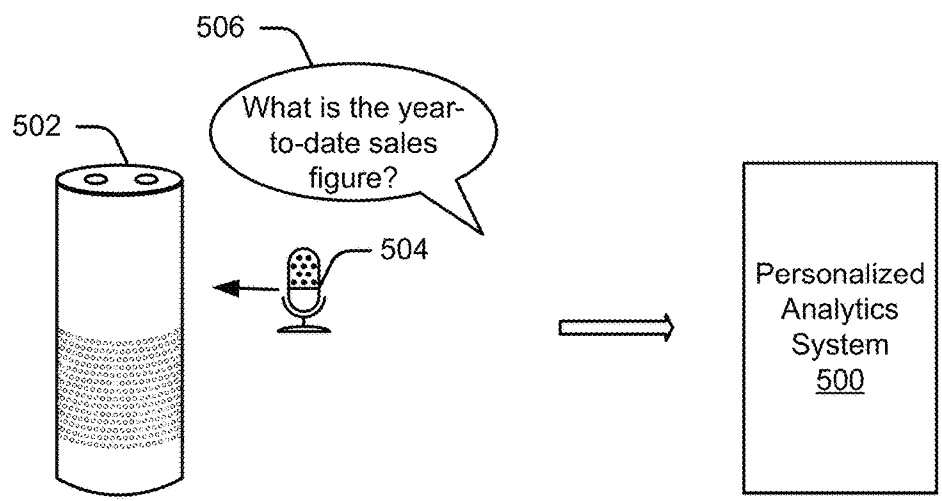
FIGS. 5A-5C illustrate various example trigger events in accordance with one or more implementations.
Figure 5A:
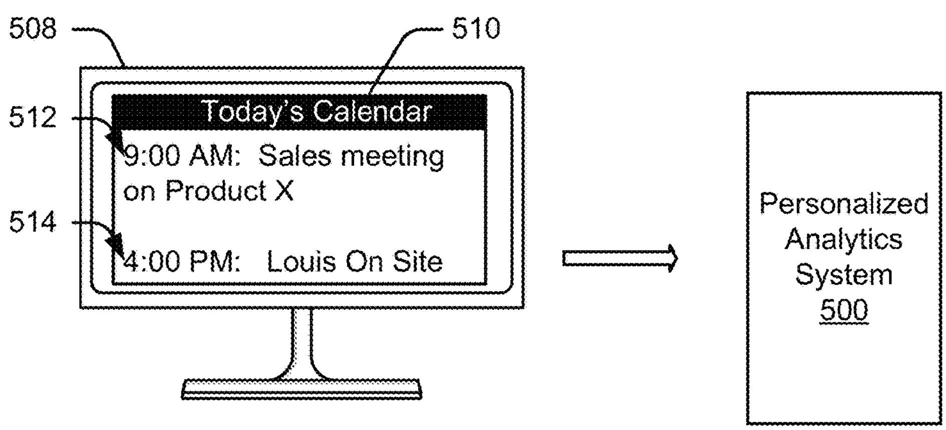

The upper portion of FIG. 5A includes a personalized analytics system 500 that, in various scenarios, is representative of the personalized analytics system described in FIG. 1, such as servers 102 and/or computing device 104. For simplicity's sake, FIGS. 5A-5C generally illustrate the personalized analytics system 500 as a black box to denote that multiple different configurations of the system can be utilized, examples of which are provided herein. The upper portion of FIG. 5A also includes home assistant device 502 that is communicatively coupled to, and/or is part of, the personalized analytics system. For example, in some scenarios, home assistant device 502 corresponds to computing device 104 of FIG. 1. Home assistant device 502 includes a microphone 504 to receive audible input trigger events associated with triggering a query analysis. Here, audible input 506 includes a query corresponding to "what is the year-to-date sales figure". In response to receiving audible input 506, the home assistant device forwards information associated with audible input 506 to the personalized analytics system 500 to trigger a query analysis, such an audio clip of audible input 506, a text conversion of the audible input, a trigger event message, etc. To illustrate, various implementations include speech-to-text algorithms that process audible input 506, and generate text-based representations of words identified via the speech-to-text algorithms. In turn, the personalized analytics system 500 receives the text-based representation and performs a search analysis, examples of which are provided herein. In other implementations, an audio clip is forwarded to the personalized analytics system 500 for processing as further described herein. Accordingly, various implementations trigger a query analysis using an audible input. While the upper portion of FIG. 5A illustrates audible support via a home assistant device, other types of devices support audible input/output as well, such as a mobile phone, a tablet, a personal computer, a smart watch, etc.

In various implementations, audible support of the personalized analytics system 500 can alternately or additionally include outputting audible prompts. To demonstrate, some implementations of home assistant device 502 output an audible prompt, such as "would you like an analysis of your helpdesk ticket queue now?" Any suitable event can trigger the output of an audible prompt, such as a threshold value being triggered (e.g., the ticket queue exceeding a predefined number of entries), a user-defined schedule, and so forth. In response to outputting the audible prompt, various implementations receive audible inputs and/or responses, such as a one-word audible reply (e.g., "Yes", "No") that triggers a query analysis based on content included in the prompt. Accordingly, various implementations include speech-to-text conversion algorithms and/or keyword extraction algorithms.

Various implementations trigger a query analysis based upon a scan of a calendar of appointments and/or a schedule. To further demonstrate, consider now the lower portion of FIG. 5A that includes personalized analytics system 500 and display device 508 that is communicatively coupled to, and/or is part of, the personalized analytics system. For example, in some scenarios, display device 508 corresponds to a display device associated with computing device 104 of FIG. 1. For simplicity's sake, the lower portion of FIG. 5A simply includes a display device, but as one skilled in the art will appreciate, various implementations drive the display of content on display device 508 via a computing device that is communicatively coupled to the display. Further, while display device 508 renders calendar information 510, it is to be appreciated that various implementations are able to scan calendar information without rendering and/or displaying the calendar information on a respective display.

In various scenarios, the personalized analytics system 500 scans calendar information 510 to identify topics and/or events of interest, such as appointments, meetings, and/or contextual words included in the appointments and/or meetings. In response to locating a topic and/or event, various implementations trigger a query analysis based upon various characteristics associated with the identified topic and/or event. For instance, calendar information 510 includes two separate events that can be used to trigger respective query analyses. Event 512 includes the contextual words "sales" and "Product X". Accordingly, in response to identifying these contextual words included in a calendar event, the personalized analytics system triggers a query analysis based upon the identified contextual words. This can include performing augmented queries based upon user information, anecdotal data, alternate wording, etc. In response to scanning event 514, the personalized analytics system identifies the word "Louis" as a contextual word based on anecdotal data that identifies Louis as a customer. In turn, the personalized analytics system automatically triggers a query analysis directed to Louis and/or any business information associated with Louis. In other words, the personalized analytics system triggers an automated query based upon the scan of the calendar information, rather than triggering the query based on explicit user input. The scan of calendar information can be initiated in any suitable manner, such as an automated scan performed by the system at system startup, in response to detecting a user logging into the system, periodically, based on a user-defined schedule, etc. Alternately or additionally, a user can manually initiate a calendar scan, such as through the actuation of a software control button. While described in the context of extracting contextual words from calendar information, alternate or additional sources can be scanned for contextual words as well, such as an Enterprise Resource Planner (ERP), Customer Relationship Management (CRM) software, Marketing Automation Platform (MAP) software, Product Information Management (PIM) software, and so forth.

Various implementations enable a user to define a schedule for triggering user-defined query analyses. To illustrate, consider now the upper portion of FIG. 5B that includes personalized analytics system 500 and display device 516. Similar to that described with respect to display device 508 FIG. 5A, display device 516 renders an example scheduler user interface for discussion purposes, but alternate implementations can trigger query analyses without the scheduler user interface being rendered. In this example, the scheduler displays two user-defined triggers schedules, where the user has defined various contextual and/or keywords to base a query analysis on and a schedule for when to perform the analysis. Here, trigger schedule 518 corresponds to a weekly analysis based on Product X, while trigger schedule 520 corresponds to a monthly analysis on Competitor Y sales. Accordingly, the personalized analytics system triggers a weekly query analysis based upon the contextual word "Product X" and a monthly query analysis based upon the contextual words "Competitor Y" and "sales". The query analysis can include augmented queries as further described herein. While not illustrated here, some implementations provide gradient results, where the personalized analytics system receives input that defines and/or adjusts an amount and/or type of information returned to a user for the query analysis, such as verbose narration, minimal narration, desired charts, desired graphs, disallowed charts, disallowed information, etc. Accordingly, various implementations trigger a query analysis using schedules and/or return gradient content based upon user-defined settings.

Figure 5B:
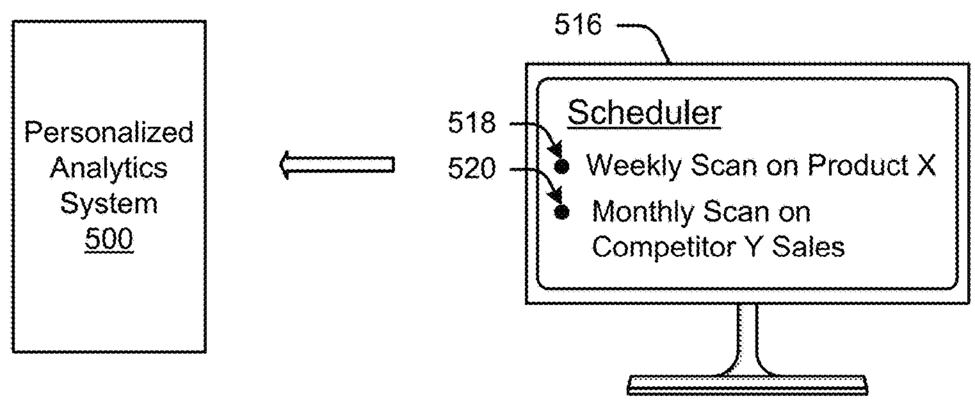
Figure 5B:
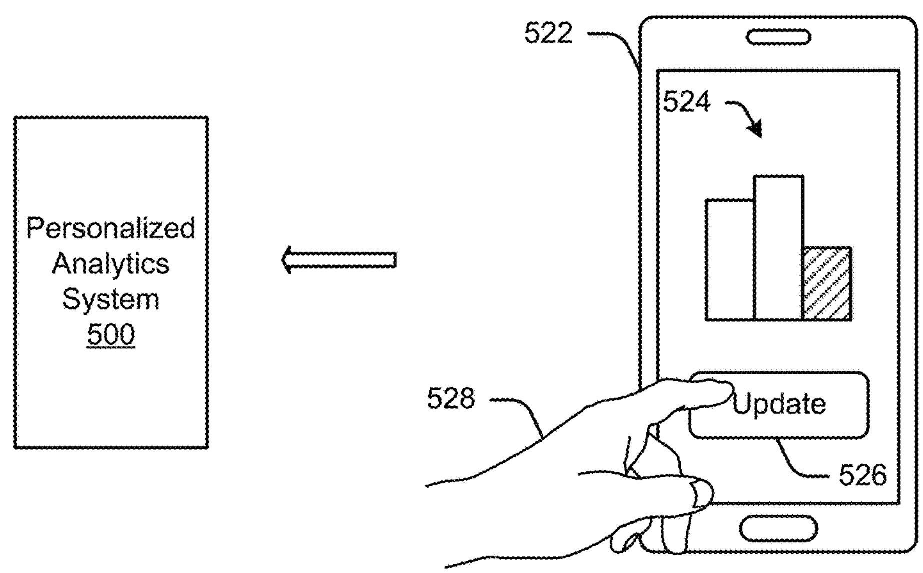

Now consider the lower portion of FIG. 5B that demonstrates another example of triggering a query analysis in accordance with one or more implementations. Here, the lower portion of FIG. 5B includes personalized analytics system 500 and mobile device 522. As in the case of home assistant device 502, display device 508, and/or display device 516, mobile device 522 can be communicatively coupled to, and/or be a part of, the personalized analytics system 500. Here, mobile device 522 displays content 524 that corresponds to information and/or an insight generated by the personalized analytics system 500. Thus, mobile device 522 is in process of outputting content corresponding to a narrated analytics playlist generated by personalized analytics system 500. In various implementations, the personalized analytics system 500 provides the ability to manually trigger a query analysis during playback of content. This is further illustrated in the lower portion of FIG. 5B, where the user interface of mobile device 522 renders control 526. In turn, user 528 actuates control 526 to trigger a query analysis associated with updating the content being currently consumed (e.g., content 524). Accordingly, the inclusion of control 526 allows for manual input that explicitly triggers the query analysis via a single user-interaction (e.g., a one-click activation).

Mobile device 522 renders control 526 during the playback of content 524, but it is to be appreciated that alternate or additional implementations provide controls and/or manual activation of a query analysis in other ways. For example, in some implementations, mobile device 522 displays a dashboard that includes multiple types of content, such as different charts and/or graphs corresponding to a same product, different charts and/or graphs where each chart or graph corresponds to a respective product, an organization chart, and so forth. Various implementations associate a control with one or all of the different types of content that can be actuated to trigger a query analysis as further described herein.

Figure 5C:
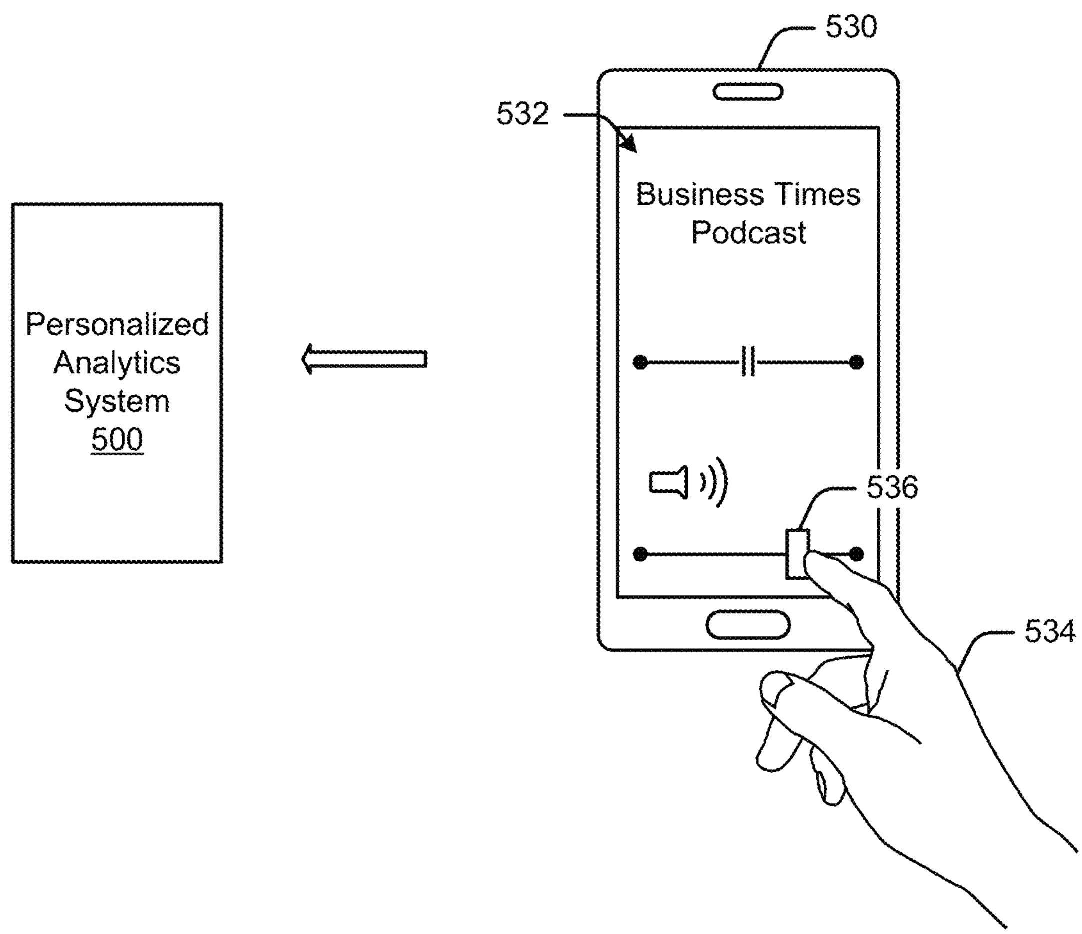

Now consider now FIG. 5C that illustrates an example of implicitly triggering a query analysis in accordance with one or more implementations. FIG. 5C includes personalized analytics system 500 and mobile device 530, where mobile device 530 is in process of playing a podcast 532. Similar to that described with respect to home assistant device 502, display device 508, display device 516, and/or mobile device 522, mobile device 530 communicatively couples to, and/or is part of, personalized analytics system 500 as further described in. Various implementations gather anecdotal data of user interactions, and implicitly trigger a query analysis based upon the anecdotal data. In other words, the personalized analytics system 500 gathers information associated with user interactions, and determines to trigger a query analysis based on interpreting the user interactions as implicit feedback.

Unlike control 526 of FIG. 5B that is explicitly dedicated to triggering a query analysis, the user interactions pertain to alternate functionality. For instance, user 534 interacts with volume control 536 at a particular point in time during the podcast to increase the volume of the audio being output. In turn, the personalized analytics system 500 collects information about the user interaction and interprets this interaction as implicit positive feedback of the content being output since the audible volume is being increased. In response to determining the user has entered implicit positive feedback, the personalized analytics system 500 identifies a topic and/or keywords associated with the feedback, and triggers a query analysis based on the identified topic and/or keywords. Thus, various implementations of the personalized analytics system 500 can trigger query analyses based off of implicit user interactions, rather than explicit user interactions as further described herein. The personalized analytics system 500 can determine the associated topic and/or keywords in any suitable manner, such as by identifying a general topic associated with the podcast, a topic being output at a point in time the implicit positive feedback is received, content being displayed on a user interface at the point in time the implicit positive feedback is received, etc.

While the personalized analytics system 500 can collect information about user interactions, various implementations alternately or additionally provide mechanisms to disable tracking user interaction and/or gathering information about the user interactions, such as through the use of software controls and/or customizable settings. This allows a user to have control over the information associated with a user profile and/or workspace, thus providing the user with privacy options. In some scenarios, the personalized analytics system 500 includes gradient privacy settings that define and/or set a level of how much information is collected, how much information is saved, what information is ignored, etc. (e.g., a first privacy level corresponding to tracking all user interactions, a second privacy level corresponding to disable tracking all user interactions, a third privacy level that tracks only user interactions with a playback module, a fourth privacy level corresponding to disabling tracking correspondences, a fifth privacy level corresponding to disabling tracking calendar appointments, etc.). To demonstrate, consider a scenario in which a client device collects and forwards information about user interactions to the personalized analytics system 500. Various implementations display a user interface at the client device that provides access to privacy settings, thus enabling a user to enter input that changes what information personalized analytics system can and cannot track. For example, the user can enter input that disables tracking all user interactions user interactions. In response to receiving the privacy setting input, the personalized analytics system 500 disables collecting information about user interactions at the client device.

Figure 6:
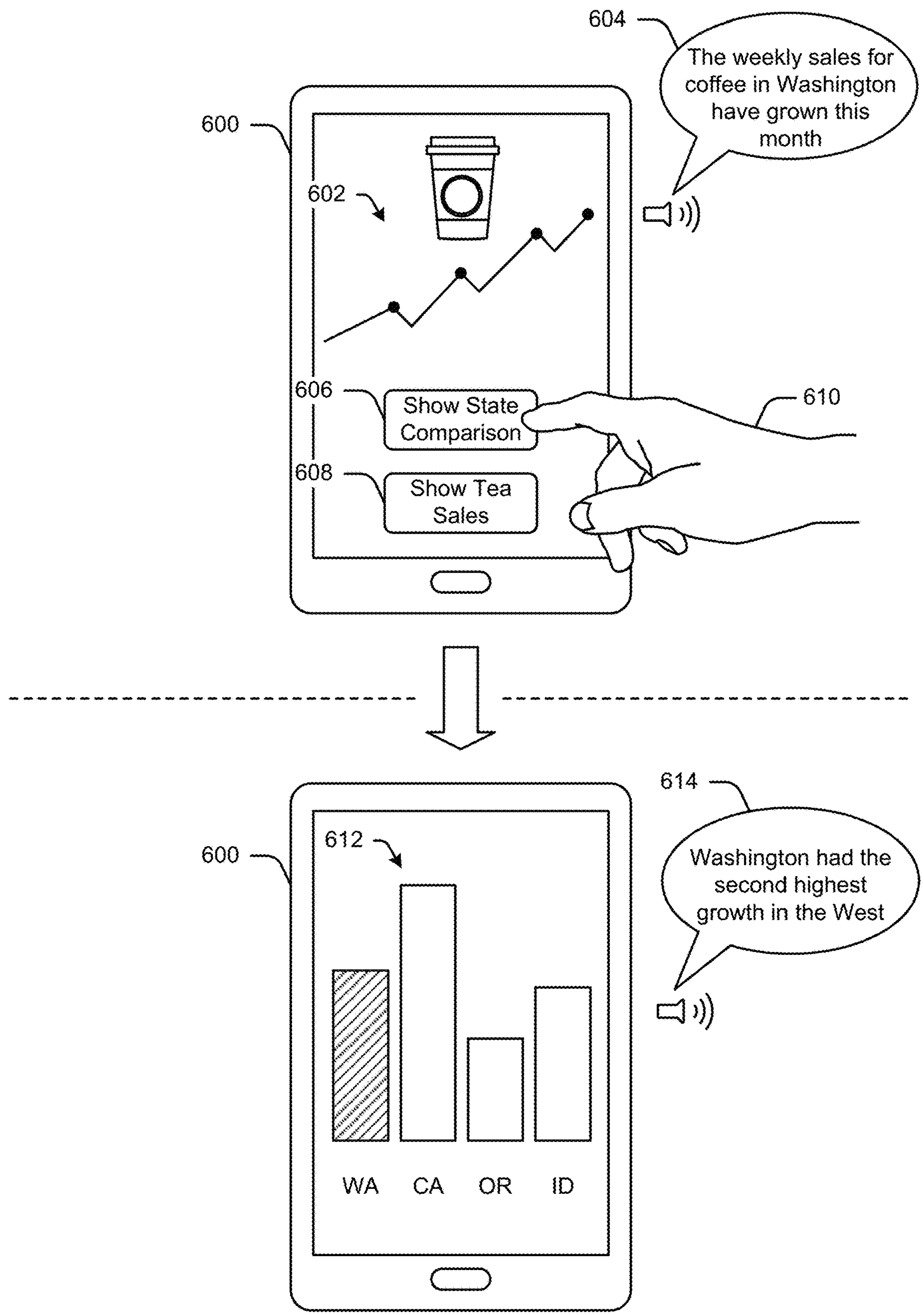
FIG. 6 illustrates generating drill path content in accordance with one or more implementations.

Various implementations alternately or additionally modify what is presented in real-time and/or while a playlist is being consumed. To further demonstrate, consider now FIG. 6 that illustrates an example of automatically generating drill-path content during playback in accordance with one or more implementations. In various scenarios, the example described with respect to FIG. 6 can be considered a continuation of one or more examples described with respect to FIGS. 1-5C. FIG. 6 illustrates an example progression of events over an arbitrary time period, where the progression begins in the upper portion of FIG. 6, followed by the lower portion of FIG. 6. It is to be appreciated that the progression of events described with respect to FIG. 6 is for discussion purposes, and that any other ordering, omission, and/or addition to the events can occur without departing from the scope of the claimed subject matter.

The upper portion of FIG. 6 includes tablet 600 that is in process of rendering and/or outputting playlist content 602. Here, playlist content 602 corresponds to a statically bundled narrated analytics playlist generated by the personalized analytics system and delivered to tablet 600 for consumption. The phrase "statically bundled content" is used to denote fixed content that includes ordered and predefined content, such as a playlist with a fixed number of charts, a fixed number of graphics, fixed narration and/or description, etc. In various implementations, tablet 600 receives statically bundled content from remote devices, such as via servers 102 of FIG. 1. Alternately or additionally, tablet 600 generates the statically bundled content via a standalone application and/or by access to cloud-based services provided by servers 102.

The content displayed by tablet 600 in the upper portion of FIG. 6 includes playlist content 602 that corresponds to a sales chart of coffee sales in the state of Washington. The statically bundled content being rendered and/or output by tablet 600 also includes audible content 604 that provides a narrative description and/or additional context information corresponding to playlist content 602. Various implementations dynamically generate content during playback of statically bundled content. In other words, the personalized analytics system 500 can receive input requests for supplemental information corresponding to the rendered and/or output content, such as drill-up or drill-down items. To illustrate, the user interface being rendered by tablet 600 during playback of playlist content 602 includes control 606 and control 608, each of which corresponds to dynamically generating supplemental information. In FIG. 6, control 606 corresponds to dynamically generating a comparison chart based on regional information, while control 608 corresponds to dynamically generating a sales chart for a different, but related, product. In response to a control being actuated, the personalized analytics system 500 receives an input associated with the actuation and generates output content that was not included in the statically bundled information. Here, user 610 actuates control 606 to view a comparison chart that corresponds to requesting and/or generating drill-up content. One or more implementations generate drill-up or drill-down content autonomously based on machine-learning algorithms that learn and/or identify a user preference. As one non-limiting example, various implementations generate the drill-up content or drill-down content based on user-preferences that define a scope and/or amount of drilling content to present, such as through an evaluation of historical patterns associated with a user profile, trends associated with the user profile, etc. This can include analyzing the associated metadata and/or extracting additional curated data to generate the drill-up content and/or drill-down content.

Moving to the lower portion of FIG. 6, the personalized analytics system 500 interrupts the outputting of playlist content 602 to output supplemental content 612. Here, supplemental content 612 includes a comparison chart that compares sales figures of coffee in various regions. The supplemental content includes audible content 614 to provide a narrative description and/or additional context information associated with the dynamically generated content. The dynamic generation of content can be performed in any suitable manner. For example, some implementations use metadata included in the statically bundled content to generate new charts, graphs, narrative content, etc. Alternately or additionally, tablet 600 triggers a query analysis that includes a topic associated with the actuated control. Thus, in some implementations, tablet 600 receives the supplemental information from a remote computing device and/or generates the supplemental via a query analysis as further described herein. Various implementations alternately or additionally provide the ability to modify and/or customize statically bundled content and/or dynamically generated content.

Figure 7:
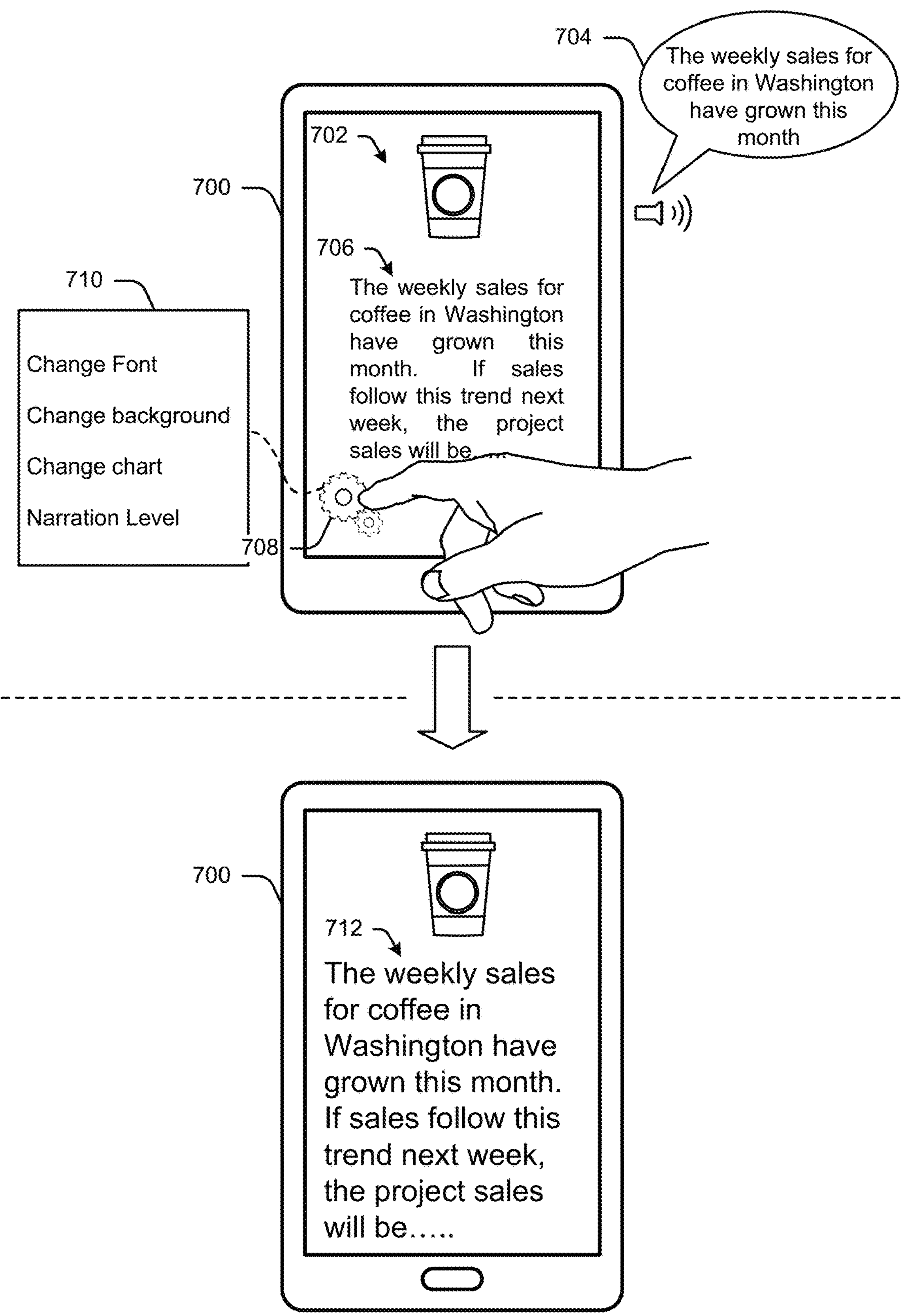
FIG. 7 illustrates an example of user-defined customizations to a personalized analytics system in accordance with one or more implementations.

To demonstrate, consider now FIG. 7 that illustrates an example of the user-defined customizations in accordance with one or more implementations. In various scenarios, the example described with respect to FIG. 7 can be considered a continuation of one or more examples described with respect to FIGS. 1-6. FIG. 7 illustrates an example progression of events over an arbitrary time period, where the progression begins in the upper portion of FIG. 7, followed by the lower portion of FIG. 7. It is to be appreciated that the progression of events described with respect to FIG. 7 is for discussion purposes, and that any other ordering, omission, and/or addition to the events can occur without departing from the scope of the claimed subject matter.

Similar to that described with respect to FIG. 6, the upper portion of FIG. 7 includes tablet 700 that is in progress of outputting playlist content 702 that includes a descriptive narrative in the form of audible output 704. The playlist content also includes text 706 that corresponds to the content included in audible output 704 that displays readable content in parallel with the corresponding audible output. The user interface displayed by tablet 700 also includes setting control 708 that, when actuated, exposes user-configurable settings, such as those illustrated in menu 710. For example, menu 710 as illustrated in FIG. 7 includes configurable settings for changing a displayed font (e.g., font type, size, color, etc.), changing a background image (e.g., image, pattern, color, etc.), changing a displayed chart (e.g., chart size, color, form, shape, preferred charts, disallowed charts, etc.), and changing a narration level (e.g., minimal narration, medium narration, verbose narration, etc.). It is to be appreciated that the settings displayed by menu 710 are merely for discussion purposes, and that various implementations include alternate or additional user-configurable settings. For example, various implementations provide the ability to customize themes that control multiple facets of what is displayed (e.g., a font type, a font size, a color pallet, cursor types, etc.), such as through the use of selectable user interface controls. In response to receiving input that defines and/or configures a setting, various implementations modify the setting and/or apply the modified setting to content in real-time while a playlist is being consumed. However, while described in the context of applying settings during output of a narrated analytics playlist, alternate or additional implementations apply the settings at times other than when a narrated analytics playlist is being output. In other words, the settings can be statically applied independent of rendering and/or outputting a playlist.

Moving to the lower portion of FIG. 7, tablet 700 displays modified text 712 based upon the modified user-defined settings. Here, modified text 712 has an increased font size relative to text 706.

Figure 8A:
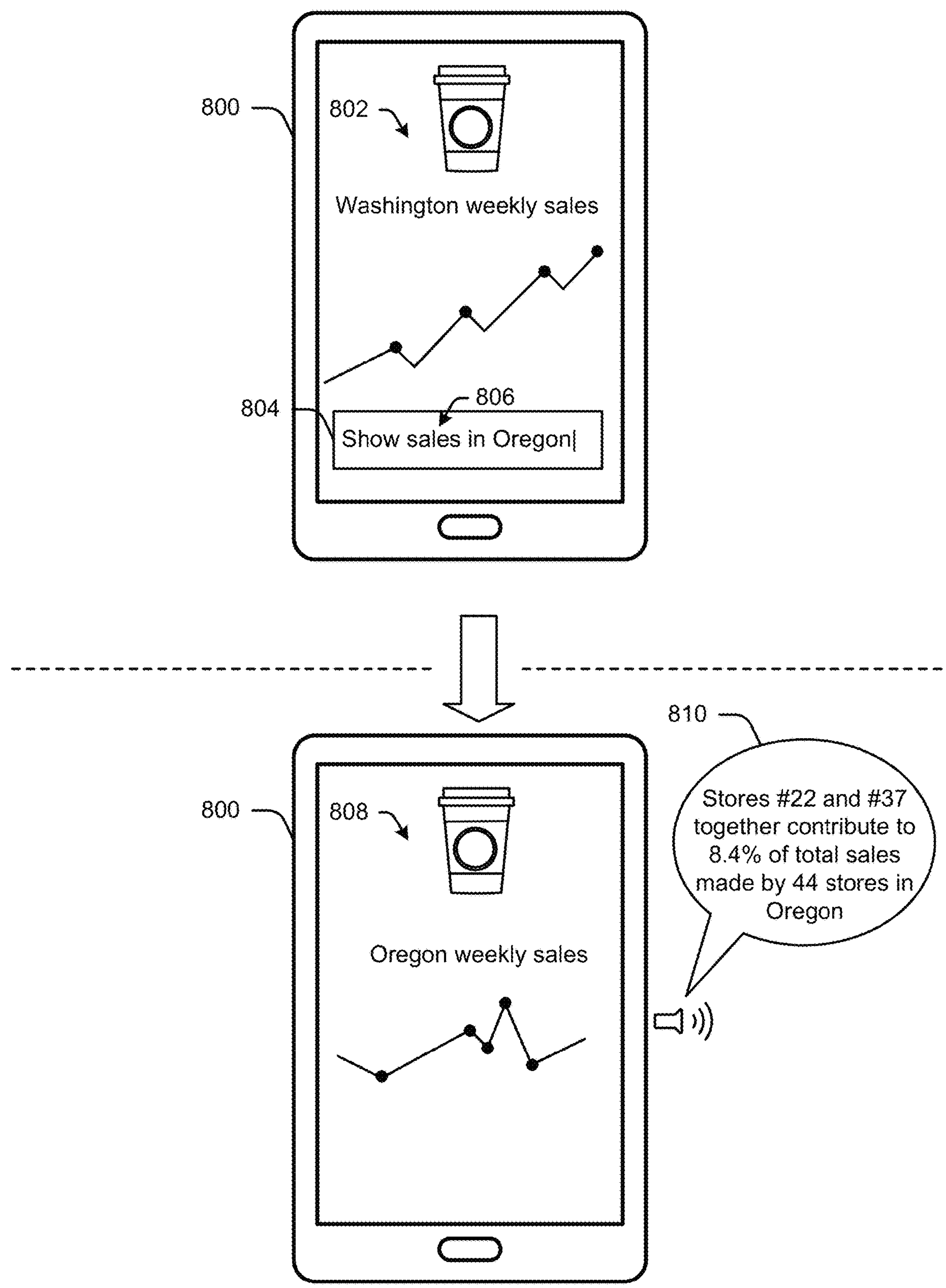
FIGS. 8A and 8B illustrate an example of analytic assistance during playback of content in accordance with one or more implementations.
Figure 8B:
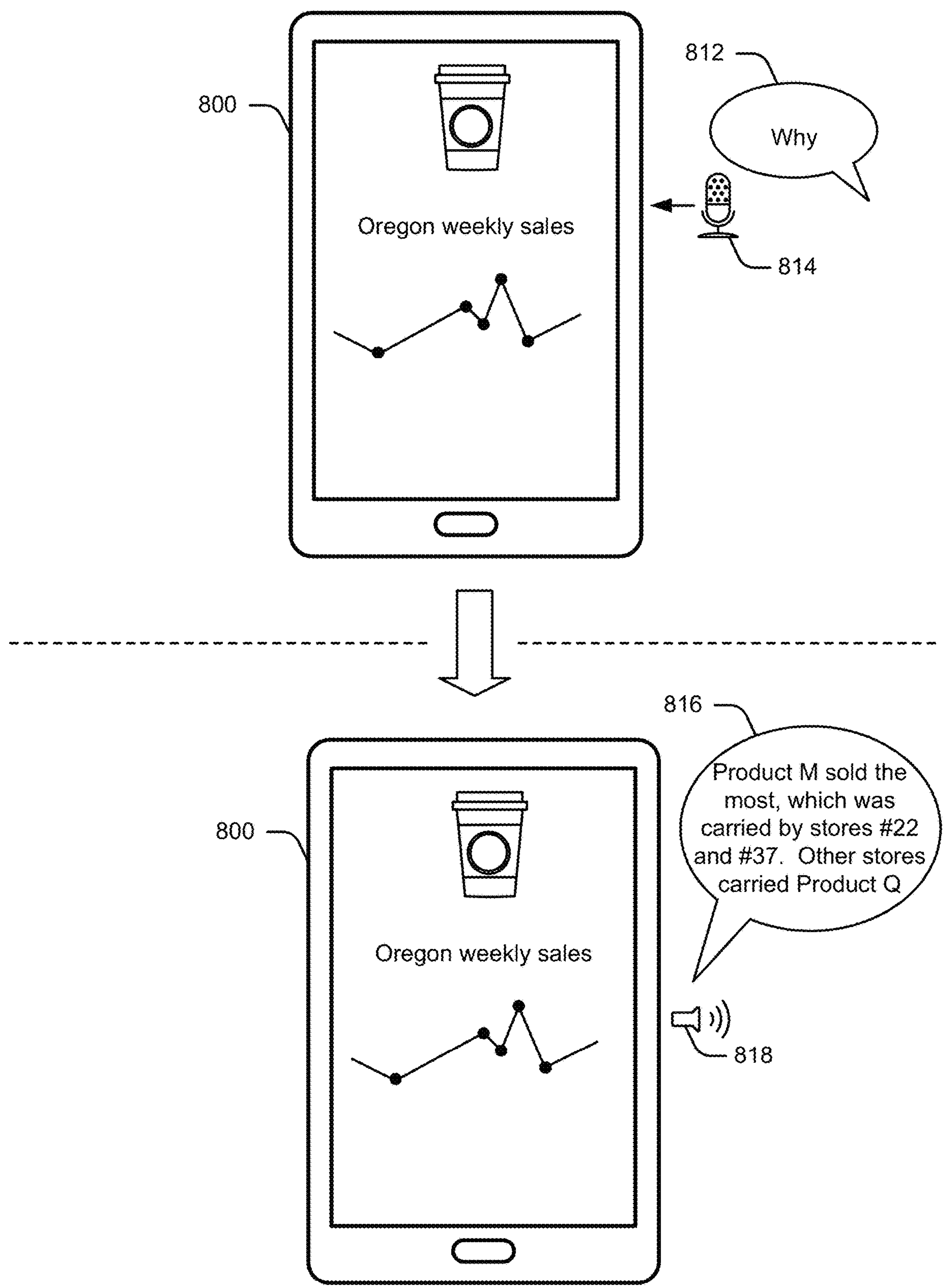

Now consider FIGS. 8A and 8B that illustrate an example of analytic assistance during playback in accordance with one or more implementations. In various scenarios, the example described with respect to FIGS. 8A and 8B can be considered a continuation of one or more examples described with respect to FIGS. 1-7. FIGS. 8A and 8B collectively illustrate an example progression of events over an arbitrary time period. Here, the progression begins in the upper portion of FIG. 8A and then moves to the lower portion of FIG. 8A. The progression then moves to the upper portion of FIG. 8B, followed by the lower portion of FIG. 8B. It is to be appreciated that the progression of events described with respect to FIGS. 8A and 8B is for discussion purposes, and that any other ordering, omission, and/or addition to the events can occur without departing from the scope of the claimed subject matter.

The upper portion of FIG. 8A includes tablet 800 that is in process of outputting playlist content 802 that corresponds to a sales chart in a region corresponding to Washington State. While not illustrated here, various implementations output a narrative description as part of the consumption of playlist content 802. The user interface displayed via tablet 800 includes a search field 804 that provides a mechanism for manually entering search keywords and/or initiating a query analysis. In this example, search field 804 includes input query string 806. In various implementations, the personalized analytics system 500 performs a query analysis based on input query string 806 and/or contextual information associated with the current content being rendered and/or output by tablet 800. For instance, input query string 806 requests sales information for a region corresponding to Oregon State. In turn, the personalized analytics system 500 augments the search by using contextual information associated with playlist content 802. In other words, the personalized analytics system 500 identifies that the playlist content corresponds to weekly coffee sales, and augments input string query 806 to search for weekly coffee sales in Oregon, even though input query string 806 does not specify "weekly" or "coffee". This allows the personalized analytics system 500 to provide the user with analytic assistance to acquire additional information not included in the statically bundled content of playlist content 802. While text input 806 enters text-based input as a way to trigger a query analysis, alternate or additional implementations receive commands and/or queries in alternate formats, examples of which are provided herein. In response to receiving the query, the personalized analytics system 500 triggers a query analysis and/or generates modified content using metadata included with playlist content 802. In one or more implementations, the personalized analytics system 500 generates a suggested query and/or a suggested action as part of the modified content, such as alternate words to include in a query, alternate actions to initiate, etc. For instance, the personalized analytics system 500 can analyze an associated user profile using various machine-learning algorithms to identify queries with positive feedback, actions with positive feedback, preferred actions, associated keywords with a higher probability of success, and so forth, to base a suggested query and/or suggested action on, such as a suggested action to request sales information for a competitor, a suggested action to generate diagnostic information associated with a product, alternate keywords to include, etc.

To demonstrate, consider a scenario in which the personalized analytics system identifies an insight associated with customer purchasing behavior. The insight can be based on any suitable type of data, such as anecdotal data, curated data, data actively being used by the personalized analytics system during, a period of time, data at rest (e.g., data stored in a database), data in motion (e.g., data being collected in real-time), and so forth. The personalized analytics system can derive the insight using any one or combination of these data types. Some implementations alternately or additionally generate a suggested action based on the insight, such as a suggestion to conduct marketing campaigns based on the insight associated with the customer purchasing behavior.

Thus, various implementations of the personalized analytics system provide suggestions to the user, in lieu of, and/or in addition to, insights. This can include suggesting different analyses to run and/or different results to request. In some implementations, the personalized analytics system provides suggestions during output and/or the rendering of a narrated analytics playlist. Alternately or additionally, various implementations provide the suggestions after performing a query analysis (but before generating the narrated analytics playlist), when a user logs into the personalized analytics system 500, etc., in response to identifying a trigger event, etc.

Moving to the lower portion of FIG. 8A, and in response to the input query string, tablet 800 displays modified content 808 that includes audible narration content 810. Here, the audible narration content 810 provides the additional context information of "Stores #22 and #37 together contribute to 8.4% of total sales made by 44 stores in Oregon" to deliver information that explains a context to what the corresponding content indicates. In various implementations, this additional context information corresponds to an insight identified by the personalized analytics system 500.

In the upper portion of FIG. 8A, input query string 806 includes multiple keywords that are used in the query analysis. However, alternate or additional implementations support one-word query analytics as well. To further demonstrate, consider now the upper portion of FIG. 8B in which the personalized analytics system, by way of tablet 800, receives a one-word audible input 812 via microphone 814. In response to receiving the one-word audible input, the personalized analytics system identifies the current content being rendered and/or output by tablet 800 (e.g., modified content 808), and uses this information to add contextual parameters to the input query. Alternately or additionally, the personalized analytics system identifies the previously rendered content (e.g., playlist content 802) to acquire context information and/or add contextual parameters to the user input request. The personalized analytics system then performs a query analysis and/or analyzes the corresponding metadata associated with modified content 808 to generate a response to the input query.

In the lower portion of FIG. 8B, tablet 800 outputs narrative description 816 audibly via speaker 818 that corresponds to a result of the one-word input query. In some implementations, the personalized analytics system generates visual content in response to the one-word input query, such as text content, charts, graphs, videos, etc. Accordingly, various implementations receive a one-word input command, request, and/or query, and gather relevant information to identify insights and/or generate a response to the query. As further described herein, this can include identifying anecdotal data, and applying the anecdotal data in generating the response.

Figure 9:
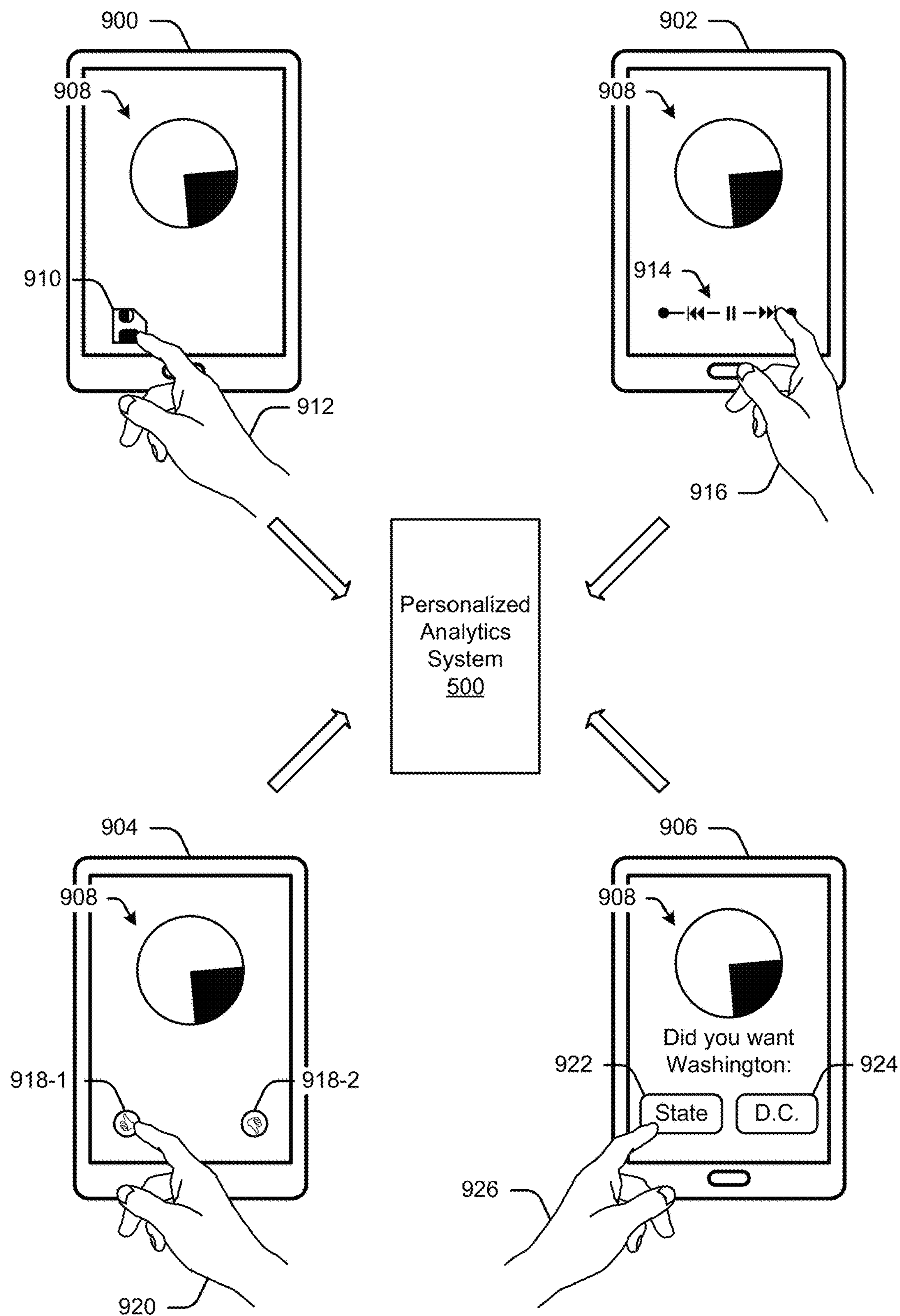
FIG. 9 illustrates an example of capturing usage analytics with respect to a user profile in accordance with one or more implementations.

Now consider FIG. 9 that illustrates examples of capturing and/or generating anecdotal data associated with a user profile and/or workspace in accordance with one or more implementations. In various scenarios, the example described with respect to FIG. 9 can be considered a continuation of one or more examples described with respect to FIGS. 1-8B.

FIG. 9 includes personalized analytics system 500 of FIG. 5 that is generally representative of the personalized analytics system described in FIG. 1, such as servers 102 and/or computing device 104. FIG. 9 also includes tablet 900, tablet 902, tablet 904, and tablet 906 that, similar to home assistant device 502, display device 508, display device 516, mobile device 522, and/or mobile device 530 of FIGS. 5A-5C, are communicatively coupled to, and/or are part of, personalized analytics system 500 as further described herein.

Tablet 900 is currently in a state of rendering and/or outputting playlist content 908, where playlist content 908 represents analytic content generated by the personalized analytics system. The user interface displayed by tablet 900 includes a control 910 that has an associated action corresponding to saving the current content being displayed and/or output. Accordingly, in response to user 912 actuating control 910, the personalized analytics system saves a screenshot of the content being rendered and/or saves a clip of the corresponding audio that is being output (not illustrated here). Various implementations identify the actuation of control 910 as implicit positive feedback, and subsequently determine to capture anecdotal data, such as identifying the content being output and/or marking the content as user-preferred content. This can include identifying a topic associated with the pie-chart as being of interest and/or identifying the pie-chart format as a user-preferred chart type. In turn, the personalized analytics system references the anecdotal data when generating future content, such as determining to render a pie-chart in a future narrated analytics playlist for the user profile associated with user 912.

As another example of capturing anecdotal data, consider now tablet 902 that also is in process of outputting playlist content 908. Here, the user interface of tablet 900 includes playback controls 914 that interface with a playback module to allow input that modifies the rendering and/or playback of playlist content 908, such as pausing the content, rewinding the content, skipping the content, etc. With respect to tablet 902, user 916 actuates a control of playback controls 914 that causes the corresponding playback module to skip outputting the current content. Various implementations of the personalized analytics system interpret this input as implicit negative feedback, and determine to collect context information to generate anecdotal data for the corresponding user profile. Similar to that described with respect to tablet 900, this can include identifying a topic associated with the current topic and/or a displayed format, and determining to avoid these topics and/or formats for a user profile associated with user 916.

While tablet 902 demonstrates an example of personalized analytics system 500 interpreting user interactions as implicit feedback, tablet 904 illustrates an example of explicit feedback. For example, the user interface of tablet 904 includes an explicit positive feedback control 918-1 and an explicit negative feedback control 918-2. Accordingly, user interaction with either controls provides the personalized analytics system with explicit feedback. In response to user 920 actuating explicit positive feedback control 918-1, personalized analytics system 500 identifies corresponding context information, and stores the information as anecdotal data as further described herein.

Various implementations identify user distinctions for ambiguous words as anecdotal data. To further illustrate, consider a scenario illustrated by tablet 906 that is in process of outputting playlist content 908. In this scenario, the personalized analytics system receives an input request for analytic assistance from the personalized analytics system, such as via an input query through a search field similar search field 804 of FIG. 8A (not illustrated here). The input query includes an ambiguous term which the personalized analytics does not have enough data to resolve, such as the term "Washington" that can refer to Washington State or Washington D.C. Various implementations prompt for input corresponding to additional context information and/or clarification, and store the additional information as anecdotal data associated with a corresponding user profile and/or workspace. For instance, the user interface of tablet 906 includes control 922 that corresponds to Washington State, and control 924 that corresponds to Washington D.C. In turn, user 926 actuates control 922 to provide additional context information that is received and stored by the personalized analytics system as anecdotal data.

Figure 10:
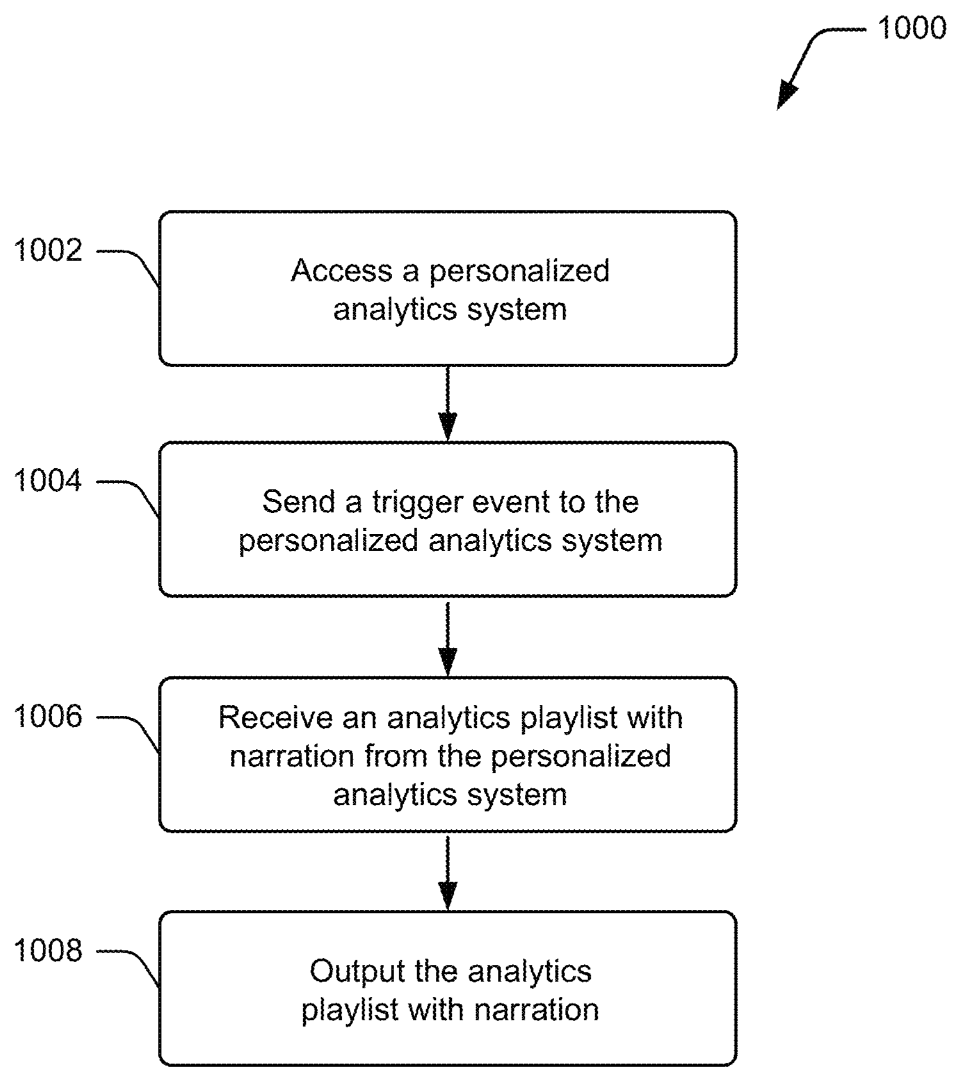
FIG. 10 illustrates a flow diagram of accessing a personalized analytics system to obtain a narrated analytics playlist in accordance with one or more implementations.

Now consider FIG. 10 that illustrates an example method 1000 that can be utilized to obtain narrated analytics playlists in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or client analytics module 108. While the method described in FIG. 10 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1002, various implementations access a personalized analytics system. For example, a client device that includes a client application of the personalized analytics system (e.g., client analytics module 108) and/or a browser can access a server application of the personalized analytics system. This can include logging on to a particular workspace associated with the personalized analytics system, such as through the use of various types of authentication procedures. Thus, accessing the personalized analytics system can include logging onto a locally executing application and/or accessing remote applications a further described herein. Any suitable type of client device can be utilized, examples of which are provided herein.

In response to accessing the personalized analytics system, various implementations send a trigger event to the personalized analytics system at 1004, where the trigger event is associated with initiating, invoking, and/or performing a query analysis, such as a query analysis performed by any combination of parser module 112, query magnifier module 114, and/or insight engine module 116. Various implementations display a control explicitly assigned to triggering a query analysis, such as a search box, a scheduler application, an analytic assistance control, etc. Alternately or additionally, various implementations display controls that, when actuated, are implicitly interpreted as a command to initiate, invoke, and/or perform a query analysis. In some implementations, the trigger event includes an input query string that is used as a basis for the query analysis, such as a search query entered into a search box. Alternately or additionally, the input query string used for the query analysis is automatically generated by the personalized analytics system, such as through the use of anecdotal data, contextual information, etc. One or more implementations process audible input to identify keywords associated with triggering a query analysis and, in response to identifying the keywords, send a trigger event to the personalized analytics system.

At 1006, one or more implementations receive a narrated analytics playlist from the personalized analytics system, where the analytics playlist includes one or more insights generated by the personalized analytics system. As one non-limiting example, client analytics module 108 of FIG. 1 can receive the narrated analytics playlist from personalized analytics module 106 over communication cloud 128. Various implementations base the insights off of the trigger event, information included in the trigger event, derived contextual information, etc. A narrated analytics playlist can include data in any suitable format, such as an audio clip, a video clip, a slideshow, metadata, addressing information, user profile identification information, etc. Various implementations statically bundle the content included in a narrated analytics playlist, including information that can be utilized to dynamically generate supplemental information as further described herein.

At 1008, one or more implementations output the narrated analytics playlist effective to output images and audio, such as through the use of playback module 132 and/or user interface module 130 of FIG. 1. Some implementations utilize a playback engine associated with the personalized analytics system such that the playback engine captures anecdotal data about user interactions with the output content. The playback engine can represent any type of playback module, such as playback module 132 of FIG. 1, playback module 1120 of FIG. 11, and/or playback module 1800 of FIG. 18. In turn, the playback engine stores the anecdotal data within the personalized analytics system for future use. As further described herein, some implementations provide analytic assistance while outputting narrated analytics playlist content, and interrupt the playback of the narrated analytics playlist content to instead output the dynamically generated insights and/or responses. As one example, the personalized analytics system can access the metadata statically bundled with the narrated analytics playlist to dynamically generate drill-up and/or drill-down content.

Having described various aspects of narrated analytics playlists, consider now a discussion of data acquisition and analysis in accordance with one or more implementations.

Data Acquisition and Analysis

Various implementations generate narrated analytics playlists by curating data and analyzing the curated data in various ways to identify insights that are relevant to a particular user profile and/or workspace. In a statistical context, incorporating more curated data, as well as anecdotal data, into the analysis increases the probability of identifying relevant and accurate insights pertaining to the user profile. However, using more data to generate analytical reports adds complexity to the analysis process, such as impacting how large volumes of data are acquired, sorted, classified, tagged, accessed, and so forth. To illustrate, acquiring, sorting, classifying, and analyzing two pieces of information utilizes less organization and effort relative to two-hundred thousand pieces of information. Further, these various steps in the analysis process factor-ally increase when the attributes of each piece increase in number as well. This additionally makes manually processing the data difficult and/or infeasible.

Various implementations employ a personalized analytics system to process, sort, classify, and/or analyze various types of data as further described herein. In turn, the personalized analytics system improves the way a corresponding computing device functions by at least improving search times and reducing memory space needs relative to past systems. For example, the data curation process can consolidate curated data using a data structure that has been designed to optimally store the data (e.g., minimal space requirements) and provide quick access to data retrieval processes (e.g., improved cross-referencing, tag keywords, relational models, etc.). As another example, the use of machine-learning technologies to analyze and identify how data is curated, to identify insights, and/or to augment the insights can enhance the speed at with these various processes are performed.

Figure 11:
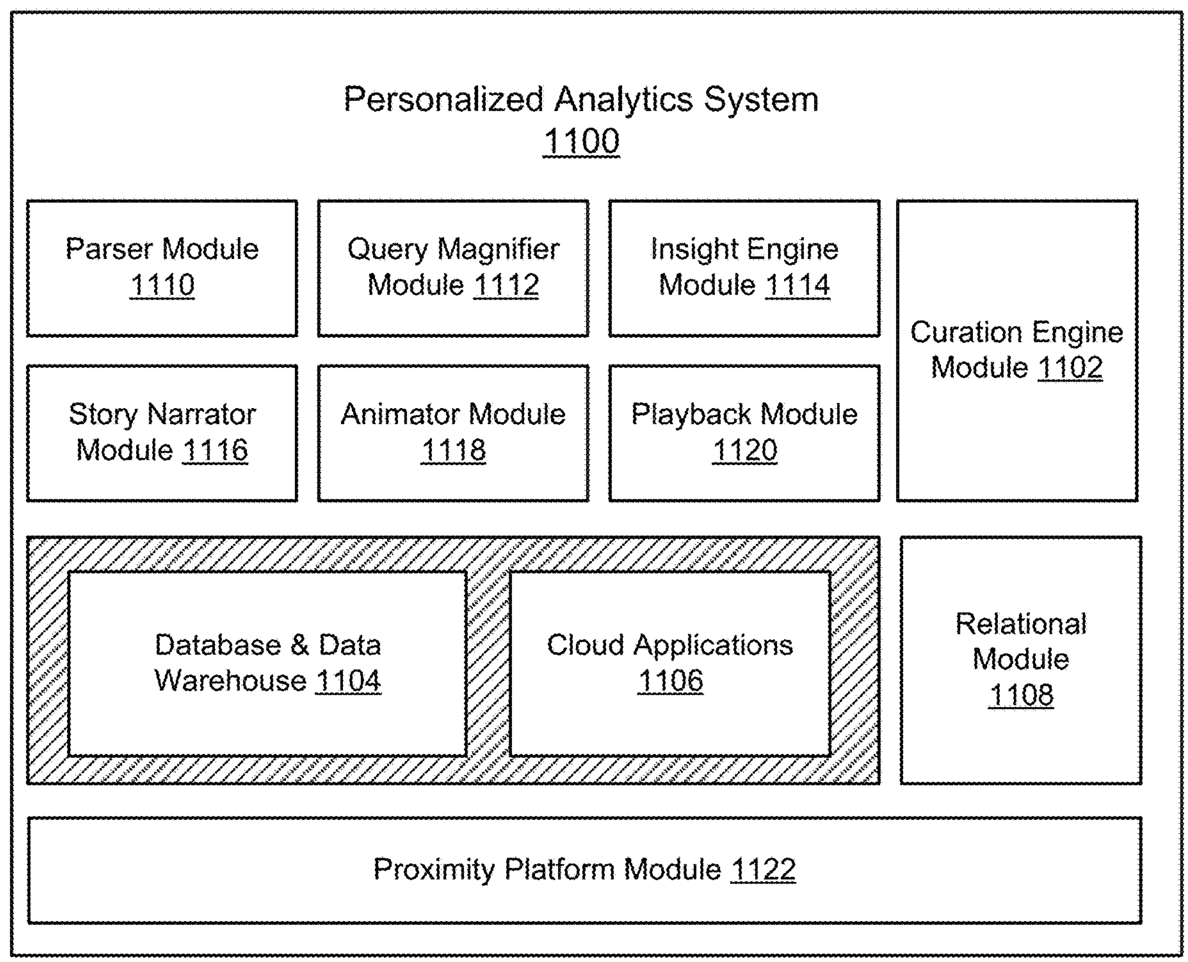
FIG. 11 illustrates an example a personalized analytics system in accordance with one or more implementations.

To demonstrate, consider FIG. 11 that illustrates an example block diagram that can be utilized to generate narrated analytics playlists in accordance with one or more implementations. In various scenarios, the example described with respect to FIG. 11 can be considered a continuation of one or more examples described with respect to FIGS. 1-10.

FIG. 11 includes a personalized analytics system 1100 that can be implemented using various combinations of computing devices and/or modules, such as varying combinations of servers 102, computing device 104 of FIG. 1. The personalized analytics system 1100 includes curation engine module 1102 that generally scans data sources, such as database and data warehouses 1104 and/or cloud applications 1106, to identify source data that is subsequently curated and/or enriched by the curation engine module 1102 data as it is populated into the personalized analytics system. Any suitable type of database, data warehouse, and/or cloud application can be accessed and/or scanned for data, such as Structured Query Language (SQL) databases, enterprise data warehouses, data marts, Software-As-A-Service (SaaS) based applications, Google™ Cloud SQL databases, Amazon RedShift, Snowflake, Microsoft™ SQL database, Sage Inacct™ Netsuite™, Salesforce etc. Curation engine module 1102 can scan databases in real-time, such as in response to a query and/or trigger event, can perform scans at scheduled intervals, can perform scans offline during idle periods when no user interaction with the system is detected, etc.

In response to acquiring the source data, the curation engine module 1102 analyzes the source data to identify characteristics and/or attributes that are then added to the source data to generate curated data. Any type of characteristic and/or attribute can be identified, such as location information, organization information, product information, cross-references to other data, lifespan of the source data, categorization of the source data, updates to the source data, annotations associated with the source data, identifying whether the source data is obsolete, relationship to other source data, and so forth. In other words, the curation engine module 1102 accesses and scans various data sources for data, analyzes the data to identify various characteristics about the data, and then curates and/or augments the data with the identified characteristics, such as by updating metadata associated with the source data. Curating the source data can alternately or additionally include identifying data relationship models, drill path information, periodically updating the curated data, etc.

In various implementations, curation engine module 1102 applies and/or utilizes user-defined rules, such as rules that prioritize database access, rules that prioritize what data to update more frequently relative to other data, etc. For instance, a user can create a workspace associated with the personalized analytics system such that the user assigns each workspace to a particular database and/or data source. This directs the curation engine module 1102 to curate data from the identified data source. Alternately or additionally, the user can assign a collection of particular databases and/or data sources to the workspace. As yet another example, a user can assign a login name and password to the workspace to secure and/or restrict access to curated data so that only authorized users with valid user credentials can access to the curated data.

Some implementations of the curation engine module 1102 identify and/or generate inter-data relationship information, and store this information in relational module 1108. Alternately or additionally, relational module 1108 represents data relationships identified by the curation engine module that are used to form data structures within a corresponding database. In one or more implementations, curation engine module 1102 automatically triggers the data curation process without receiving explicit input associated with initiating the process, but alternate or additional implementations trigger the data curation process in response to receiving explicit input to initiate data curation. Access to the curated data can be restricted and/or limited to a single user profile and/or workspace, and/or can be distributed across multiple user profiles and/or workspaces, such as user profiles and/or workspaces associated with a same organization. This allows the curated data and/or analytics generated for a first user in the organization to be leveraged for analytics associated with a second user of the organization, thus improving the efficiency of the personalized analytics system across the organization since the information is shared, rather than repeatedly generated for each user profile.

Personalized analytics system 1100 also includes parser module 1110 and query magnifier module 1112 to analyze input query strings, and identify various permutations of the input query to use in extracting information from the curated data. For instance, parser module 1110 can parse input query strings into individual tokens and/or units, where the analyzed input query string originates from any suitable source, such as curation engine module 1102, user-defined schedules, event-based triggers, feedback loops from other modules included in the personalized analytics system, etc. Thus, parsing an input query string can be done in real-time based on receiving an explicit user-input query, based on receiving a trigger event, based on scheduled query interval(s), based on determining the personalized analytics system 1100 is idle (e.g., a lack of user interaction with the personalized analytics system), etc. In response to parsing the input query string into individual tokens, various implementations of the parser module further analyze the individual tokens to identify keywords, context information, etc.

Query magnifier module 1112 receives a canonical query from parser module 1110, such as the identified keywords, context information, etc., and determines whether to add additional constraints and/or contextual information to the query, such as time ranges, location information, etc. Alternately or additionally, query magnifier module 1112 identifies additional attributes associated with the canonical query, a corresponding relevance of the additional attributes, and whether to generate variations of the query using the additional attributes. In various implementations, query magnifier module 1112 accesses anecdotal data to augment the query, such as a last known query time that can influence time constraints, a user role, a user job position, a user group, past user query history, a device being used to access the personalized analytics system, a location of the user, a business department associated with the user, a language associated with the user, an organizational vocabulary, and so forth. Query magnifier module 1112 can generate queries that are likely to be of interest to the user based upon the distributed knowledge. Thus, various implementations generate new queries, where the new queries are configured to identify new and related subject matter, remove biases from the extracted information, identify efficient database query mechanisms, etc.

The newly generated queries and/or the original input query are then used by insight engine module 1114 to extract information from the curated data. Insight engine module 1114 analyzes the extracted information to identify one or more insights, such as by applying various machine-learning algorithms to the extracted information. An insight can include any suitable type of information, such as a trend, a pattern, an anomaly, an outlier, predictive behavior, a contradiction, connections, benchmarks, market segments, etc. Accordingly, an insight sometimes corresponds to an actionable finding that is based upon data analysis. For example, a rate of growth in sales for a product corresponds to a factual insight that a user can base future actions off of, such as a low rate of growth indicating a change is needed, a high rate of growth indicating that current solutions are working, and so forth. Insight engine module 1114 can apply any suitable type of machine-learning model and/or algorithm to discover an insight, such as cluster analysis algorithms, association rule learning, anomaly detection algorithms, regression analysis algorithms, classification algorithms, summarization algorithms, deep learning algorithms, ensemble algorithms, Neural Network based algorithms, regularization algorithms, rule system algorithms, regression algorithms, Bayesian algorithms, decision tree algorithms, dimensionality reduction algorithms, Instance based algorithms, clustering algorithms, K-nearest neighbors algorithms, gradient descent algorithms, linear discriminant analysis, classification and regression trees, learning vector quantization, supporting vector machines, Bagged Decision Trees and Random Forest algorithms, boosting, etc. While the various algorithms described here are described in the context of being utilized to generate insights by the insight engine module 1114, it is to be appreciated that these algorithms can alternately or additionally be employed in other modules of the personalized analytics system 1100, such as a curation engine module 1102, a parser module 1110, query magnifier module 1112, a story narrator module 1116, an animator module 1118, and so forth.

The insight engine module outputs the insights and/or any corresponding context information into a consumable format, such as a text-based form, metadata, mathematical formats, markup language, etc. In one or more implementations, insight engine module 1114 formats insights and/or contextual information as a story plot to provide a basis and/or outline for a narrated analytics playlist.

Personalized analytics system 1100 also includes story narrator module 1116 and animator module 1118 to generate a narrated analytic playlist from the identified insights. Story narrator module 1116 receives the output generated by the insight engine module 1110, and determines how to articulate, explain, and/or augment a corresponding description of the output. To illustrate, consider a scenario in which story narrator module 1116 receives, from the insight engine module, an insight that corresponds to a graph and/or data corresponding to a sales trend for a product in a particular state. In response to receiving this input, the story narrator module determines to generate a graph to visually display this information. Alternately or additionally, the story narrator module determines that supplemental information, such as sales trends for the product in neighboring states, could augment, explain, or further clarify a context associated with the sales trend in the particular state. Accordingly, in some implementations, the story narrator module includes a feedback loop to parser module 1110, query magnifier module 1112, and/or insight engine module 1114 to request additional insight information and/or request a query analysis be performed for the supplemental information. In various implementations, the story narrator module 1116 bundles and forwards information to the animator module to indicate what visual and/or audible information to include in the narrated analytics playlist. For example, the story narrator module 1110 can include charts, facts, text-based descriptive narratives, metadata, and other information corresponding to the insights, in the bundled information.

Animator module 1118 receives the bundled information, and uses the bundled information to generate audio and/or video outputs that are consumable by a playback engine, such as a narrated analytics playlist that is consumable by playback module 1120. Various implementations alternately or additionally base the narrated analytics playlist on predefined design themes, branding themes, etc. as further described herein.

Various implementations of the personalized analytics system include a playback module 1120 to output the narrated analytics playlist. In various implementations, the playback module receives a statically bundled analytics playlist from the animator module, and renders the content as output, such as by displaying images and/outputting audible sound. Playback module 1120 can alternately or additionally include anecdotal learning functionality that tracks and learns user preferences based on user interactions, examples of which are provided herein.

The personalized analytics system 1110 also includes proximity platform module 1122. As further described herein, various modules included in the personalized analytics system incorporate machine-learning algorithms, modules, and/or models to aid in curating and/or analyzing data. Accordingly, as the machine-learning algorithms evolve, the corresponding output becomes more personalized, more relevant, and more accurate for the corresponding user profiles and/or workspaces relative to unevolved algorithms. Proximity platform module 1122 acquires the learned information and/or the evolved algorithm parameters without having visibility into the curated data and/or queries used to generate the learned information. To illustrate, consider a scenario in which a first organization has sensitive sales growth charts that plot an organization product against a competitor's product. In generating this sales growth chart, the personalized analytics system modifies various configurable parameters of a machine-learning algorithm. Proximity platform module 1122 extracts changes to the parameters and/or the absolute values of the changed parameters without visibility into the curated data and/or query analyses used to evolve the algorithm. The proximity platform can then propagate these changed parameters to a second organization or the third organization to improve how analytic playlists are generated for these organizations without exposing the first company's sensitive information. Any suitable type of parameter can be extracted and propagated by the proximity platform, such as weights used in an artificial neural network, support vectors in a support vector machine, coefficients in a linear regression or logistic regression algorithm, an assumed distribution used in a statistical analysis (e.g., Gaussian distribution, binomial distribution, degenerate distribution, etc.), and so forth. Thus, aspects of the personalized analytics system improve the performance of various devices through the distribution of these parameters without exposing or compromising the data used to generate the parameters. This can include distributing the parameters to devices that are registered to different organizations as further described herein.

Figure 12:
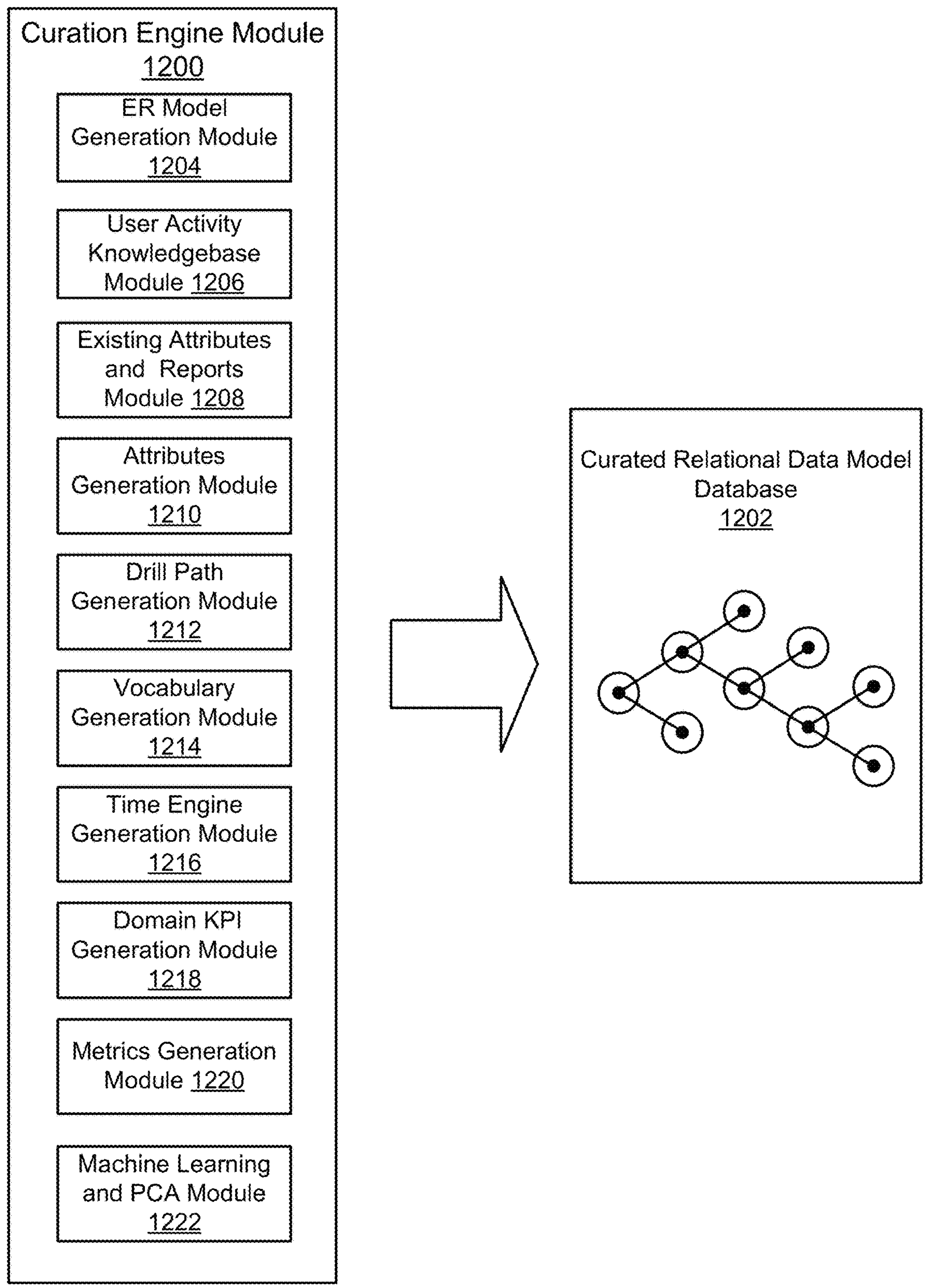
FIG. 12 illustrates an example curation engine module in accordance with one or more implementations.

Now consider FIG. 12 that illustrates a more detailed example of a curation engine module in accordance with one or more implementations. In various scenarios, the example described with respect to FIG. 12 can be considered a continuation of one or more examples described with respect to FIGS. 1-11.

FIG. 12 includes an example curation engine module 1200 that generally scans data sources to acquire and populate basic metadata about the data. This can include identifying attributes of the data and populating the metadata with the attributes. In various scenarios, curation engine module 1200 is representative of curation engine module 110 of FIG. 1 and/or curation engine module 1102 of FIG. 11. Some implementations of the curation engine module programmatically access databases, such as via an SQL interface of a database, to scan and/or analyze data to curate. The curation engine module uses the analysis to identify various attributes of the data and populate metadata with the identified attributes. In some implementations, the curation engine module identifies primary attributes associated with the data, and then identifies secondary attributes related to the primary attributes. In turn, the curation engine module updates the corresponding metadata. The curation of data and/or what data is accessible to a particular user profile and/or workspace can be based off of any suitable type of characteristic, such as characteristics associated with a particular user profile and/or organization profile, what type of software has been deployed to the particular user profile, what software features of the personalized analytics system are available to the particular user profile, what software version has been deployed, what machine-learning modules are available, etc. Thus, the curation engine module may not provide a particular user profile and/or workspace with access to all of the curated data, depending upon what level of access the user profile has been assigned.

In one or more implementations, the curation engine module 1200 bases the curation of data on a corresponding workspace associated with the particular user. As further described herein, a user can create one or more workspaces that define data source address(es) to include, database name(s), security authentication parameters for access to the workspace, read only and/or write permissions, and so forth. In various scenarios the curation engine module bases data curation on the user-defined parameters for a particular workspace. Alternately or additionally, curation engine module accesses anecdotal data associated with the workspace to influence and/or weigh what attributes of the curated data are added to the corresponding metadata. In various implementations, the curation engine module identifies related attributes of the user-defined parameters and/or anecdotal data to influence how data is curated and/or what attributes are added to the metadata in the curation process.

Curation engine module 1200 curates and adds attribute information to metadata associated with the data. In one or more implementation, the curated attributes include usage-based information, such as context information associated with input interactions, business domain information, component rankings, metric-based usage rankings (e.g., click-stream analysis, scored queries, playback rankings, etc.), knowledge graph attributes, and so forth. Alternately or additionally, the curated attributes include dictionary-based information (e.g., alternates words, synonyms, hyponyms, alternate industry words, verbiage preferences, etc.), access restrictions, data inferences (e.g., a data quality rankings, such as by applying various algorithms that determine how reliable the associated data is, an accuracy of the data determined through a verification process, a relevancy of the data relative to a particular keyword, an interpretability ranking of the data, how flexible the data is relative to a consistent taxonomy associated with context for the data, etc.), indications of whether the data is internal or external to an organization, whether the data type is commonly used, whether the data information has a common name, etc. In turn, curation engine module 1200 analyzes the curated data and/or attributes to determine and output relational data models. This can include applying machine-learning algorithms to the curated data and/or attributes to generate the relational data models stored via curated relational data model database 1202.

Curated relational data model database 1202 represents a database that includes the data relational models generated by curation engine module 1200. Generally, data relational models correspond to logical representations of information generated by assigning one or more attributes to data as further described herein. For example, a first data point can be assigned an attribute of being a parent data source, while a second data point is assigned an attribute of being a child data point of the first data point. While described here in the context of a parent/child relationship between data points, it is to be appreciated that this is merely for discussion purposes, and alternate types of relationship attributes can be modeled and/or identified. The data relational models alternately or additionally assign data types to the data. In some scenarios, curated relational data model database 1202 describes the relationships between data through the use of tables and/or data structures, where the format of the tables and/or structures describe relational information. Alternately or additionally, curated relational data model database 1202 stores the schema of the relational data model that is followed when storing curated data into a database. Other entities can then programmatically extract the relationship information from curated relational data model database 1202 through the use of one or more database interfaces, such as SQL interfaces, and a corresponding query. To identify and assign the attributes used in the curated relational data model database, curation engine module 1200 utilizes multiple types of processing and/or information.

Curation engine module includes an entity-relationship (ER) model generation module 1204 that identifies a domain or topic of interest, and then specifies a relationship model for the domain or topic. For instance, the ER model generation module 1204 can specify the relationships between different data types associated with a corporation, such as employee data types, employee attributes, customer data types, customer attributes, vendor data types, vendor attributes, etc. In various implementations, the ER model generation module 1204 uses a schema to describe the model, such as by using the schema to identify associations and dependencies between entities, where an entity can correspond to a physical object (e.g., a product), an event (e.g., a sale or service), a concept (e.g., a transaction or order), and so forth. In various implementations, the schema assigns attributes to data associations and/or entities. To illustrate, the schema can be used to assign an employee number attribute to an employee entity, a data attribute to a product sales entity, and so forth. While described here in the context of a schema, it is to be appreciated that ER models can be defined using any type of diagramming techniques and/or schemas, such as Bachman notation, Barker's notation, Unified Modeling Language (UML), Object-role modeling (ORM), Extensible Markup Language (XML) schema, etc. The relationship model generated by the ER model generation module 1204 is then used as a basis for defining a data structure for storing data in a corresponding database, such as curated relational data model database 1202.

Curation engine module 1200 also includes a user activity knowledgebase module 1206 to provide contextual information that is used in data curation as further described herein. The user activity knowledgebase includes anecdotal data associated with a particular user profile, workspace, organization profile, and so forth. While the user activity knowledgebase is illustrated here as residing within the curation engine module, it is to be appreciated that the information included in the knowledgebase can originate from any suitable data source. As one example, the user anecdotal data collected with respect to FIG. 9 can be included in user activity knowledgebase module 1206.

The curation engine module 1200 also utilizes existing attributes and reports module 1208 to identify attributes and/or build curated data. For example, the curation engine module 1200 can access existing reports, existing dashboard information, and/or existing databases to augment the existing metadata and/or create new attributes, new metadata, etc. Alternately or additionally, the curation engine module 1200 uses the existing attributes and/or reports to influence what attributes and/or reports are generated by future query analyses.

The curation engine module 1200 creates attributes for the curated data via attribute generation module 1210. In one example, the curation engine module uses ER models generated by ER model generation module 1204 to determine what attributes to identify for the data being curated and/or analyzed, and then updates the metadata with the identified attributes. Alternately or additionally, the curation engine module creates drill-up paths and/or drill-down paths via the drill path generation module 1212. To generate drill path information, various implementations identify a particular object, and use the relationship data, such as those defined by the ER model generation module 1204, to determine drill-up and/or drill-down paths. As an example, drill paths can include a breakdown of a particular attribute associated with an entity, such as a geography-based breakdown. Various implementations update the corresponding metadata to reflect the identified drill path information.

Curation engine module 1200 also includes vocabulary generation module 1214 that determines alternate wording options for the data and/or information being curated. For example, various natural language processing algorithms and/or models can be employed to identify similar wording, such as sematic matching algorithms, approximate string matching, text classifier algorithms, word2vec algorithms, latent semantic analysis, clustering algorithms, bag-of-words models, document-term matrices, automatic summarization algorithms, tagging operations, etc. Curation engine module 1200 applies the alternate wordings in the curation process as a way to identify similar data and/or entities, and then adds the information generated using the alternate wordings into the various facets of curating data. As one example, a company entitled "My Big Company" can alternately be referred to as "MBG", "My Big Co.", "Big Co.", and so forth. Vocabulary generation module 1214 discerns when information with alternate naming conventions apply to a same entity, and builds corresponding attributes and/or relationship information to combine and/or associate the information from different sources of information to a same data point and/or entity, thus further enriching the information about that entity.

In various implementations, curation engine module 1200 includes a time engine generation module 1216 that identifies and/or curates information about the data over time spans. Consider a scenario in which the curation process identifies a sales metric for a particular product. Time engine generation module 1216 augments and/or enhances the sales metric to provide more particular information about the sales metric over a span of time, such as day-to-day sales metrics over a month, a running average over a year, monthly sales metrics, etc.

The curation engine module 1200 also generates Key Performance Indicators (KPIs) through the use of domain KPI generation module 1218. Generally, a KPI denotes a performance measurement associated with a particular activity or scope (e.g., an organization, a product, a person, etc.). A KPI can correspond to any suitable type of performance metric, such as an attrition rate, a turnover rate, a quality rate, a cycle time ratio, a utilization rate, a mean time between product failures, an average time to product delivery, a cost savings metric, employee performance indicators, etc. Various implementations of the domain KPI generation module 1218 utilize user profile information to generate the performance indicators. Consider the scenario in which a user logs into a particular workspace. The particular workspace can store anecdotal information, such as domain information (e.g., organization, customer base, product focus, job title, etc.) that is then used by the domain KPI generation module to predict what business metrics may be request from that particular workspace. In turn, KPI generation module 1218 produces business metrics based upon anticipating what information is relevant to the user and/or in response to the user manually requesting the metrics. Accordingly, domain KPI generation module 1218 can include any suitable type of algorithm to generate the KPIs, such as cash flow KPIs, churn KPIs, Human Resources KPIs, benefits KPIs, project value KPIs, healthcare KPIs, etc.

Curation engine module 1200 alternately or additionally includes metrics generation module 1220 to generate other types of statistics and/or metrics not generated via domain KPI generation module 1218. Similar to domain KPI generation module 1218, metrics generation module 1220 can include any suitable number of algorithms, each of which are used to generate a corresponding metric, such as average, sum, derivatives, log percentile, ratios, and so forth. These metrics and/or statistics can be domain-specific, domain-independent, user-specific, user-independent, and so forth. In various implementations, domain KPI generation module 1218 and metrics generation module 1220 exchange information to generate a resultant metric. For instance, domain KPI generation module 1218 can request average sum information from metrics generation module 1220.

Normalizing data that is stored in a database helps remove biases and/or undesired characteristics that potentially reduce the integrity and/or quality of data stored in a database. Accordingly, curation engine module 1200 includes machine-learning (ML) and principle-component analysis (PCA) module 1222 to normalize the curated data being stored in curated relational data model database 1202. This can include identifying and removing anomalies, removing redundant data, simplifying data mapping, validating data dependencies, etc. Various implementations restructure the data stored in curated relational data model database 1202 based upon the normalization process. ML and PCA module 1222 include various statistical procedures and/or machine-learning algorithms that can be used to organize the curated data as it is stored in curated relational data model database 1202. This can include algorithms that apply First Normal Form (1NF) Rules, Second Normal Form (2NF) Rules, Third Normal Form (3NF) Rules, Boyce-Codd Normal Form (BCNF) Rules, and so forth.

Each module described with respect to curation engine module 1200 can be implemented in any suitable manner, such as through any combination of software, hardware, and/or firmware. This can include storage memory devices that store data, storage memory devices that store processor-executable instructions, and/or various types of hardware processing systems as further described herein. Further, each of the modules illustrated as residing within the curation engine module can be implemented collectively on a single device and/or in a distributed manner across multiple devices. To demonstrate, various implementations can utilize any suitable combination of servers 102 and/or computing device 104 of FIG. 1.

Figure 13:
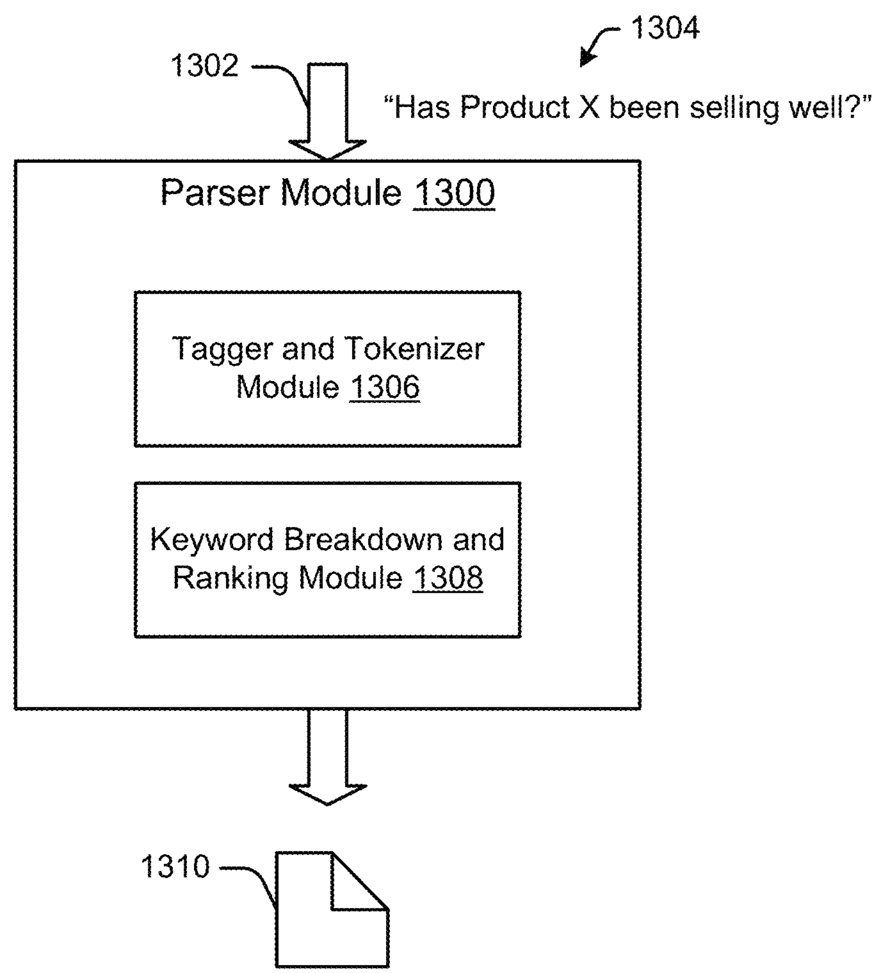
FIG. 13 illustrates an example parser module in accordance with one or more implementations.

Various implementations trigger various query analyses on the curated data generated by curation engine module 1200. FIG. 13 illustrates a more detailed example of a parser module 1300 that can receive an input query associated with a trigger event, and analyze the input query in order to initiate the analysis process. In various scenarios, the example described with respect to FIG. 13 can be considered a continuation of one or more examples described with respect to FIGS. 1-12. Thus, in some implementations, parser module 1300 is representative of parser module 112 of FIG. 1 and/or parser module 1110 of FIG. 11.

As further described herein, a personalized analytics system determines insights that are relevant to a particular user profile, workspace, and/or organization profile using curated data to generate a narrated analytics playlist relevant to a particular user profile. In some scenarios, an input query triggers the analysis process. In FIG. 13, trigger event 1302 corresponds to any suitable type of trigger event that triggers a query analysis, examples of which are provided herein. Here, trigger event 1302 includes an input query string 1304 that forms a basis for the subsequent analysis process.

Various implementations parse input query string 1304 into individual tokens and/or units via tagger and tokenizer module 1306. Accordingly, tagger and tokenizer module 1306 includes language processing algorithms to analyze a sequence of characters included in input query string 1304, to identify a grouping of characters as words, separators, commands, and so forth. To demonstrate, input query string 1304 as illustrated in FIG. 13 includes the string of characters "Has Product X been selling well?" Tagger and tokenizer module 1306 scans the string of characters to identify and classify each word, such as "Product" as a word, "selling" as an action word, etc.

Parser module 1300 also includes keyword breakdown and ranking module 1308 that receives the output of word identification and classification from tagger and tokenizer module 1306, and identifies keywords and/or contextual information to determine relevant words to base a search analysis off of. This can include using natural language processing (NLP) algorithms, word2vec algorithms, and so forth. Determining relevant keywords sometimes involves ranking identified words, and/or access ranking information generated by the curation engine, to determine whether the identified keywords are statistically likely to return successful results (e.g., results and/or words that fall within a predefined threshold associated with returning successful results). In response to identifying keywords that are statistically likely to return successful results, the keyword breakdown and ranking module 1308 assigns these words as ones to use in a query analysis. In response to identifying keywords with low success rates (e.g., a success rate that falls below a predefined threshold), the keyword breakdown and ranking module 1308 tags those keywords as candidates for replacement and/or replaces the keywords with similar words and/or phrases that have a higher success rate. Accordingly, in various implementations, keyword breakdown and ranking module 1308 generates a modified input query that includes the replacement words and/or generates additional queries relative to input query string 1304 with the replacement words. These modified input queries and/or newly generated queries are then passed to a query magnifier to augment and/or enrich the queries.

In one or more implementations, the modified input and/or newly generated queries are formatted as canonical queries that include identifying information about the input query, illustrated here as canonical query 1310. For example, using a markup language, the canonical query can include tags that identify keywords, sorted parameters, actions, timestamps, authentication tokens, etc. Thus, canonical query 1310 is representative of any suitable type of data that can be used to convey a canonical query, and can include additional information generated by the tagger and tokenizer module 1306 and/or keyword breakdown and ranking module 1308. While FIG. 13 illustrates a single canonical query output, it is to be appreciated that this is for discussion purposes, and that a parser module can generate any suitable number of canonical queries without departing from the scope of the claimed subject matter.

Figure 14:
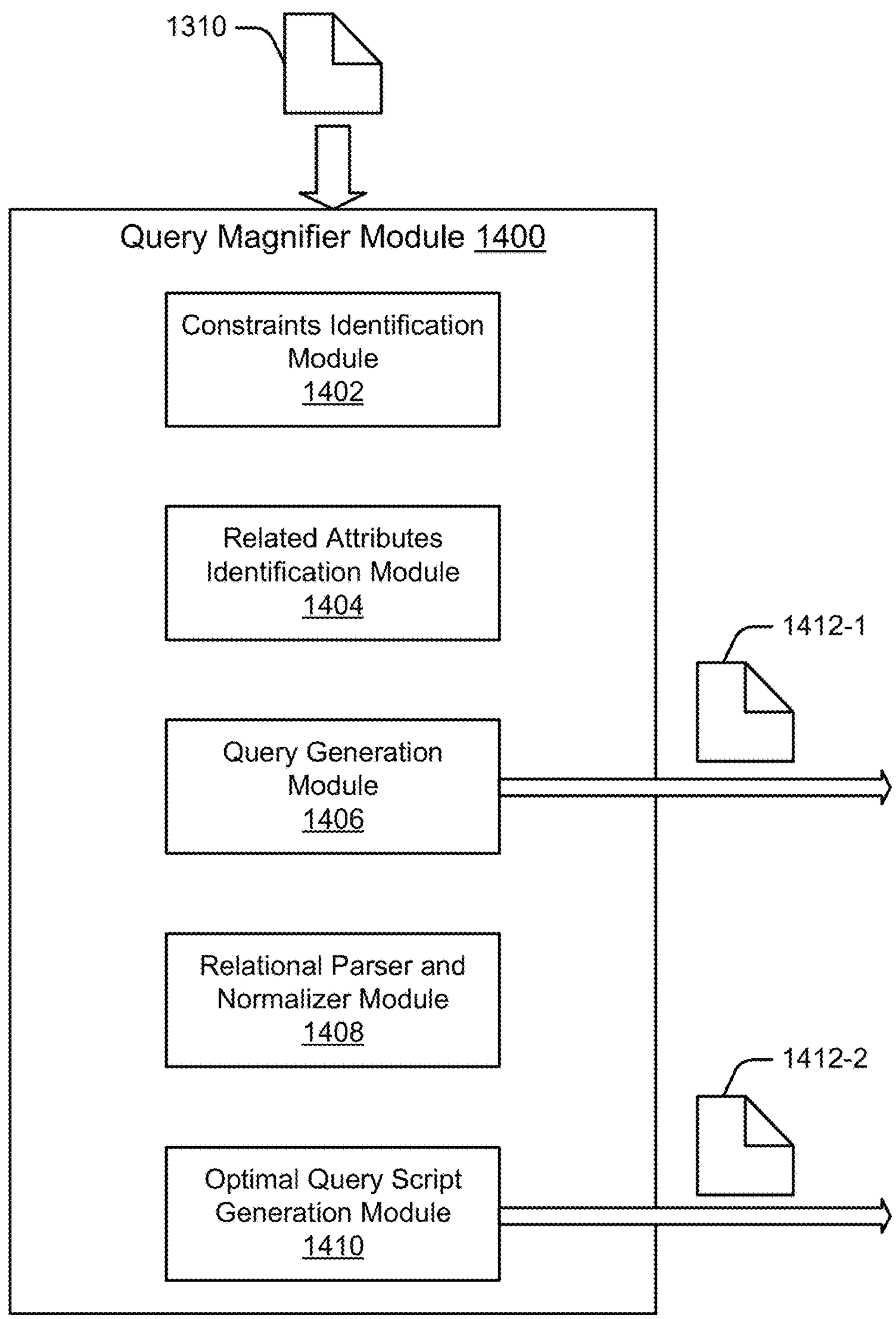
FIG. 14 illustrates an example query magnifier module in accordance with one or more implementations.

Now consider FIG. 14 that illustrates an example query magnifier module 1400 that is in accordance with one or more implementations. In various scenarios, the example described with respect to FIG. 14 can be considered a continuation of one or more examples described with respect to FIGS. 1-13. Thus, in some implementations, query magnifier module 1400 is representative of query magnifier module 114 of FIG. 1 and/or query magnifier module 1112 of FIG. 11.

Query magnifier module 1400 receives canonical query 1310 from FIG. 13 as an input, and augments the query based upon various analyses. Various implementations identify how to augment and/or add contextual parameters the query using constraints identification module 1402, related attributes identification module 1404, query generation module 1406, relational parser and normalizer module 1408, and/or optimal query script generation module 1410. While augmenting the query can include adding search constraints, user preferences, contextual parameters, alternate keywords, etc., various implementations augment the query by identifying and/or generating commands that efficiently extract information from the curated data.

Constraints identification module 1402 analyzes the canonical query to determine whether contextual information is missing from the query, examples of which are provided herein. Alternately or additionally, constraints identification module 1402 identifies new constraints to add to the query. For instance, if canonical query 1310 includes a time constraint, such as "sales over the last month", various implementations of the constraints identification module add shorter and longer time constraints to generate additional information, such as a week time constraint, a yearly time constraint, etc. The identification of additional and/or new constraints can sometimes be based off of anecdotal data, such as timeframes most often requested from a particular user profile, competitor products most often requested by the particular user profile, etc. These additions and/or modifications are then used to generate additional information. In a similar manner, related attributes identification module 1404 identifies existing attributes corresponding to the canonical query, and extrapolates the attributes to related variations, such as adding additional product categories to the input search, additional state attributes, etc. In some implementations, constraints identification module 1402 identifies subject matter that is accessible and/or inaccessible to the user profile, such as through the use of access control inclusion rules and/or access control exclusion rules, that define what a particular user profile and/or workspace can and cannot have access to in the curated data, and governs the extraction of curated data accordingly, such as by modifying search query input keywords, modifying programmatic access to sections of a database, etc.

Canonical query 1310, as well as the keyword identifications, keyword rankings, identified constraints, and/or the identified related attributes, are then fed into query generation module 1406. In turn, query generation module 1406 generates variations of each query that are then used to extract information from the curated data. These variations can be passed into the insight engine, generally indicated here as query 1412-1. Alternately or additionally, the variations are passed into relational parser and normalizer module 1408 to remove biases that may negatively impact the quality of results. The normalized queries can alternately or additionally be passed into optimal query script generator module 1410 to identify efficient database query mechanisms, such as by removing repetitive database access commands, consolidating data extraction, etc. In turn, the queries generated by optimal query script generation module 1410, generally indicated here as query 1412-2, can alternately or additionally be passed to the insight engine module for extracting information from the curated data.

Parser module 1300 and query magnifier module 1400 work in concert to generate queries that can be used to identify queries that efficiently and accurately extract curated data for insight generation, such as by identifying alternate wording with higher success rates, identifying related subject matter, and so forth. In implementations, the querying processing can be adaptive to optimize the runtime conditions of applications executing as part of a workload layer of cloud-based service. According, in various implementations, query processing operations associated with parser module 1300 and/or query magnifier module 1400 can employ batch mode adaptive joining techniques (e.g., generating execution plans for one or more specific queries) and select a plan estimated to use the lowest processing cost and memory grant feedback (e.g., a minimum memory required by the system to execute particular querying operations and/or other workload operations). In turn, this improves the efficiency of the personalized analytics system and/or the computing devices that are used to implement the personalized analytics system.

Figure 15:
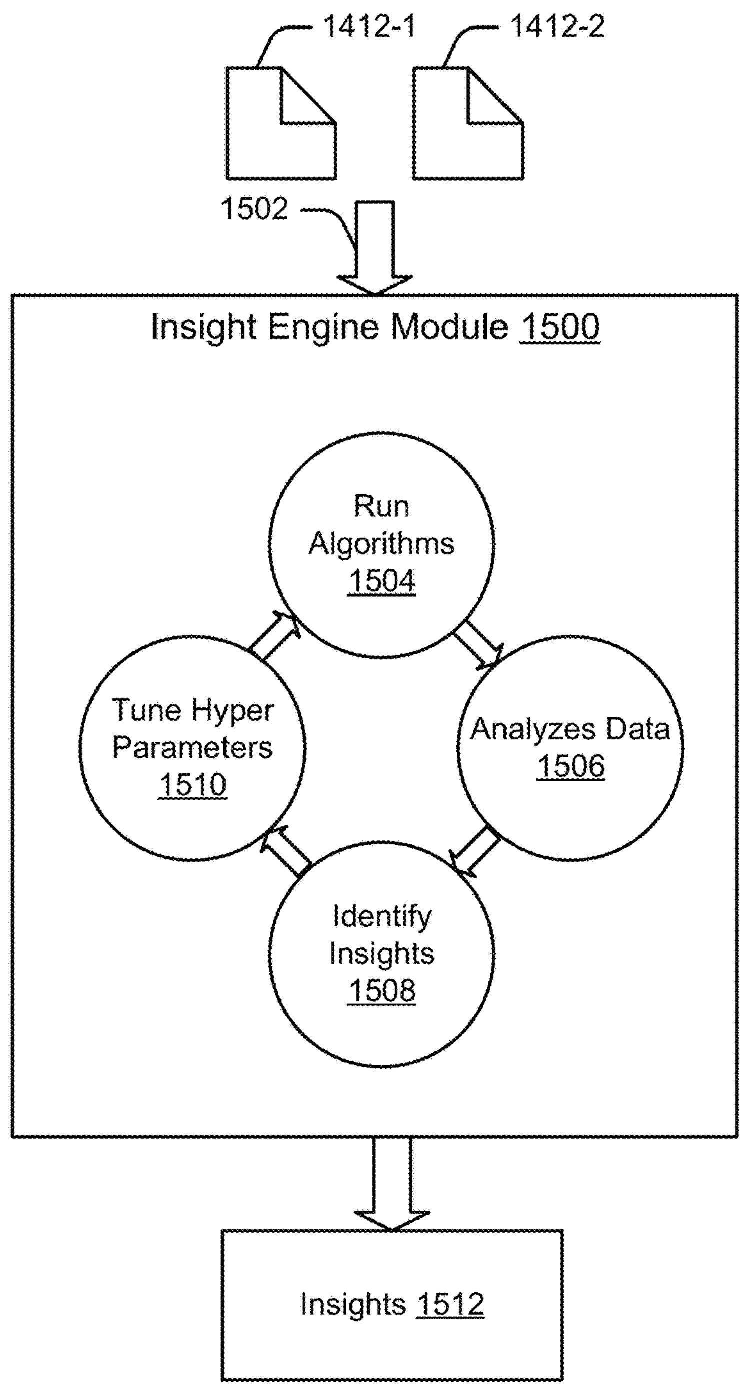
FIG. 15 illustrates an example insight engine module in accordance with one or more implementations.

Now consider FIG. 15 that illustrates an example insight engine module 1500 that is in accordance with one or more implementations. In various scenarios, the example described with respect to FIG. 15 can be considered a continuation of one or more examples described with respect to FIGS. 1-14. Thus, in some implementations, insight engine module 1500 is representative of insight engine module 116 of FIG. 1 and/or insight engine module 1114 of FIG. 11.

Insight engine module 1500 receives query 1412-1 and/or query 1412-2 of FIG. 14, and submits the queries to a database to extract information, such as curated relational data model database 1202 of FIG. 12. In turn, the insight engine module 1500 selects and runs various algorithms at 1504 on the data, such as machine-learning algorithms, to identify a result to the query. In turn, at 1506, the insight engine module analyzes the data and/or results generated by the various algorithms at 1504. The analysis results the insight engine module identifying various types of insights at 1508 as further described herein. In some scenarios, the analysis at 1506 and/or the identification of insights at 1508 cause the insight engine module 1500 to tune hyper-parameters of a corresponding algorithm at 1510. For example, in response to applying the algorithms to the extracted (curated) data, contextual data and/or anecdotal data through one or more machine-learning modules at 1504, the insight engine module 1500 generates an insight and/or prediction. The generated insight and/or prediction then evaluated during the analysis at 1506, such as by comparing the generated insight and/or prediction to actual values to evaluate an accuracy of the prediction and/or insight. The accuracy evaluation can then be used to adjust and/or tune the hyper-parameters until best values for the predictions, insights, and/or hyper-parameters are achieved. Here, the phrase "best values" is used to denote values that result in minimal accuracy error relative to other values. Some implementations extract and share the hyper-parameters with other user profiles, workspaces, and/or organization profiles, such as by way of the proximity platform as further described herein.

The process implemented by insight engine module 1500 corresponding to running algorithms at 1504, analyzing data at 1506, identifying insights at 1508, and tuning hyper parameters at 1510 can be an iterative process, and can be achieved in any suitable manner. For example, various implementations utilize the combination of a processor and processor-executable instructions that drive the behavior of the processor, hardware, firmware, or any combination thereof, to implement the algorithms, to extract the information from the curated data, etc. Examples of such implementations are further illustrated and described in FIGS. 22 and 23. Alternately or additionally, the process combines information from the multiple queries in a statistical manner. For example, consider a scenario in which the query magnifier module 1400 of FIG. 14 receives a single input query and generates "n" variations of the input query, where "n" represents an arbitrary value. Each respective query of the "n" variations can be run through the process associated with the insight engine module such that the corresponding algorithm output, data analysis, insight identification, and/or hyper-parameter tuning combines and/or collectively analyzes the outputs of each respective query. The insight engine module 1500 then outputs one or more insights 1512 that correspond to the insights identified in the process, where the insights can be described using textual output, markup output, metadata, etc. In various implementations, the insights are formatted into a story plot that provides a basic (e.g., un-augmented) outline for a playlist. These insights are then forwarded to a story narrator module for processing.

Figure 16:
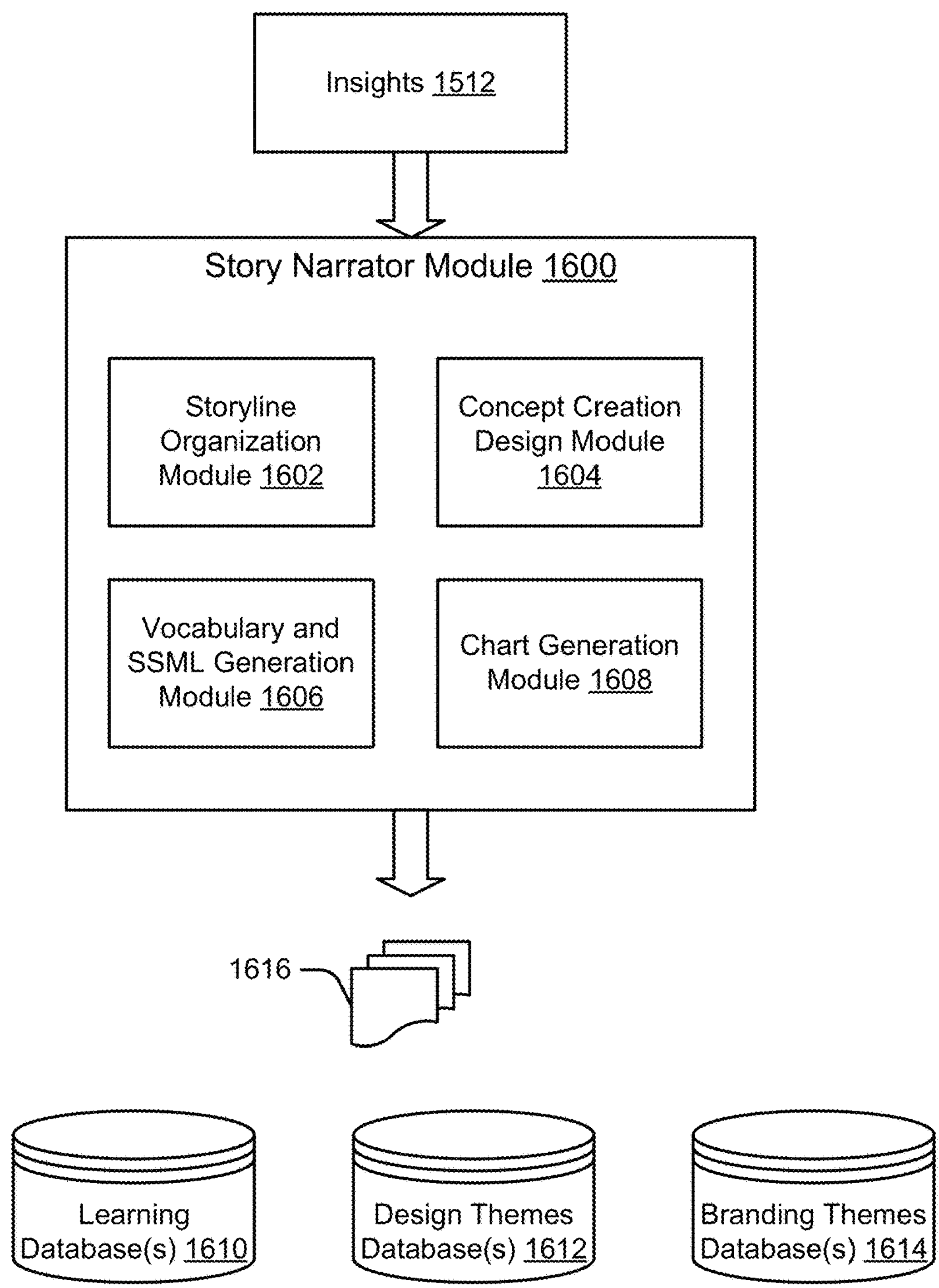
FIG. 16 illustrates an example story narrator module in accordance with one or more implementations.

Consider now FIG. 16 that illustrates an example story narrator module 1600 that is in accordance with one or more implementations. In some scenarios, story narrator module 1600 is representative of story narrator module 118 of FIG. 1 and/or story narrator module 1116 of FIG. 11. In various scenarios, the example described with respect to FIG. 16 can be considered a continuation of one or more examples described with respect to FIGS. 1-15. Story narrator module 1600 represents functionality that determines how to articulate and/or describe the insights received from the insight engine module, such as what visualizations to include in the narrated analytics playlist (e.g., charts, graphs, images, tables, etc.), what summarization of facts to include, the detailed narrative descriptions, etc. In other words, the story narrator module determines augmentation content (e.g., the visualizations, the summarizations, the charts, etc.) for the insights. In this example, story narrator module 1600 receives insights 1512 of FIG. 15. The story narrator module 1600 includes storyline organization module 1602, concept creation design module 1604, vocabulary and Speech Synthesis Markup Language (SSML) generation module 1606, and chart generation module 1608 that collectively work together to generate scripts that are used to generate narrated analytic playlists. As part of the generation process, various implementations access one or more databases that include data related to the insight(s). For example, some implementations of story narrator module 1600 access learning database(s) 1610 to acquire anecdotal data associated with a particular user profile the playlist is being designed for to determine what items to include or exclude from the playlist. Alternately or additionally, story narrator module 1600 accesses design theme database(s) 1612 to obtain formatting information for the playlist, such as colors, backgrounds, font types and size, watermarks, etc. As yet another option, story narrator module 1600 can access branding theme database(s) 1614 to acquire images, text, copyrighted images, and so forth, to include in the playlist.

Storyline organization module 1602 receives the insights and/or story plots from the insight engine, and determines an outline, plot, and/or components to include in a playlist that help explain the various insights. This can include supplemental information, contextual information, etc. In one or more implementations, the storyline organization module 1602 accesses metadata associated with the insights to identify primary attributes (e.g., main attributes associated with an insight) and/or secondary attributes (e.g., attributes of the main attributes). In turn, these attributes can be used to determine what visualizations to include in the narrated analytics playlist and/or what supplemental queries to request information to augment to the narrated analytics playlist. Some implementations of the storyline organization module 1602 apply computational algorithms to the attributes and/or corresponding text as a way to generate a corresponding plot outline. Any suitable type of computational and/or story generator algorithm can be utilized, such as Propps algorithms, Natural Language Generation (NLG) algorithms, Hidden Markov Model (HMM) algorithms, probabilistic context free grammars (PCFGs) algorithms, etc. In one or more implementations, the storyline organization module 1602 identifies one or more advertisements to include in the narrated analytics playlist, such as by analyzing anecdotal information associated with the corresponding user profile, analyzing metadata to identify relevant advertisements, etc.

Concept creation design module 1604 receives an augmented story outline from the storyline organization module 1602, and determines what additional design detail to include in the story outline, such as a design details on which chart to include, what ordering, what drill-down or drill-up information to include in the design, etc. For example, concept creation design module 1604 can analyze the augmented story outline and/or the corresponding metadata to determine related KPIs, attributes, apply entity linking algorithms, etc. In various implementations, the concept creation design module accesses learning database(s) 1610, design themes database(s) 1612, and/or branding themes database(s) 1614 to design how the plot outline is presented. In one or more implementations, the concept creation design module 1604 requests additional information from the parser module 1110, query magnifier module 1112, and/or insight engine module 1114 of FIG. 11.

Vocabulary and SSML generation module 1606 generates narrative descriptions that describe the plot outline and/or the augmented plot outline generated by the concept creation design module 1604. In various implementations, the vocabulary and SSML generation module 1606 generates multiple narrative descriptions of varying narration levels for a corresponding topic and/or playlist (e.g., minimal narration, medium narration, verbose narration) and statically bundles the multiple narrative descriptions with the narrated analytics playlist such that a recipient user profile has an ability to provide input that selects which level of narration to output during playback. Alternately or additionally, the vocabulary and SSML generation module accesses a user-defined setting that identifies a narration level, and generates a corresponding narrative description based upon the user-defined setting. This can include the vocabulary and SSML generation module 1606 accessing the metadata associated with the insights and/or augmented story outline to generate the narrative description. Accordingly, various implementations employ machine-learning algorithms that evolve grammar knowledge, language pattern algorithms, syntactic and/or structural pattern recognition algorithms, and so forth, as a way to output descriptions of the storyline plot and/or design.

Chart generation module 1608 generates visuals that are included in the corresponding playlist. In various implementations, the concept creation design module 1604 interfaces and/or communicates the desired charts to include to chart generation module 1608, such as by updating metadata to indicate the desired charts, sending commands to generate the charts, etc. In turn, the chart generation module 1608 access the corresponding metadata to obtain data used to generate the charts, graphs, images, etc. Alternately or additionally, chart generation module 1608 generates captions for charts. As an example, for a chart that illustrates monthly revenues for a calendar year (January thru August), the chart generation module 1608 can generate the captions "Revenues monthly from January 2018 to August 2018", "Monthly Revenues January-August 2018", or "Revenues January thru August 2018 monthly" based on the metadata, insights, etc. Vocabulary and SSML generation module 1606 can alternately or additionally generate short narration that describes the chart (e.g., "Peak Sales months are April 2018 and July 2018, while the year-to-date increase in sales was 4.3%") as well as long narration that describes the chart (e.g., "Monthly revenues have a consistent positive growth with April and July being the best months. The year to date sales growth is 4.3% across 8 months and the total sales being 24.3 million dollars"). Both the short narration and the long narration can be statically bundled with the narrated analytics playlist to allow a user to select more than one narration mode, thus enhancing the user experience. In some implementations, the chart generation module extracts summary points from a chart to use as short-narrations that can be displayed by the personalized analytics system as bulleted points.

Collectively, these modules generate scripts 1616 which are then delivered to an animator module to generate the narration analytics playlist. Scripts 1616 can include any suitable type of information, such as charts, narrative descriptions, storyline plots, design information, etc. In various implementations, scripts 1616 indicates not only what type of information is included in the narrated analytics playlist, but what order the information is presented in, when information is output simultaneously (e.g., audible output simultaneously with particular graphics), when to transition from a first piece of information to a second piece of information, and so forth. This can be achieved in any suitable manner, such as by marking transition and/or trigger points with flag data, identifying a time duration for each piece of information, etc.

Figure 17:
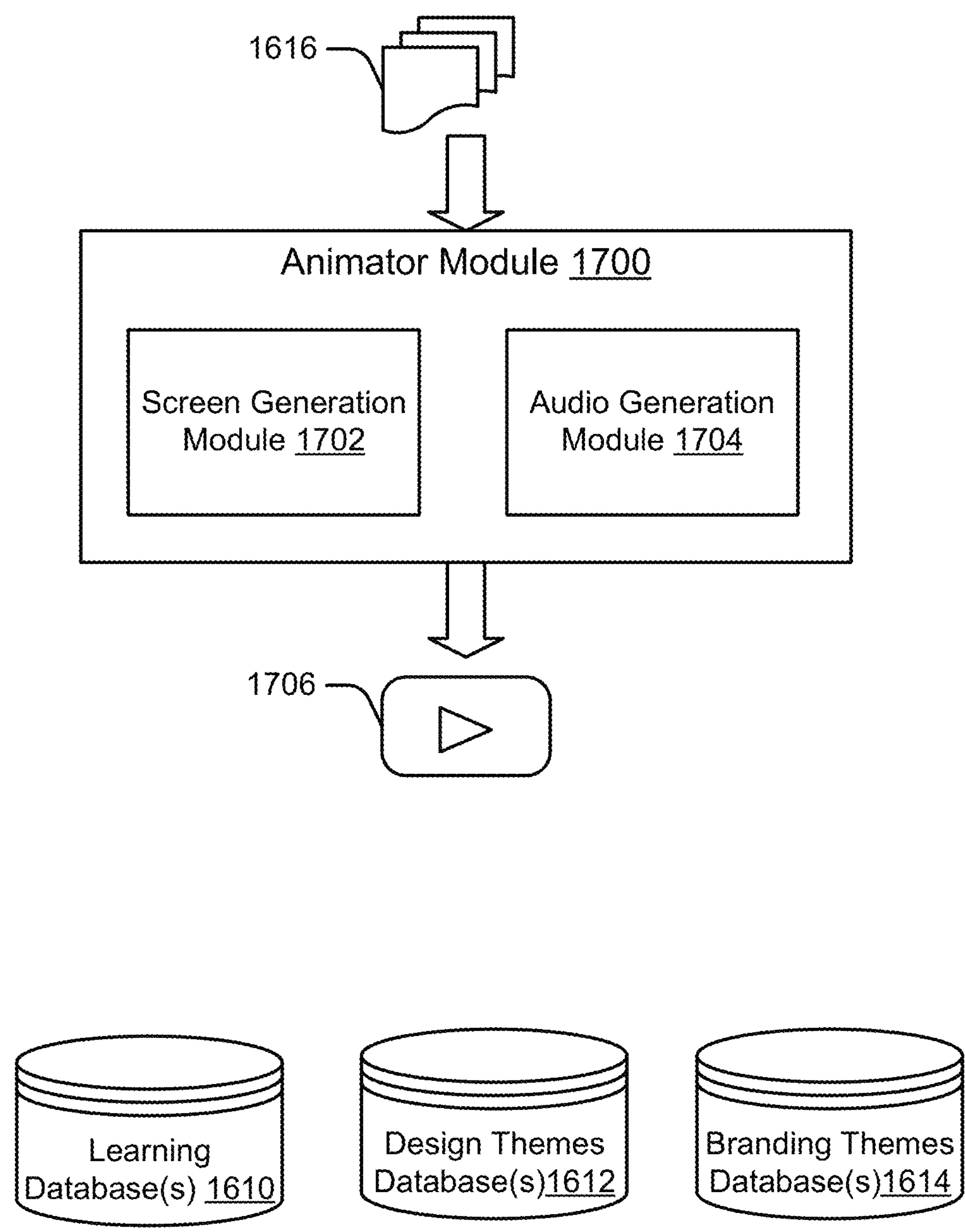
FIG. 17 illustrates an example animator module in accordance with one or more implementations.

Now consider FIG. 17 that illustrates an example animator module 1700 in accordance with one or more implementations. In some scenarios, animator module 1700 is representative of animator module 120 of FIG. 1 and/or animator module 1118 of FIG. 11. In various scenarios, the example described with respect to FIG. 17 can be considered a continuation of one or more examples described with respect to FIGS. 1-16.

Animator module 1700 receives scripts 1616 of FIG. 16, and generates a corresponding playlist from the scripts. Accordingly, animator module 1700 includes screen generation module 1702 and audio generation module 1704.

Screen generation module 1702 generates visual content that is included in the playlist. This can include accessing learning database 1610, design themes database(s) 1612, and/or branding themes database(s) 1614 of FIG. 16 to identify images, colors, formatting, user preferences, etc. to include in the visual content. For example, screen generation module 1702 can analyze an input script and identify keywords, such as product information, company information, location information, etc. In turn, screen generation module 1702 accesses corresponding databases to obtain images related to these keywords.

Audio generation module 1704 converts the descriptions generated by vocabulary and SSML generation module 1606 of FIG. 16 into an audible form. One or more implementations include text-to-speech algorithms to generate audible output. In scenarios in which the statically bundled content includes multiple narrative descriptions, the audio generation module 1704 selects one of the narrative descriptions, such as the verbose narrative description, to convert into audible output. The audible output description can be in any suitable language, such as a default language (e.g., English) and/or a user-defined language (e.g., French, German, Mandarin), where audio generation module 1704 includes machine-learning algorithms corresponding to the selected language. In some implementations, the audible output can be customized via alternate or additional user-defined settings, such as a gender-voice setting, output pace setting, verbal tone, etc. Collectively, these modules output a narrated analytics playlist 1706 that provides information corresponding to an input query in a video form. In turn, various playback engines can render the corresponding images and/or output the corresponding audio.

Figure 18:
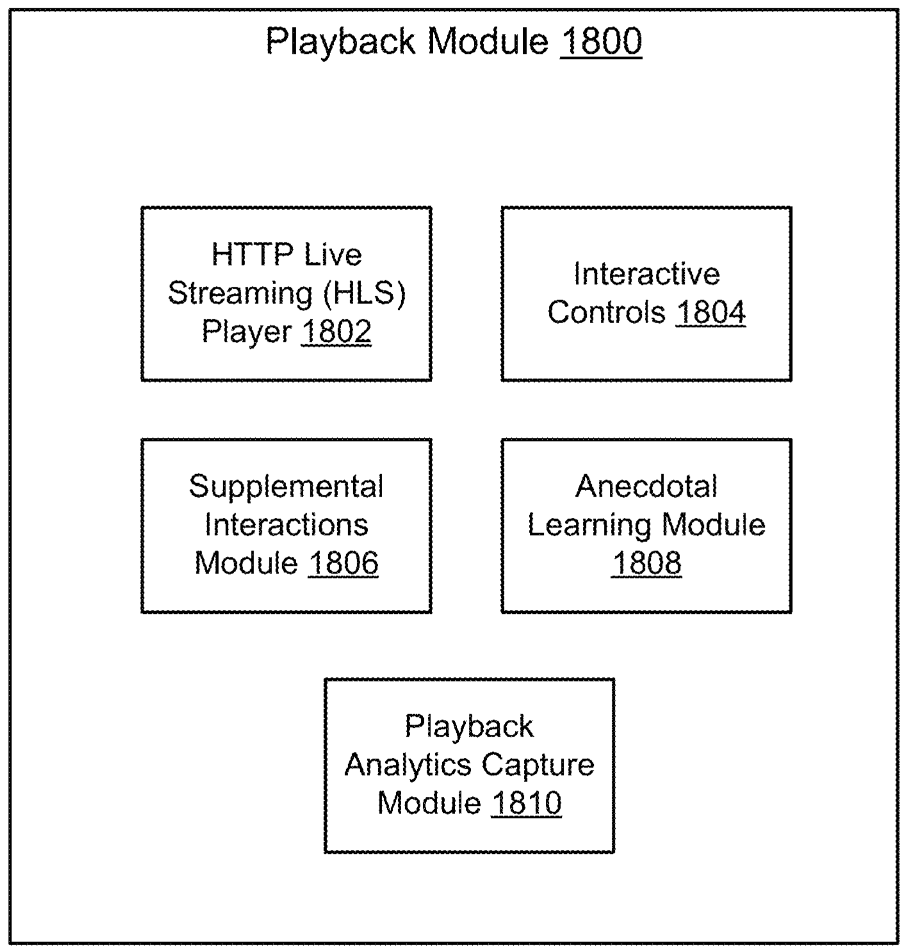
FIG. 18 illustrates an example playback module in accordance with one or more implementations.

FIG. 18 illustrates an example playback module 1800 in accordance with one or more implementations. In some scenarios, playback module 1800 is representative of playback module 132 of FIG. 1 and/or playback module 1120 of FIG. 11. In various scenarios, the example described with respect to FIG. 18 can be considered a continuation of one or more examples described with respect to FIGS. 1-17.

Playback module 1800 generally represents functionality that outputs images and/or audio corresponding to a narrated analytics playlist. In this example, playback module 1800 includes an HTTP Live Streaming (HLS) player 1802, interactive controls 1804, supplemental interactions module 1806, anecdotal learning module 1808, and playback analytics capture module 1510.

HLS player 1802 renders and/or outputs playlist contents. In various implementations, HLS player 1802 streams content corresponding to a narrative analytics playlist over a network connection, such as a network connection to servers 102 of FIG. 1. HLS player 1802 can be implemented as a stand-alone application, as a player that is integrated into a web browser, as a client application that connects to a server application, etc. In response to receiving content, the HLS player renders images as specified by the content. Alternately or additionally, the HLS player outputs synchronized audio.

Interactive controls 1804 provide user-accessible controls that modify playback of content. For example, interactive controls 1804 visually render software controls that pause, start, stop, forward, and/or rewind the playback of content. Interactive controls 1804 can alternately or additionally include audio controls, such as software controls that increase, decrease, and/or mute audio output levels. In some implementations, interactive controls 1804 provide navigation features, such as file navigation.

Similar to interactive controls 1804, supplemental interactions module 1806 provides user-accessible controls. Here, the user-accessible controls correspond to interactions with the personalized analytics system, such as a search query to trigger a query analysis, a chart request, a request for drill-up content and/or drill-down content, etc. Accordingly, various implementations allow for the generation of supplemental information during the playback of a narrated analytics playlist as further described herein.

Anecdotal learning module 1808 tracks information corresponding to user interactions with and/or input to playback module 1800, such as interactions with interactive controls 1804 and/or supplemental interactions module 1806. Alternately or additionally, anecdotal learning module 1808 gathers contextual information about when these interactions happen, what content is currently being output, whether the interaction can be implicitly and/or explicitly identified as positive feedback, negative feedback, etc. In various implementations, the information tracked by anecdotal learning module 1808 is stored with curated data and/or forwarded to cloud-based services as further described herein.

Playback analytics capture module 1810 enables the playback module to capture screen content, such as through control 910 of FIG. 9. Various implementations of playback analytics capture module 1810 not only capture screen content and/or audible content when initiated, but alternately or additionally capture additional information about the captured content, such as metadata, insight information, etc. In some scenarios, playback analytics capture module 1810 triggers a query analysis based upon the captured content and/or the additional information as further described herein.

Figure 19:
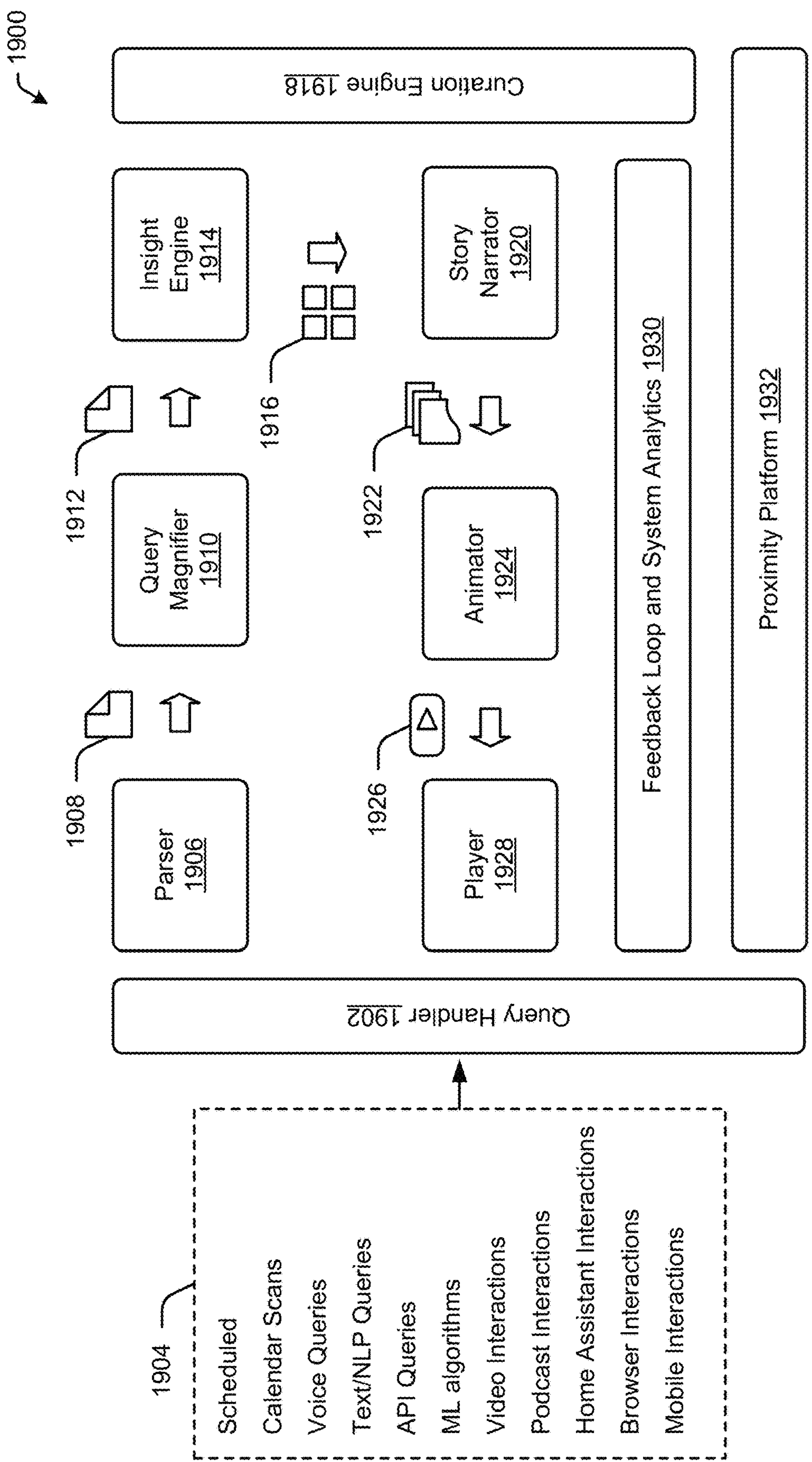
FIG. 19 illustrates an example of a personalized analytics system in accordance with one or more implementations.

To further demonstrate how various modules interact with one another to provide narrated analytic playlists, consider now FIG. 19 that illustrates an example block diagram 1900 in accordance with one or more implementations. In some scenarios, block diagram 1900 can be considered a continuation of one or more examples described with respect to FIGS. 1-18.

Block diagram 1900 includes query handler 1902 that generally handles any type of query input and/or query trigger into the personalized analytics system. In one or more implementations, query handler 1902 represents a library of callable application programming interfaces (APIs) that can be used by other software, hardware, and/or firmware module to trigger the analytics process and/or input a query string. Alternately or additionally, query handler 1902 includes audible interfaces, touch screen interfaces, programmatic interfaces, image processing, audio processing, and so forth, which enable query handler to receive and identify query inputs. In various implementations, query handler 1902 and/or other modules of the personalized analytics system are implemented on various devices of an IoT network (e.g., Zibgee, Z-wave, Thread, Weave, etc.). This allows the personalized analytics system to perform various functionality in a distributed manner and/or on devices that are dedicated to a particular purpose. Thus, various implementations utilize an IoT device dedicated to performing functionality associated with query handler 1902. As another example of utilizing IoT devices, a first device of the IoT can be a computing device dedicated to collecting data which is then transferred to a second device of the IoT associated with curating the data (e.g., curation engine module 110 of FIG. 1, curation engine module 1102 of FIG. 11, and/or curation engine module 1200 of FIG. 12). Continuing on, trigger events 1904 represent example events that trigger a query analysis and/or the generation of a narrated analytics playlist in accordance with one or more implementations. Here, trigger events 1904 include scheduled trigger events that correspond to user-defined schedules that indicate when to generate a narrated analytics playlist and/or perform the analysis associated with generating the narrated analytics playlist. Trigger events 1904 also include calendar scan trigger events that represent trigger events automatically generated by the personalized analytics system in response to a scan of a user's calendar as further described herein. Voice query trigger events and text/NLP query trigger events correspond to manual input to the personalized analytics system, such as audible input with an explicit query request, text strings input into a search field, etc. Trigger events 1904 also include programmatic trigger events, generally represented here as API query trigger events, that enable the personalized analytics system to receive a query request and/or trigger event programmatically. In a similar manner, ML algorithm-based trigger events correspond to programmatic trigger events generated by a machine-learning algorithm requesting more information, such as a machine-learning algorithm employed in the concept creation design module 1402 of FIG. 14 requesting more information, a machine learning algorithm employed in the insight engine module 1500 of FIG. 15 requesting more information, etc. Video interactions trigger events, podcast interactions trigger events, and home assistance device interactions trigger events correspond to implicit trigger events corresponding to the personalized analytics system identifying implicit feedback via video playback, via audible playback, and/or via home assistant interactions. Alternately or additionally, the video interactions, podcast interactions, and/or home assistant device interactions can include explicit feedback, examples of which are provided herein. Trigger events 1904 also include browser interactions trigger events and mobile interactions trigger events that correspond to the personalized analytics system implicitly triggering a query analysis and/or generation of a narrated analytics playlist in response to identifying implicit feedback when interacting with a browser and/or a mobile device. Query handler 1902 includes any combination of software, firmware, and/or hardware that enables these various types of trigger events to interface with the personalized analytics system to trigger and/or initiate a query as further described herein.

In response to receiving any of the trigger events 1904, the personalized analytics system forwards the corresponding input query to parser 1906 for analysis. In response to analyzing the input query, parser 1906 outputs a canonical query 1908 that is utilized as an input to query magnifier 1910. Canonical query 1908 can be formed using any suitable type of data structure that can be utilized to store information, examples of which are provided herein.

Query magnifier 1910 receives the canonical query 1908, and augments the query and/or generates variations of the query with additional subject matter (e.g., context information, additional constraints, alternate and/or related attributes, preferences, etc.). Thus, query magnifier 1910 outputs augmented queries 1912, which can alternately or additionally represent raw data identified during the analysis process. Augmented queries 1912 can include optimized database access instructions that pull information from a database in a more efficient manner (e.g., faster, less data, more concise data, more informative data, etc.) relative to un-optimized database access instructions. Augmented queries 1908 can be formed using any suitable type of data structure that can be utilized to store information, examples of which are provided herein.

Augmented queries 1912 are input to insight engine 1914 which, in turn, pulls information from a database and analyzes the data to not only find an answer to a query, but alternately or additionally identify one or more insights 1916 associated with the query, examples of which are provided herein. Some implementations of the insight engine format insights 1916 as a story plot that provides a basic outline, without augmentation, for a playlist. Various implementations of insight engine 1914 extract and analyze data curated by curation engine 1918 as further described herein. Insights 1916 can be formed using any suitable type of data structure that can be utilized to store information, examples of which are provided herein.

Story narrator 1920 receives the one or more insights 1916 and generates scripts 1922 that can be utilized to generate a narrated analytics playlist. As further described herein, scripts 1922 can include an outline of events to include in the narrated playlist, a text form of a narrated description, a chart, keywords, and so forth. In one or more implementations, scripts 1922 correspond to an augmented version of the story plot and/or insights received from the insight engine. Various implementations include the answer to the query, as well as the identified insights associated with the query, in a same script such that the narrated analytics playlist includes narrated videos that describe the answer, as well as the insight(s). Scripts 1922 can be formed using any suitable type of data structure that can be utilized to store information, examples of which are provided herein.

Scripts 1922 are provided to animator 1924, which uses the scripts and/or corresponding metadata to identify what images and audio to include in the narrated analytics playlist. For example, animator 1924 can generate synthetic speech to include in the playlist based upon the text included in the scripts, can pull branding information, chart images, etc. Thus, animator 1924 generates narrated analytics playlist 1926, which is consumable by player 1928 to render images and/or output synchronized audio. In various scenarios, player 1928 corresponds to playback module 132 of FIG. 1, playback module 1120 of FIG. 11, and/or playback module 1800 of FIG. 18. Various implementations of player 1928 capture playback analytics and learnings, which are then stored in feedback loop and system analytics 1930 and/or uploaded into proximity platform 1932. In various implementations, feedback loop and system analytics 1930 is representative of databases 124 of FIG. 1. Alternately or additionally, player 1928 represents a third-party playback engine that is external to the personalized analytics system. Accordingly, various implementations generate narrated analytics playlist 1926 in formats that are compatible with multiple different types of playback engines. Playlist 1926 can be formed using any suitable type of data structure that can be utilized to store information, examples of which are provided herein.

While player 1928 is described here as generating playback analytics and learning that is stored in feedback loop and system analytics 1930, alternate or additional modules within the personalized analytics system generate and/or upload various types of analytics and learnings to the feedback loop and systems analytics 1930 and/or proximity platform 1932. Thus, feedback loop and systems analytics 1930 corresponds to data, algorithms, and/or information learned by the personalized analytics system that is subsequently utilized in future data curation and/or future insight generation. The playback analytics and learning can include various hyper-parameters used by machine-learning algorithms in various modules of the personalized analytics system that are shared with other shared systems by way of proximity platform 1932.

To further demonstrate, consider now FIGS. 20A and 20B that illustrate an example of utilizing a proximity platform to share learned information in accordance with one or more implementations. In various scenarios, the example described with respect to FIGS. 20A and 20B can be considered a continuation of one or more examples described with respect to FIGS. 1-19.

FIGS. 20A and 20B collectively illustrate an example progression of events over an arbitrary time period. Here, the progression begins in FIG. 20A and then moves to FIG. 20B. It is to be appreciated that the progression of events described with respect to FIGS. 20A and 20B is for discussion purposes, and that any other ordering, omission, and/or addition to the events can occur without departing from the scope of the claimed subject matter.

FIG. 20A illustrates an example environment 2000 that includes servers 102 of FIG. 1 that provide clouded based services 2002 associated with a personalized analytics system to various devices and/or organizations. Here, the personalized analytics system includes proximity platform 2004. While illustrated separately from cloud-based services 2002 and servers 102, this is merely for discussion purposes and it is to be appreciated that alternate or additional implementations integrate portions or all of the proximity platform functionality into the cloud-based services and/or servers 102 without departing from the scope of the claimed subject matter.

In this example, the personalized analytics system provides services to two separate and disparate organizations: organization 2006-1 and organization 2006-2 respectively. Accordingly, each organization has a respective server to access the cloud-based services, identified here as private server 2008-1 and private server 2008-2. Similarly, each organization also has respective private data, labeled here as private data 2010-1 and private data 2010-2. Thus, private data 2010-1 corresponds to data accessible to devices associated with organization 2006-1, such as client device 2012-1 and the client device 2012-2 but inaccessible to devices associated with other organizations, such as client device 2012-3 and client device 2012-4 of organization 2006-2. Similarly, private data 2010-2 corresponds to data accessible to client device 2012-3 and client device 2012-4, but inaccessible to client device 2012-1 and client device 2012-2. Thus, the various computing devices included in organization 2006-1 are disparate and unrelated to the various computing devices of organization 2006-2.

As each client device accesses the personalized analytics system, various implementations collect anecdotal data and/or evolve machine-learning algorithms as further described herein. Since the personalized analytics system as illustrated in FIG. **17*a* supports multiple organizations, it is desirable to apply the anecdotal and/or evolved machine-learning algorithms at a system level (e.g., at servers 102). For example, applying the machine-learning algorithms evolved at organization 2006-1 at organization 2006-2 (and vice versa) allows the personalized analytics system return information more relevant to each organization. However, it is undesirable to share the private data used to evolve the machine-learning algorithms. In other words, to protect the privacy of each organization, it is desirable to share learned information across organization, but keep private data 2010-1 inaccessible to devices external to organization 2006-1, and private data 2010-2 inaccessible to devices external to organization 2006-2**.

Various implementations forward learned information to the personalized analytics system without exposing private data. To illustrate, consider learnings 2014-1 that generally corresponds to various types of anecdotal data, machine-learning algorithm observations, reinforcement learning information, hyper-parameters, etc., generated by client device 2012-1 and/or client device 2012-2. These learnings are forwarded by the respective client devices to private server 2008-1, as further indicated here by the directional arrows. Private server 2008-1 then forwards learnings 2014-1 to proximity platform 2004, indicated here by directional arrow 2016-1, such as through the use of cloud-based services 2002. Similarly, client device 2012-3 and client device 2012-4 forward respective learnings 2014-2 to private server 2008-2 which, in turn, forwards the learnings to the proximity platform 2004, indicated here by directional arrow 2016-2. The proximity platform 2004 then integrates the learning information into the personalized analytics system, generally indicated here with arrow 2018. In some implementations, the proximity platform 2004 executes operations represented by a logical format language that is separate from underlying languages of systems utilized by each client device and/or organization. Using the logical format language allows the proximity platform to communicate with several varied underlying technologies and language formats (e.g., disparate technologies) used by each organization. To illustrate, with respect to FIG. 20A, organization 2006-1 can employ a first technology to support various devices (e.g., private server 2008-1, client device 2012-1, and/or client device 2012-2) and organization 2006-2 can employ a second, different technology to support various devices (e.g., private server 2008-2, client device 2012-3, and/or client device 2012-4). Even though these organizations utilize different technologies, the organizations can both interact with a same proximity platform 2004 via the logical format language, which allows the proximity platform to abstract and/or protect each organization's private data from the other.

Moving to FIG. 20B, and in response to integrating the learning information into the personalized analytics system, various implementations generate updates to one or more machine-learning algorithms, such as by forwarding hyper-parameters to each server of the system (e.g., private server 2008-1, private server 2008-2, etc.). Alternately or additionally, proximity platform 2004 integrates the information into cloud-based services 2002. In FIG. 20B, proximity platform 2004 forwards algorithm updates 2020 to both private server 2008-1 and private server 2008-2, as generally indicted by the directional arrow 2022-1 and arrow 2022-2. Thus, the personalized analytics system is able to extract learned information about various user profiles and/or workspaces of the system and forward the learned information without exposing private data. In other words, by extracting and sharing learned information, such as the non-limiting example of sharing machine-learning algorithm hyper-parameters from a first system to a second system, the proximity-platform provides the personalized analytics system with the ability to change the second system's behavior (e.g., impact a prediction outcome, adjust parameters of a model applied to similar data of a different client device, etc.) without compromising the security of the first system. The changed system behavior can include efficiency improvements (e.g., faster insight determination times, faster data extraction, faster data curation, etc.). As one non-limiting example, a set of hyper-parameters can be adjusted or tuned to generate optimal hyper-parameter values to improve efficiency, such as by using grid search techniques, random search technique, Bayesian optimization technique, as part of the tuning algorithms. In various implementations, the personalized analytics system determines which of the hyper-parameters are relevant for tuning based on a predictive learning model or target outcome. In turn, the optimal hyper-parameter values can be distributed to different systems. Accordingly, the personalized analytics system can leverage the learned efficiencies across disparate computing devices without exposing the data used to generate the efficiencies.

Figure 21:
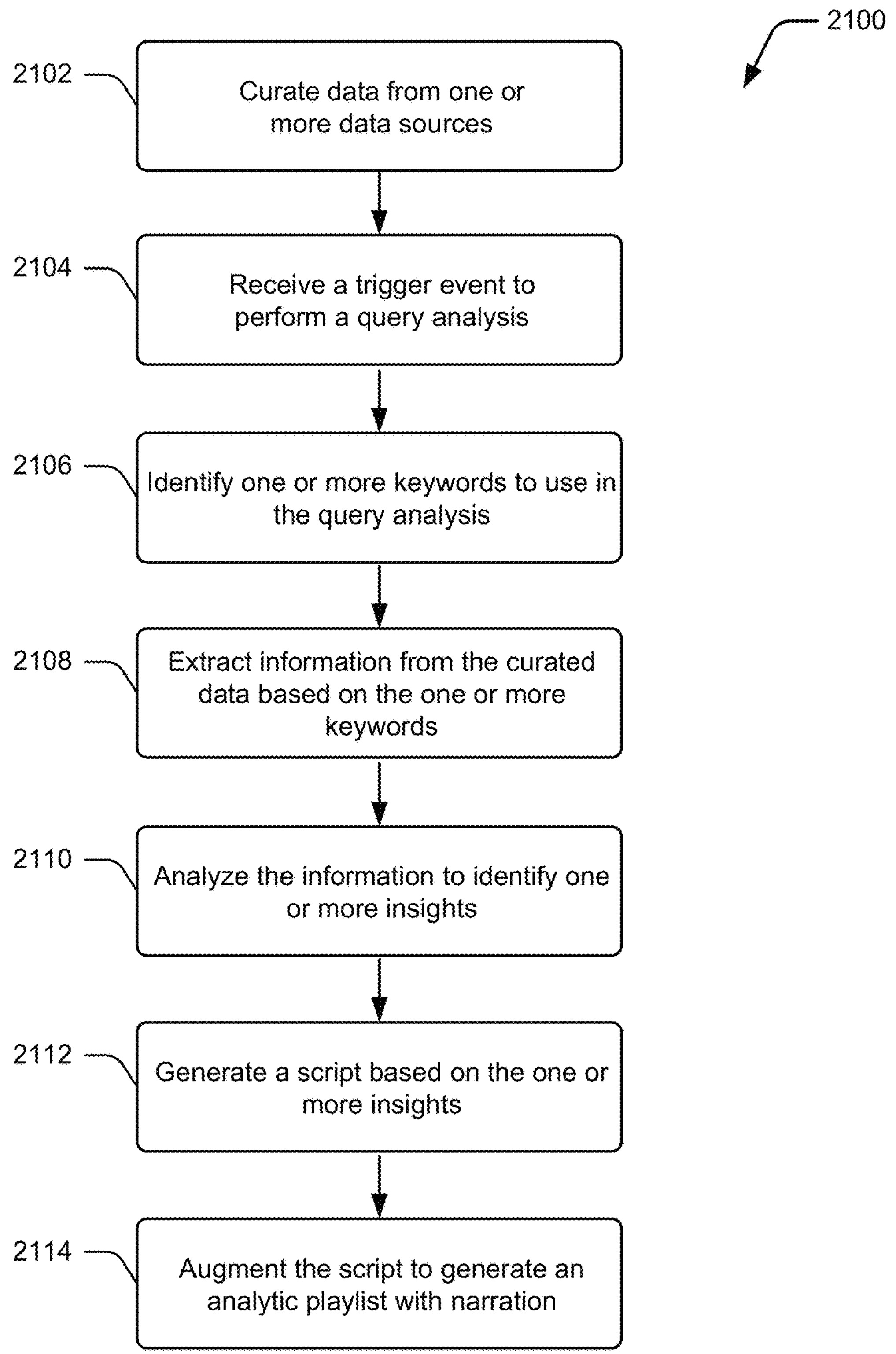
FIG. 21 illustrates a flow diagram of generating a narrated analytics playlist in accordance with one or more implementations.

FIG. 21 illustrates an example method 2100 that can be utilized to generate narrated analytics playlists in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1. While the method described in FIG. 21 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 2102, various implementations curate data from one or more data sources, such as through the use of curation engine module 110. In some implementations, the personalized analytics system identifies data sources to scan based on user-defined data sources, such as database addresses assigned to a particular workspace via explicit input to the personalized analytics system. Alternately or additionally, various implementations scan applications for data to curate, such as SaaS applications. The curation of data can be in response to input corresponding to a manual trigger request and/or occur automatically, such as at scheduled intervals, during idle periods of system inactivity (e.g., no active input), and so forth. To curate the data, one or more implementations identify attributes and/or relational information between the data that is then stored in metadata. The personalized analytics system oftentimes generates relational data models during the curation process, and applies the relational data models when storing the curated data in a database. In some implementations, the curation of data includes identifying drill-path information, and storing the drill-path information as part of the curated data. Alternately or additionally, one or more implementations utilize anecdotal data to influence the curation process.

At 2104, the personalized analytics system receives a trigger event to perform a query analysis (e.g., personalized analytics module 106). The trigger event can be received in any suitable manner, such as via an explicit input and/or interaction to perform the query analysis and/or an implicit input and/or interaction that is used to trigger the query analysis. Alternately or additionally, the trigger event can originate from a scheduler and/or from calendar scans as further described herein.

In response to receiving the trigger event, various implementations identify one or keywords to use in the query analysis at 2106, such as by using parser module 112 and/or query magnifier module 114. This can include utilizing keywords included in an input query string and/or deriving keywords from anecdotal data associated with a user profile and/or workspace, accessing metadata, using word ranking information, etc. For instance, various implementations identify contextual words included in the input query string, such as by using a tagger and tokenizer module, and then find similar words to the contextual words that have a higher success rate of returning results.

One or more implementations extract information from the curated data based upon the one or more keywords at 2108, such as by using insight engine module 116, parser module 112 and/or query magnifier module 114. In some implementations, the exact words included in the input string are utilized to extract information, while in alternate or additional implementations, the personalized analytics system augments the keywords with contextual parameters. Sometimes the augmentation is based upon anecdotal data. The personalized analytics system can also identify and use alternate words to extract additional information, and then collectively analyze the different variations of extracted information to identify insights. This can include generating multiple queries with alternate wording, using primary and secondary attributes, and so forth. Accordingly, at 2110, one or more implementations analyze the extracted information and/or the additional information to identify one or more insights (e.g., insight engine module 116). Any suitable type of insight can be identified, examples of which are provided herein. In turn, the personalized analytics system generates a script based upon the one or more insights at 2112.

At 2114, and in response to receiving the script, one or more implementations augment the script to generate narrated analytics playlists. In various implementations, the personalized analytics system applies a computational algorithm to the script to identify what components and/or visualizations to include in a playlist that help explain the various insights. One or more implementations augment the script with narrative description(s) using various types of machine-learning algorithms, such as grammar-based algorithms, language pattern algorithms, syntactic algorithms, etc. In turn, the textual description generated by these machine-learning algorithms can be converted into an audible output, such as through the use of various text-to-speech algorithms. The visualizations and audible output are then statically bundled to form a narrated analytics playlist. In one or more implementations, metadata is combined and/or statically bundled the narrated analytics playlist as well.

Having described an example of generating narrated analytics playlists, consider now a discussion of example devices in which can be used for various implementations.

Example Devices

Figure 22:
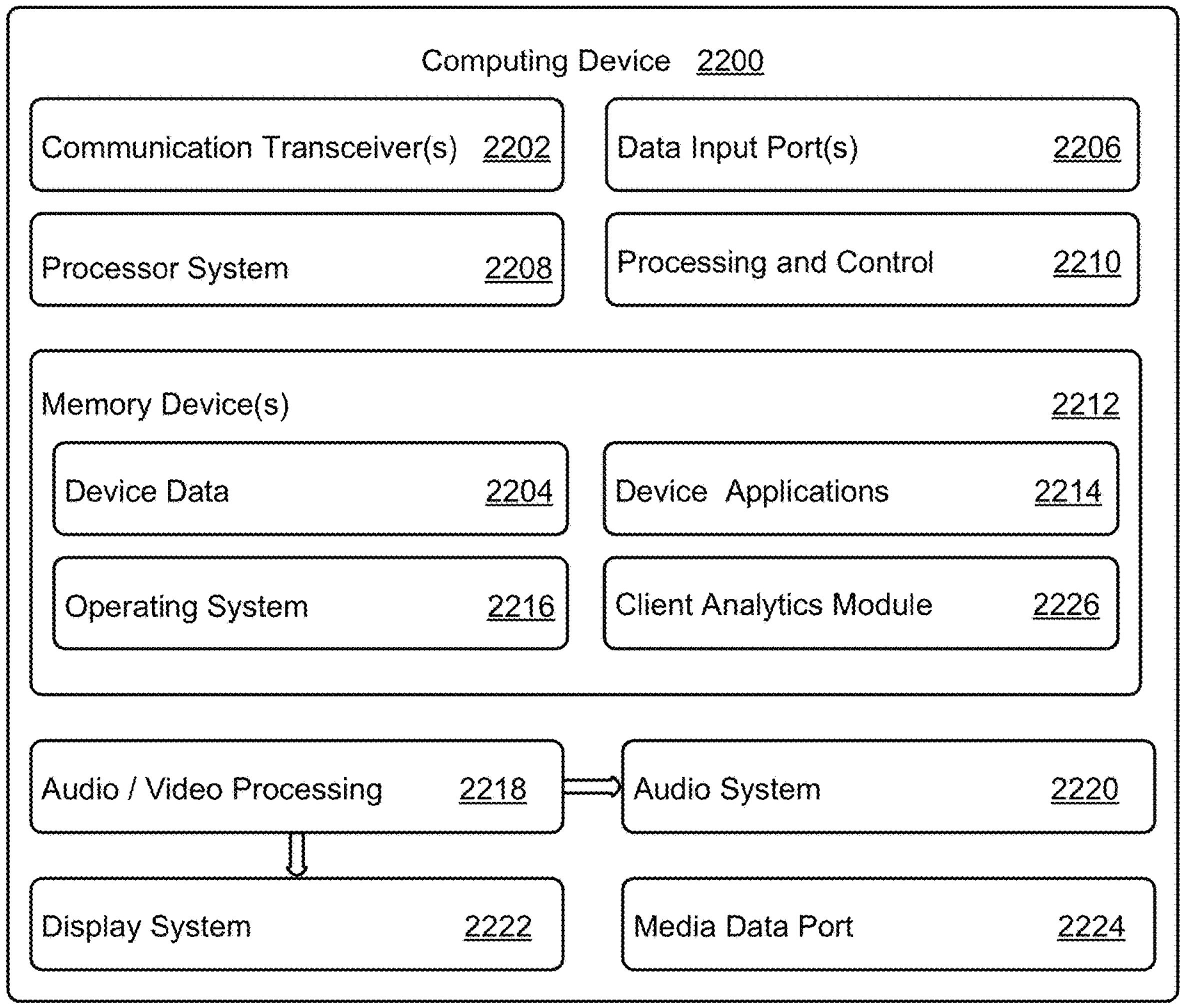
FIG. 22 is an illustration of an example computing device in accordance with one or more implementations.
Figure 23:
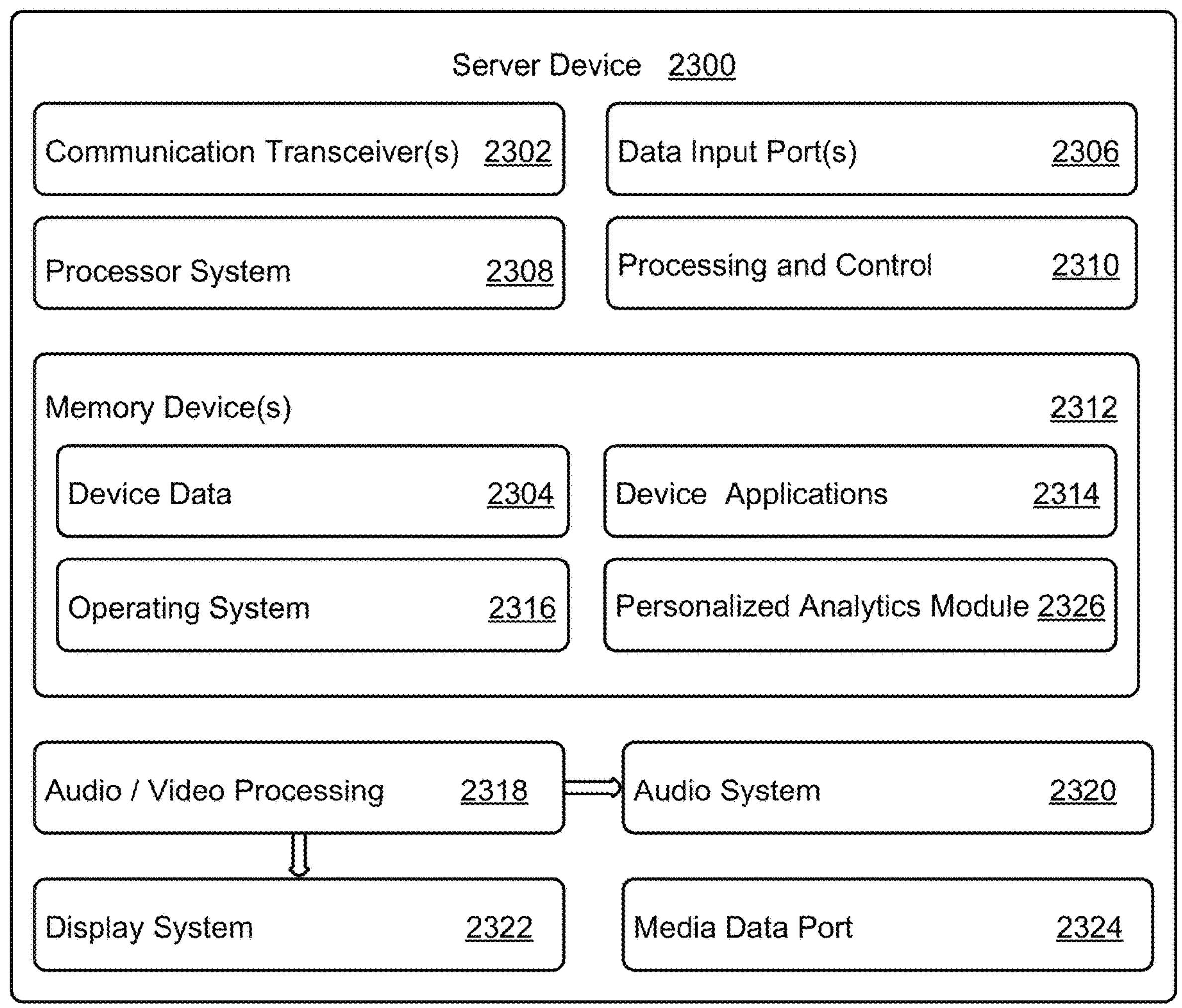
FIG. 23 is an illustration of an example server device in accordance with one or more implementations.

FIG. 22 illustrates various components of an example computing device 2200, such as computing device 104 of FIG. 1, while FIG. 23 illustrates various components of an example server device 2300, such as one of servers 102 of FIG. 1. Accordingly, computing device 2200 and/or server device 2300 can be utilized to implement various aspects of context-based testing as further described herein. In some implementations, computing device 2200 and server device 2300 have at least some similar components. Accordingly, for the purposes of brevity, FIGS. 22 and 23 will be described together. Similar components associated with FIG. 22 will be identified as components having a naming convention of "22XX", and components associated with FIG. 23 will be identified as components having a naming convention of "23XX". Conversely, components distinct to each device will be described separately and after the similar components.

Computing device 2200/server device 2300 includes communication transceivers 2202/communication transceivers 2302 that enable wired or wireless communication of device data 2204/device data 2304, such as received data and transmitted data. While referred to as a transceiver, it is to be appreciated that communication transceivers 2202/communication transceivers 2302 can additionally include separate transmit antennas and receive antennas without departing from the scope of the claimed subject matter. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Computing device 2200/server device 2300 may also include one or more data input ports 2206/data input ports 2306 via which any type of data, media content, and inputs can be received, such as user-selectable inputs, messages, music, television content, recorded video content, and any other type of audio, video, or image data received from any content or data source. Data input ports 2206/data input ports 2306 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Computing device 2200/server device 2300 of this example includes processor system 2208/processor system 2308 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 2210/processing and control 2310. Although not shown, computing device 2200/server device 2300 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Computing device 2200/server device 2300 also includes one or more memory devices 2212/memory devices 2312 that enable data storage, examples of which include random access memory (RAM), non-volatile memory (e.g., read-only memory (ROM), flash memory, EPROM, EEPROM, etc.), and a disk storage device. Memory devices 2212/memory devices 2312 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 2212/memory devices 2312 provide data storage mechanisms to store the device data 2204/device data 2304, other types of information or data, and/or various device applications 2214/device applications 2314 (e.g., software applications). For example, operating system 2216/operating system 2316 can be maintained as software instructions within memory devices 2212/memory devices 2312 and executed by processor system 2208/processor system 2308.

Computing device 2200/server device 2300 optionally includes audio and video processing system 2218/audio and video processing system 2318 that processes audio data and passes through the audio and video data to optional audio system 2220/audio system 2320. Audio system 2220/audio system 2320 and optional display system 2222/display system 2322 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as optional media data port 2224/media data port 2324. In some implementations, optional audio system 2220/audio system 2320 and optional display system 2222/display system 2322 are external components to computing device 2200/server device 2300. Alternatively, or additionally, optional audio system 2220/audio system 2320 and optional display system 2222/display system 2322 can be an integrated component of the example computing device 2200/server device 2300, such as part of an integrated speaker and/or an integrated display and touch interface.

In some aspects, memory devices 2212 of computing device 2200 includes client analytics module 2226 to provide personalized analytics system features. Client analytics module 2226 can include a web browser accessing a remote server web page, a client application that executes in conjunction with cloud-based services, a stand-alone application, and/or a client application that exchanges data with a server application, to provide personalized analytics as further described herein. Various implementations of client analytics module collect anecdotal data about user interactions with the personalized analytics system, which is then referenced later to aid in curating data and/or generating narrated analytics playlists. While client analytics module 2226 is illustrated here as residing on memory devices 2212, alternate or additional implementations can be implemented in varying combinations of software, and/or firmware.

In some aspects, memory devices 2312 of server device 2300 includes personalized analytics module 2326 to provide personalized analytics to various computing devices. In one or more implementations, personalized analytics module 2326 is implemented to provide cloud-based services to remote devices, such as computing device 2200 of FIG. 22. Personalized analytics module 2326 identifies data sources to scan, curates data from the data sources, and performs query analyses on the curated data. This can include performing multiple variations of the query analysis, and statistically combining the information from the multiple variations as a way to identify insights as further described herein. In some implementations, the personalized analytics system automatically generates a narrated analytics playlist from the insights, where the playlist includes images and narrative audible output. One or more implementations of the personalized analytics module includes a proximity platform to enable the exchange of machine-learning algorithm parameters without exposing data used to train the machine-learning algorithms.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

I claim:

1. A system comprising:

one or more processors; and one or more storage devices comprising processor executable instructions that, responsive to execution by the one or more processors, cause the system to perform operations comprising:

determining that a first trigger event occurs based on a pre-scheduled recurring calendar curation event indicating that curated data is to be generated for a particular user profile;

performing an automated curation query in response to the trigger event to generate a set of curated data from one or more data sources based upon anecdotal data associated with the user profile, the anecdotal data comprising data describing one or more of user preferences associated with the user profile or historical user interactions with a computing system, and the set of curated data comprising a subset of data from the data from the one or more data sources;

receiving, after the automated curation query to generate the set of curated data, a second trigger event to perform a query analysis on the set of curated data;

identifying one or more keywords to use in the query analysis;

performing a search on the set of curated data to extract information from the set of curated data based, at least in part, on the one or more keywords;

analyzing the information to identify one or more insights;

generating and outputting a narrated analytics playlist using the one or more insights;

receiving user interaction during output of the narrated analytics playlist to modify playback of a portion of the narrated analytics playlist;

triggering, in response to the user interaction to modify playback of the portion of the narrated analytics playlist, a query analysis, the query analysis including:

identifying, based on detecting the user interaction to control the playback of the portion of the narrated analytics playlist, topic information included in the portion of the narrated analytics playlist being played back at a time of the user interaction; and performing a further search based on the topic information to obtain content pertaining to the topic information; and modifying output of the narrated analytics playlist to include the content.

2. The system as recited in claim 1, wherein said operations further comprise updating the curated data based upon a prioritization of the one or more data sources.

3. The system as recited in claim 1, the operations further comprising:

identifying the user profile based, at least in part, on an active workspace; and acquiring the anecdotal data based, at least in part, on the active workspace.

4. The system as recited in claim 1, wherein said identifying the one or more keywords to use in the query analysis further comprises:

identifying one or more contextual words included in a search query included in the trigger event; and augmenting the search query to include one or more contextual parameters based, at least in part, on the anecdotal data.

5. The system as recited in claim 4, wherein said augmenting the search query further comprises augmenting the search query with a time range or a location.

6. The system as recited in claim 1, the operations further comprising:

outputting the narrated analytics playlist using a playback module;

displaying, via the playback module, a control associated with generating supplemental information during said outputting the analytics playlist;

receiving input associated with actuation of the control;

generating the supplemental information in response to said receiving the actuation; and interrupting said outputting the narrated analytics playlist to output the supplemental information.

7. The system as recited in claim 1 the operations further comprising:

receiving one or more input settings associated with playback of the narrated analytics playlist; and modifying the narrated analytics playlist during the playback based, at least in part, on the one or more input settings.

8. The system as recited in claim 1, the operations further comprising:

tracking one or more user interactions with output of the narrated analytics playlist by the system, the one or more user interactions affecting an output characteristic of the narrated analytics playlist;

identifying at least one interaction of the one or more interactions as implicit positive feedback, the at least one interaction including the user interaction to control the playback of the portion of the narrated analytics playlist; and triggering the further search based, at least in part, on said identifying the implicit positive feedback.

9. The system as recited in claim 8, wherein said triggering the further search further comprises triggering the further search based on content of the narrated analytics playlist being output at a time associated with the at least one interaction.

10. A system comprising:

a processing system that implements a personalized analytics system comprising:

a curation engine module to:

identify data to curate by scanning one or more data sources;

perform a curation query to curate the data based, at least in part, on identifying attributes and data relationships associated with the data to generate curated data; and store the curated data in a database based, at least in part, on the attributes and the data relationships;

a parser module, a query magnifier module, and an insight engine module that work in concert to:

identify one or more keywords to utilize in a query analysis;

extract information from the curated data based, at least in part, on the one or more keywords; and identify one or more insights based upon analyzing the information;

a story narrator module and an animator module that work in concert to generate a narrated analytics playlist based, at least in part, on the one or more insights; and a proximity platform module to:

determine that one or more machine learning configuration parameters, the curation query, and a private relational data model are utilized by a machine learning algorithm implemented by the curation engine module to generate the curated data as output from the machine learning algorithm;

extract, from a first computing device, the one or more machine learning configuration parameters utilized by the machine-learning algorithm while omitting the curated data, the curation query, and the private relational data model from the extracted one or more machine learning configuration parameters; and propagate, to a second computing device, the one or more machine learning configuration parameters without exposing the curated data, the curation query, and the private relational data model utilized by the first computing device to generate the one or more machine learning configuration parameters effective to modify a behavior of the machine-learning algorithm in response to the second computing device accessing the personalized analytics system.

11. The system as recited in claim 10, wherein to identify the one or more keywords to utilize in the query analysis, the parser module performs one or more operations to:

tag and tokenize an input query string associated with the query analysis to identify each word included in an input search query string associated with the query analysis;

rank each word included in the input search query string to identify one or more words that fall within a predefined threshold associated with returning successful results; and assign the one or more words that fall within the predefined threshold associated with returning successful results as the one or more keywords.

12. The system as recited in claim 10, wherein to generate the narrated analytics playlist, the story narrator module performs one or more operations to:

identify anecdotal data associated with a user profile; and utilize the anecdotal data to determine how to represent the one or more insights.

13. The system as recited in claim 10, wherein to generate the narrated analytics playlist, the parser module, the query magnifier module, and the insight engine module collectively perform one or more operations to:

identify one or more contextual words included an input query string associated with a trigger event associated with initiating the query analysis;

utilize the one or more contextual words to identify one or more additional input queries to use in the query analysis;

extract additional information from the curated data using the one or more additional input queries; and use the additional information and the information to identify the one or more insights.

14. The system as recited in claim 10, wherein to generate the narrated analytics playlist, the story narrator module and the animator module collectively perform one or more operations to:

receive the one or more insights from the insight engine module;

determine augmentation content for the one or more insights that includes a narrative description and one or more visualizations; and generate the narrated analytics playlist by including the narrative description and the one or more visualizations.

15. The system as recited in claim 14, wherein to determine how to augment the one or more insights with the narrative description, the story narrator module performs additional operations to:

identify a setting associated with a narration level; and generate the narrative description based, at least in part, on the narration level.

16. The system as recited in claim 10, wherein the personalized analytics system further includes a player module to:

output the narrated analytics playlist;

track one or more interactions with the player module and content being output by the player module at a time of the one or more interactions; and store the one or more interactions and the content being output at each respective time of the one or more interactions as anecdotal data.

17. The system as recited in claim 10, wherein the one or more machine learning configuration parameters comprise hyper-parameters used by the machine-learning algorithm to generate the curated data.

18. A method comprising:

accessing, via a client device, a personalized analytics system;

sending, using the client device, a trigger event to the personalized analytics system to perform a query analysis;

receiving, from the personalized analytics system, a statically bundled narrated analytics playlist associated with the query analysis, the narrated analytics playlist including one or more insights relating to a primary topic and associated with the trigger event;

outputting the narrated analytics playlist via a playback module effective to:

render images associated with the narrated analytics playlist;

displaying, during said outputting the narrated analytics playlist:

a first control that is selectable to generate drill-up content that includes information for a different topic related to the primary topic; and a second control that is selectable to generate drill-down content that includes detailed information about the primary topic, wherein the drill-up content and the drill-down content represent supplemental content not included in the narrated analytics playlist;

receiving input associated with actuation of one of the first control or the second control;

obtaining, based on actuation of the one of the first control or the second control, the supplemental content based, at least in part, on metadata associated with the narrated analytics playlist;

determining a scope of supplemental content to present based on one or more of user a user historical pattern or user preferences of a user profile associated with the client device;

modifying the supplemental content based on the determined scope; and interrupting the outputting of the narrated analytics playlist to output the modified supplemental content.

19. The method as recited in claim 18 further comprising:

collecting information about user interactions with the personalized analytics system;

receiving input to disable tracking user interactions; and disabling collecting the information about the user interactions.

20. The method as recited in claim 18 wherein said determining the scope of supplemental content to present comprises determining an amount of information concerning the supplemental content to be presented, and wherein said modifying the supplemental content comprises modifying the supplemental content to correspond to the amount of information to generate the modified supplemental content.

* * * * *